US012633754B2

(12) United States Patent (10) Patent No.: US 12,633,754 B2
Yoscovich (45) Date of Patent: May 19, 2026

(54) MAXIMIZING POWER IN A PHOTOVOLTAIC DISTRIBUTED POWER SYSTEM

(71) Applicant: Solaredge Technologies Ltd., Herzeliya (IL)

(72) Inventor: Ilan Yoscovich, Givatayim (IL)

(73) Assignee: Solaredge Technologies Ltd., Herzeliya (IL)

( * ) Notice: Subject to any disclaimer, the term of this patent is extended or adjusted under 35 U.S.C. 154(b) by 80 days.

(21) Appl. No.: 18/436,241

(22) Filed: Feb. 8, 2024

(65) Prior Publication Data

US 2024/0222978 A1 Jul. 4, 2024

Related U.S. Application Data

(63) Continuation of application No. 16/787,730, filed on Feb. 11, 2020, now Pat. No. 11,929,620, which is a
(Continued)

(30) Foreign Application Priority Data

Jan. 30, 2012 (GB) ...................................... 1201499

(51) Int. Cl.
*H02J 3/38* (2006.01)
*H02J 3/46* (2006.01)
*H02M 7/42* (2006.01)

(52) U.S. Cl.
CPC ................ *H02J 3/381* (2013.01); *H02J 3/38* (2013.01); *H02J 3/46* (2013.01); *H02M 7/42* (2013.01); *H02J 2300/26* (2020.01); *Y02E 10/56* (2013.01)

(58) Field of Classification Search
CPC ...... H02J 3/381; H02J 3/38; H02J 3/46; H02J 2300/26; H02J 2300/10; H02J 1/12; H02M 7/42; Y02E 10/56; G05F 1/67
(Continued)

(56) References Cited

U.S. PATENT DOCUMENTS 2,367,925 A 1/1945 Brown
2,586,804 A 2/1952 Fluke
(Continued)

FOREIGN PATENT DOCUMENTS

AU 2073800 A 9/2000
AU 2005262278 A1 1/2006
(Continued)

OTHER PUBLICATIONS

United Kingdom Intellectual Property Office, Combined Search and Examination Report Under Sections 17 and 18(3), GB1020862.7, dated Jun. 16, 2011.
(Continued)

*Primary Examiner* — Daniel Cavallari
*Assistant Examiner* — Xuan Ly
(74) *Attorney, Agent, or Firm* — Banner & Witcoff, Ltd.

(57) ABSTRACT

A power harvesting system including multiple parallel-connected photovoltaic strings, each photovoltaic string includes a series-connection of photovoltaic panels. Multiple voltage-compensation circuits may be connected in series respectively with the photovoltaic strings. The voltage-compensation circuits may be configured to provide respective compensation voltages to the photovoltaic strings to maximize power harvested from the photovoltaic strings. The voltage-compensation circuits may be include respective inputs which may be connected to a source of power and respective outputs which may be connected in series with the photovoltaic strings.

20 Claims, 6 Drawing Sheets

Related U.S. Application Data continuation of application No. 15/720,919, filed on Sep. 29, 2017, now Pat. No. 10,608,553, which is a continuation of application No. 13/754,059, filed on Jan. 30, 2013, now Pat. No. 9,812,984.

(58) Field of Classification Search
USPC ......................................................... 307/75
See application file for complete search history.

(56) References Cited

U.S. PATENT DOCUMENTS

| | | | |
|---|---|---|---|
| 2,758,219 A | 8/1956 | Miller |
| 2,852,721 A | 9/1958 | Harders et al. |
| 2,958,171 A | 11/1960 | Deckers |
| 3,369,210 A | 2/1968 | Manickella |
| 3,380,035 A | 4/1968 | Hecker |
| 3,392,326 A | 7/1968 | Lamberton |
| 3,496,029 A | 2/1970 | King et al. |
| 3,566,143 A | 2/1971 | Paine et al. |
| 3,569,784 A | 3/1971 | Carroll et al. |
| 3,643,564 A | 2/1972 | Uchiyama |
| 3,696,286 A | 10/1972 | Ule |
| 3,740,652 A | 6/1973 | Burgener |
| 3,958,136 A | 5/1976 | Schroeder |
| 3,982,105 A | 9/1976 | Eberle |
| 4,060,757 A | 11/1977 | McMurray |
| 4,101,816 A | 7/1978 | Shepter |
| 4,104,687 A | 8/1978 | Zulaski |
| 4,127,797 A | 11/1978 | Perper |
| 4,129,788 A | 12/1978 | Chavannes |
| 4,129,823 A | 12/1978 | van der Pool et al. |
| 4,146,785 A | 3/1979 | Neale |
| 4,161,771 A | 7/1979 | Bates |
| 4,171,861 A | 10/1979 | Hohorst |
| 4,183,079 A | 1/1980 | Wachi |
| 4,253,764 A | 3/1981 | Morrill |
| 4,257,087 A | 3/1981 | Cuk |
| 4,296,461 A | 10/1981 | Mallory et al. |
| 4,321,581 A | 3/1982 | Tappeiner et al. |
| 4,324,225 A | 4/1982 | Trihey |
| 4,327,318 A | 4/1982 | Kwon et al. |
| 4,346,341 A | 8/1982 | Blackburn et al. |
| 4,363,040 A | 12/1982 | Inose |
| 4,367,557 A | 1/1983 | Stern et al. |
| 4,375,662 A | 3/1983 | Baker |
| 4,384,321 A | 5/1983 | Rippel |
| 4,404,472 A | 9/1983 | Steigerwald |
| 4,412,142 A | 10/1983 | Ragonese et al. |
| 4,452,867 A | 6/1984 | Conforti |
| 4,453,207 A | 6/1984 | Paul |
| 4,460,232 A | 7/1984 | Sotolongo |
| 4,470,213 A | 9/1984 | Thompson |
| 4,479,175 A | 10/1984 | Gille et al. |
| 4,481,654 A | 11/1984 | Daniels et al. |
| 4,488,136 A | 12/1984 | Hansen et al. |
| 4,526,553 A | 7/1985 | Guerrero |
| 4,533,986 A | 8/1985 | Jones |
| 4,545,997 A | 10/1985 | Wong et al. |
| 4,549,254 A | 10/1985 | Kissel |
| 4,554,502 A | 11/1985 | Rohatyn |
| 4,554,515 A | 11/1985 | Burson et al. |
| 4,580,090 A | 4/1986 | Bailey et al. |
| 4,591,965 A | 5/1986 | Dickerson |
| 4,598,330 A | 7/1986 | Woodworth |
| 4,602,322 A | 7/1986 | Merrick |
| 4,604,567 A | 8/1986 | Chetty |
| 4,611,090 A | 9/1986 | Catella et al. |
| 4,623,753 A | 11/1986 | Feldman et al. |
| 4,626,983 A | 12/1986 | Harada et al. |
| 4,631,565 A | 12/1986 | Tihanyi |
| 4,637,677 A | 1/1987 | Barkus |
| 4,639,844 A | 1/1987 | Gallios et al. |
| 4,641,042 A | 2/1987 | Miyazawa |
| 4,641,079 A | 2/1987 | Kato et al. |
| 4,644,458 A | 2/1987 | Harafuji et al. |
| 4,649,334 A | 3/1987 | Nakajima |
| 4,652,770 A | 3/1987 | Kumano |
| 4,683,529 A | 7/1987 | Bucher, II |
| 4,685,040 A | 8/1987 | Steigerwald et al. |
| 4,686,617 A | 8/1987 | Colton |
| 4,706,181 A | 11/1987 | Mercer |
| 4,719,553 A | 1/1988 | Hinckley |
| 4,720,667 A | 1/1988 | Lee et al. |
| 4,720,668 A | 1/1988 | Lee et al. |
| 4,736,151 A | 4/1988 | Dishner |
| 4,746,879 A | 5/1988 | Ma et al. |
| 4,772,994 A | 9/1988 | Harada et al. |
| 4,783,728 A | 11/1988 | Hoffman |
| 4,797,803 A | 1/1989 | Carroll |
| 4,819,121 A | 4/1989 | Saito et al. |
| RE33,057 E | 9/1989 | Clegg et al. |
| 4,864,213 A | 9/1989 | Kido |
| 4,868,379 A | 9/1989 | West |
| 4,873,480 A | 10/1989 | Lafferty |
| 4,888,063 A | 12/1989 | Powell |
| 4,888,702 A | 12/1989 | Gerken et al. |
| 4,899,246 A | 2/1990 | Tripodi |
| 4,899,269 A | 2/1990 | Rouzies |
| 4,903,851 A | 2/1990 | Slough |
| 4,906,859 A | 3/1990 | Kobayashi et al. |
| 4,910,518 A | 3/1990 | Kim et al. |
| 4,951,117 A | 8/1990 | Kasai |
| 4,978,870 A | 12/1990 | Chen et al. |
| 4,987,360 A | 1/1991 | Thompson |
| 5,001,415 A | 3/1991 | Watkinson |
| 5,027,051 A | 6/1991 | Lafferty |
| 5,027,059 A | 6/1991 | de Montgolfier et al. |
| 5,041,739 A | 8/1991 | Goto |
| 5,045,988 A | 9/1991 | Gritter et al. |
| 5,054,023 A | 10/1991 | Kronberg |
| 5,081,558 A | 1/1992 | Mahler |
| 5,097,196 A | 3/1992 | Schoneman |
| 5,138,422 A | 8/1992 | Fujii et al. |
| 5,143,556 A | 9/1992 | Matlin |
| 5,144,222 A | 9/1992 | Herbert |
| 5,155,670 A | 10/1992 | Brian |
| 5,191,519 A | 3/1993 | Kawakami |
| 5,196,781 A | 3/1993 | Jamieson et al. |
| 5,210,519 A | 5/1993 | Moore |
| 5,235,266 A | 8/1993 | Schaffrin |
| 5,237,194 A | 8/1993 | Takahashi |
| 5,268,832 A | 12/1993 | Kandatsu |
| 5,280,133 A | 1/1994 | Nath |
| 5,280,232 A | 1/1994 | Kohl et al. |
| 5,287,261 A | 2/1994 | Ehsani |
| 5,289,361 A | 2/1994 | Vinciarelli |
| 5,289,998 A | 3/1994 | Bingley et al. |
| 5,327,071 A | 7/1994 | Frederick et al. |
| 5,329,222 A | 7/1994 | Gyugyi et al. |
| 5,345,375 A | 9/1994 | Mohan |
| 5,379,209 A | 1/1995 | Goff |
| 5,381,327 A | 1/1995 | Yan |
| 5,391,235 A | 2/1995 | Inoue |
| 5,402,060 A | 3/1995 | Erisman |
| 5,404,059 A | 4/1995 | Loffler |
| 5,412,558 A | 5/1995 | Sakurai et al. |
| 5,413,313 A | 5/1995 | Mutterlein et al. |
| 5,428,286 A | 6/1995 | Kha |
| 5,446,645 A | 8/1995 | Shirahama et al. |
| 5,460,546 A | 10/1995 | Kunishi et al. |
| 5,472,614 A | 12/1995 | Rossi |
| 5,475,296 A | 12/1995 | Vinsant et al. |
| 5,477,091 A | 12/1995 | Fiorina et al. |
| 5,493,154 A | 2/1996 | Smith et al. |
| 5,497,289 A | 3/1996 | Sugishima et al. |
| 5,501,083 A | 3/1996 | Kim |
| 5,504,415 A | 4/1996 | Podrazhansky et al. |
| 5,504,418 A | 4/1996 | Ashley |
| 5,504,449 A | 4/1996 | Prentice |
| 5,513,075 A | 4/1996 | Capper et al. |
| 5,517,378 A | 5/1996 | Asplund et al. |
| 5,530,335 A | 6/1996 | Decker et al. |
| 5,539,238 A | 7/1996 | Malhi |
| 5,548,504 A | 8/1996 | Takehara |

(56)                References Cited

U.S. PATENT DOCUMENTS

| | | | |
|---|---|---|---|
| 5,563,780 | A | 10/1996 | Goad |
| 5,565,855 | A | 10/1996 | Knibbe |
| 5,566,022 | A | 10/1996 | Segev |
| 5,576,941 | A | 11/1996 | Nguyen et al. |
| 5,580,395 | A | 12/1996 | Yoshioka et al. |
| 5,585,749 | A | 12/1996 | Pace et al. |
| 5,604,430 | A | 2/1997 | Decker et al. |
| 5,616,913 | A | 4/1997 | Litterst |
| 5,625,539 | A | 4/1997 | Nakata et al. |
| 5,631,534 | A | 5/1997 | Lewis |
| 5,636,107 | A | 6/1997 | Lu et al. |
| 5,644,212 | A | 7/1997 | Takahashi |
| 5,644,219 | A | 7/1997 | Kurokawa |
| 5,646,501 | A | 7/1997 | Fishman et al. |
| 5,648,731 | A | 7/1997 | Decker et al. |
| 5,654,740 | A | 8/1997 | Schulha |
| 5,659,465 | A | 8/1997 | Flack et al. |
| 5,677,833 | A | 10/1997 | Bingley |
| 5,684,385 | A | 11/1997 | Guyonneau et al. |
| 5,686,766 | A | 11/1997 | Tamechika |
| 5,696,439 | A | 12/1997 | Presti et al. |
| 5,703,390 | A | 12/1997 | Itoh |
| 5,708,576 | A | 1/1998 | Jones et al. |
| 5,719,758 | A | 2/1998 | Nakata et al. |
| 5,722,057 | A | 2/1998 | Wu |
| 5,726,505 | A | 3/1998 | Yamada et al. |
| 5,726,615 | A | 3/1998 | Bloom |
| 5,731,603 | A | 3/1998 | Nakagawa et al. |
| 5,734,258 | A | 3/1998 | Esser |
| 5,734,259 | A | 3/1998 | Sisson et al. |
| 5,734,565 | A | 3/1998 | Mueller et al. |
| 5,747,967 | A | 5/1998 | Muljadi et al. |
| 5,751,120 | A | 5/1998 | Zeitler et al. |
| 5,773,963 | A | 6/1998 | Blanc et al. |
| 5,777,515 | A | 7/1998 | Kimura |
| 5,777,858 | A | 7/1998 | Rodulfo |
| 5,780,092 | A | 7/1998 | Agbo et al. |
| 5,793,184 | A | 8/1998 | O'Connor |
| 5,798,631 | A | 8/1998 | Spee et al. |
| 5,801,519 | A | 9/1998 | Midya et al. |
| 5,804,894 | A | 9/1998 | Leeson et al. |
| 5,812,045 | A | 9/1998 | Ishikawa et al. |
| 5,814,970 | A | 9/1998 | Schmidt |
| 5,821,734 | A | 10/1998 | Faulk |
| 5,822,186 | A | 10/1998 | Bull et al. |
| 5,838,148 | A | 11/1998 | Kurokami et al. |
| 5,847,549 | A | 12/1998 | Dodson, III |
| 5,859,772 | A | 1/1999 | Hilpert |
| 5,869,956 | A | 2/1999 | Nagao et al. |
| 5,873,738 | A | 2/1999 | Shimada et al. |
| 5,886,882 | A | 3/1999 | Rodulfo |
| 5,886,890 | A | 3/1999 | Ishida et al. |
| 5,892,354 | A | 4/1999 | Nagao et al. |
| 5,898,585 | A | 4/1999 | Sirichote et al. |
| 5,903,138 | A | 5/1999 | Hwang et al. |
| 5,905,645 | A | 5/1999 | Cross |
| 5,917,722 | A | 6/1999 | Singh |
| 5,919,314 | A | 7/1999 | Kim |
| 5,923,100 | A | 7/1999 | Lukens et al. |
| 5,923,158 | A | 7/1999 | Kurokami et al. |
| 5,929,614 | A | 7/1999 | Copple |
| 5,930,128 | A | 7/1999 | Dent |
| 5,930,131 | A | 7/1999 | Feng |
| 5,932,994 | A | 8/1999 | Jo et al. |
| 5,933,327 | A | 8/1999 | Leighton et al. |
| 5,945,806 | A | 8/1999 | Faulk |
| 5,946,206 | A | 8/1999 | Shimizu et al. |
| 5,949,668 | A | 9/1999 | Schweighofer |
| 5,955,885 | A | 9/1999 | Kurokami et al. |
| 5,959,438 | A | 9/1999 | Jovanovic et al. |
| 5,961,739 | A | 10/1999 | Osborne |
| 5,963,010 | A | 10/1999 | Hayashi et al. |
| 5,963,078 | A | 10/1999 | Wallace |
| 5,982,253 | A | 11/1999 | Perrin et al. |
| 5,986,909 | A | 11/1999 | Hammond et al. |
| 5,990,659 | A | 11/1999 | Frannhagen |
| 6,002,290 | A | 12/1999 | Avery et al. |
| 6,002,603 | A | 12/1999 | Carver |
| 6,008,971 | A | 12/1999 | Duba et al. |
| 6,021,052 | A | 2/2000 | Unger et al. |
| 6,031,736 | A | 2/2000 | Takehara et al. |
| 6,037,720 | A | 3/2000 | Wong et al. |
| 6,038,148 | A | 3/2000 | Farrington et al. |
| 6,046,470 | A | 4/2000 | Williams et al. |
| 6,046,919 | A | 4/2000 | Madenokouji et al. |
| 6,050,779 | A | 4/2000 | Nagao et al. |
| 6,058,035 | A | 5/2000 | Madenokouji et al. |
| 6,064,086 | A | 5/2000 | Nakagawa et al. |
| 6,078,511 | A | 6/2000 | Fasullo et al. |
| 6,081,104 | A | 6/2000 | Kern |
| 6,082,122 | A | 7/2000 | Madenokouji et al. |
| 6,087,738 | A | 7/2000 | Hammond |
| 6,091,329 | A | 7/2000 | Newman |
| 6,093,885 | A | 7/2000 | Takehara et al. |
| 6,094,129 | A | 7/2000 | Baiatu |
| 6,101,073 | A | 8/2000 | Takehara |
| 6,105,317 | A | 8/2000 | Tomiuchi et al. |
| 6,111,188 | A | 8/2000 | Kurokami et al. |
| 6,111,391 | A | 8/2000 | Cullen |
| 6,111,767 | A | 8/2000 | Handleman |
| 6,127,801 | A | 10/2000 | Manor |
| 6,130,458 | A | 10/2000 | Takagi et al. |
| 6,150,739 | A | 11/2000 | Baumgartl et al. |
| 6,151,234 | A | 11/2000 | Oldenkamp |
| 6,163,086 | A | 12/2000 | Choo |
| 6,166,455 | A | 12/2000 | Li |
| 6,166,527 | A | 12/2000 | Dwelley et al. |
| 6,169,678 | B1 | 1/2001 | Kondo et al. |
| 6,175,219 | B1 | 1/2001 | Imamura et al. |
| 6,175,512 | B1 | 1/2001 | Hagihara et al. |
| 6,191,456 | B1 | 2/2001 | Stoisiek et al. |
| 6,191,498 | B1 | 2/2001 | Chang |
| 6,215,286 | B1 | 4/2001 | Scoones et al. |
| 6,219,623 | B1 | 4/2001 | Wills |
| 6,222,351 | B1 | 4/2001 | Fontanella et al. |
| 6,225,793 | B1 | 5/2001 | Dickmann |
| 6,255,360 | B1 | 7/2001 | Domschke et al. |
| 6,255,804 | B1 | 7/2001 | Herniter et al. |
| 6,256,234 | B1 | 7/2001 | Keeth et al. |
| 6,259,234 | B1 | 7/2001 | Perol |
| 6,262,558 | B1 | 7/2001 | Weinberg |
| 6,268,559 | B1 | 7/2001 | Yamawaki |
| 6,274,804 | B1 | 8/2001 | Psyk et al. |
| 6,275,016 | B1 | 8/2001 | Ivanov |
| 6,281,485 | B1 | 8/2001 | Siri |
| 6,285,572 | B1 | 9/2001 | Onizuka et al. |
| 6,291,764 | B1 | 9/2001 | Ishida et al. |
| 6,292,379 | B1 | 9/2001 | Edevold et al. |
| 6,297,621 | B1 | 10/2001 | Hui et al. |
| 6,301,128 | B1 | 10/2001 | Jang et al. |
| 6,304,065 | B1 | 10/2001 | Wittenbreder |
| 6,307,749 | B1 | 10/2001 | Daanen et al. |
| 6,311,137 | B1 | 10/2001 | Kurokami et al. |
| 6,316,716 | B1 | 11/2001 | Hilgrath |
| 6,320,769 | B2 | 11/2001 | Kurokami et al. |
| 6,329,808 | B1 | 12/2001 | Enguent |
| 6,331,670 | B2 | 12/2001 | Takehara et al. |
| 6,339,538 | B1 | 1/2002 | Handleman |
| 6,344,612 | B1 | 2/2002 | Kuwahara et al. |
| 6,346,451 | B1 | 2/2002 | Simpson et al. |
| 6,348,781 | B1 | 2/2002 | Midya et al. |
| 6,350,944 | B1 | 2/2002 | Sherif et al. |
| 6,351,130 | B1 | 2/2002 | Preiser et al. |
| 6,369,461 | B1 | 4/2002 | Jungreis et al. |
| 6,369,462 | B1 | 4/2002 | Siri |
| 6,380,719 | B2 | 4/2002 | Underwood et al. |
| 6,396,170 | B1 | 5/2002 | Laufenberg et al. |
| 6,396,239 | B1 | 5/2002 | Benn et al. |
| 6,400,579 | B2 | 6/2002 | Cuk |
| 6,425,248 | B1 | 7/2002 | Tonomura et al. |
| 6,429,546 | B1 | 8/2002 | Ropp et al. |
| 6,429,621 | B1 | 8/2002 | Arai |
| 6,433,522 | B1 | 8/2002 | Siri |
| 6,433,978 | B1 | 8/2002 | Neiger et al. |

(56) References Cited

U.S. PATENT DOCUMENTS

| | | |
|---|---|---|
| 6,441,597 B1 | 8/2002 | Lethellier |
| 6,445,599 B1 | 9/2002 | Nguyen |
| 6,448,489 B2 | 9/2002 | Kimura et al. |
| 6,452,362 B1 | 9/2002 | Choo |
| 6,452,814 B1 | 9/2002 | Wittenbreder |
| 6,465,910 B2 | 10/2002 | Young et al. |
| 6,465,931 B2 | 10/2002 | Knowles et al. |
| 6,469,919 B1 | 10/2002 | Bennett |
| 6,472,254 B2 | 10/2002 | Cantarini et al. |
| 6,479,963 B1 | 11/2002 | Manor et al. |
| 6,483,203 B1 | 11/2002 | McCormack |
| 6,493,246 B2 | 12/2002 | Suzui et al. |
| 6,501,362 B1 | 12/2002 | Hoffman et al. |
| 6,507,176 B2 | 1/2003 | Wittenbreder, Jr. |
| 6,509,712 B1 | 1/2003 | Landis |
| 6,512,444 B1 | 1/2003 | Morris, Jr. et al. |
| 6,515,215 B1 | 2/2003 | Mimura |
| 6,515,217 B1 | 2/2003 | Aylaian |
| 6,519,165 B2 | 2/2003 | Koike |
| 6,528,977 B2 | 3/2003 | Arakawa |
| 6,531,848 B1 | 3/2003 | Chitsazan et al. |
| 6,545,211 B1 | 4/2003 | Mimura |
| 6,548,205 B2 | 4/2003 | Leung et al. |
| 6,560,131 B1 | 5/2003 | vonBrethorst |
| 6,587,051 B2 | 7/2003 | Takehara et al. |
| 6,590,793 B1 | 7/2003 | Nagao et al. |
| 6,590,794 B1 | 7/2003 | Carter |
| 6,593,520 B2 | 7/2003 | Kondo et al. |
| 6,593,521 B2 | 7/2003 | Kobayashi |
| 6,600,100 B2 | 7/2003 | Ho et al. |
| 6,603,672 B1 | 8/2003 | Deng et al. |
| 6,608,468 B2 | 8/2003 | Nagase |
| 6,611,130 B2 | 8/2003 | Chang |
| 6,611,441 B2 | 8/2003 | Kurokami et al. |
| 6,628,011 B2 | 9/2003 | Droppo et al. |
| 6,633,824 B2 | 10/2003 | Dollar, II |
| 6,636,431 B2 | 10/2003 | Seki et al. |
| 6,650,031 B1 | 11/2003 | Goldack |
| 6,650,560 B2 | 11/2003 | MacDonald et al. |
| 6,653,549 B2 | 11/2003 | Matsushita et al. |
| 6,655,987 B2 | 12/2003 | Higashikozono et al. |
| 6,657,419 B2 | 12/2003 | Renyolds |
| 6,664,762 B2 | 12/2003 | Kutkut |
| 6,672,018 B2 | 1/2004 | Shingleton |
| 6,678,174 B2 | 1/2004 | Suzui et al. |
| 6,690,590 B2 | 2/2004 | Stamenic et al. |
| 6,693,327 B2 | 2/2004 | Priefert et al. |
| 6,693,781 B1 | 2/2004 | Kroker |
| 6,708,507 B1 | 3/2004 | Sem et al. |
| 6,709,291 B1 | 3/2004 | Wallace et al. |
| 6,724,593 B1 | 4/2004 | Smith |
| 6,731,136 B2 | 5/2004 | Knee |
| 6,738,692 B2 | 5/2004 | Schienbein et al. |
| 6,744,643 B2 | 6/2004 | Luo et al. |
| 6,750,391 B2 | 6/2004 | Bower et al. |
| 6,765,315 B2 | 7/2004 | Hammerstrom et al. |
| 6,768,047 B2 | 7/2004 | Chang et al. |
| 6,768,180 B2 | 7/2004 | Salama et al. |
| 6,788,033 B2 | 9/2004 | Vinciarelli |
| 6,788,146 B2 | 9/2004 | Forejt et al. |
| 6,795,318 B2 | 9/2004 | Haas et al. |
| 6,800,964 B2 | 10/2004 | Beck |
| 6,801,442 B2 | 10/2004 | Suzui et al. |
| 6,807,069 B2 | 10/2004 | Nieminen et al. |
| 6,809,942 B2 | 10/2004 | Madenokouji et al. |
| 6,810,339 B2 | 10/2004 | Wills |
| 6,812,396 B2 | 11/2004 | Makita et al. |
| 6,828,503 B2 | 12/2004 | Yoshikawa et al. |
| 6,828,901 B2 | 12/2004 | Birchfield et al. |
| 6,835,491 B2 | 12/2004 | Gartstein et al. |
| 6,837,739 B2 | 1/2005 | Gorringe et al. |
| 6,838,611 B2 | 1/2005 | Kondo et al. |
| 6,838,856 B2 | 1/2005 | Raichle |
| 6,842,354 B1 | 1/2005 | Tallam et al. |
| 6,844,739 B2 | 1/2005 | Kasai et al. |
| 6,850,074 B2 | 2/2005 | Adams et al. |
| 6,856,102 B1 | 2/2005 | Lin et al. |
| 6,882,131 B1 | 4/2005 | Takada et al. |
| 6,888,728 B2 | 5/2005 | Takagi et al. |
| 6,894,911 B2 | 5/2005 | Telefus et al. |
| 6,897,370 B2 | 5/2005 | Kondo et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,933,714 B2 | 8/2005 | Fasshauer et al. |
| 6,936,995 B2 | 8/2005 | Kapsokavathis et al. |
| 6,940,735 B2 | 9/2005 | Deng et al. |
| 6,949,843 B2 | 9/2005 | Dubovsky |
| 6,950,323 B2 | 9/2005 | Achleitner et al. |
| 6,963,147 B2 | 11/2005 | Kurokami et al. |
| 6,966,184 B2 | 11/2005 | Toyomura et al. |
| 6,970,365 B2 | 11/2005 | Turchi |
| 6,980,783 B2 | 12/2005 | Liu et al. |
| 6,984,967 B2 | 1/2006 | Notman |
| 6,984,970 B2 | 1/2006 | Capel |
| 6,985,967 B1 | 1/2006 | Hipp |
| 6,987,444 B2 | 1/2006 | Bub et al. |
| 6,996,741 B1 | 2/2006 | Pittelkow et al. |
| 7,030,597 B2 | 4/2006 | Bruno et al. |
| 7,031,176 B2 | 4/2006 | Kotsopoulos et al. |
| 7,038,430 B2 | 5/2006 | Itabashi et al. |
| 7,039,941 B1 | 5/2006 | Caporizzo et al. |
| 7,042,195 B2 | 5/2006 | Tsunetsugu et al. |
| 7,045,991 B2 | 5/2006 | Nakamura et al. |
| 7,046,531 B2 | 5/2006 | Zocchi et al. |
| 7,053,506 B2 | 5/2006 | Alonso et al. |
| 7,061,211 B2 | 6/2006 | Satoh et al. |
| 7,061,214 B2 | 6/2006 | Mayega et al. |
| 7,064,967 B2 | 6/2006 | Ichinose et al. |
| 7,068,017 B2 | 6/2006 | Willner et al. |
| 7,072,194 B2 | 7/2006 | Nayar et al. |
| 7,078,883 B2 | 7/2006 | Chapman et al. |
| 7,079,406 B2 | 7/2006 | Kurokami et al. |
| 7,087,332 B2 | 8/2006 | Harris |
| 7,088,595 B2 | 8/2006 | Nino |
| 7,089,780 B2 | 8/2006 | Sunshine et al. |
| 7,090,509 B1 | 8/2006 | Gilliland et al. |
| 7,091,707 B2 | 8/2006 | Cutler |
| 7,097,516 B2 | 8/2006 | Werner et al. |
| 7,099,169 B2 | 8/2006 | West et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,142,997 B1 | 11/2006 | Widner |
| 7,148,669 B2 | 12/2006 | Maksimovic et al. |
| 7,150,938 B2 | 12/2006 | Munshi et al. |
| 7,157,888 B2 | 1/2007 | Chen et al. |
| 7,158,359 B2 | 1/2007 | Bertele et al. |
| 7,158,395 B2 | 1/2007 | Deng et al. |
| 7,161,082 B2 | 1/2007 | Matsushita et al. |
| 7,174,973 B1 | 2/2007 | Lysaght |
| 7,176,667 B2 | 2/2007 | Chen et al. |
| 7,183,667 B2 | 2/2007 | Colby et al. |
| 7,193,872 B2 | 3/2007 | Siri |
| 7,202,653 B2 | 4/2007 | Pai |
| 7,208,674 B2 | 4/2007 | Aylaian |
| 7,218,541 B2 | 5/2007 | Price et al. |
| 7,248,946 B2 | 7/2007 | Bashaw et al. |
| 7,256,566 B2 | 8/2007 | Bhavaraju et al. |
| 7,259,474 B2 | 8/2007 | Blanc |
| 7,262,979 B2 | 8/2007 | Wai et al. |
| 7,276,886 B2 | 10/2007 | Kinder et al. |
| 7,277,304 B2 | 10/2007 | Stancu et al. |
| 7,281,141 B2 | 10/2007 | Elkayam et al. |
| 7,282,814 B2 | 10/2007 | Jacobs |
| 7,282,924 B2 | 10/2007 | Wittner |
| 7,291,036 B1 | 11/2007 | Daily et al. |
| 7,298,113 B2 | 11/2007 | Orikasa |
| RE39,976 E | 1/2008 | Schiff et al. |
| 7,315,052 B2 | 1/2008 | Alter |
| 7,319,313 B2 | 1/2008 | Dickerson et al. |
| 7,324,361 B2 | 1/2008 | Siri |
| 7,336,004 B2 | 2/2008 | Lai |

(56) References Cited

U.S. PATENT DOCUMENTS

| | | | |
|---|---|---|---|
| 7,336,056 B1 | 2/2008 | Dening | |
| 7,339,287 B2 | 3/2008 | Jepsen et al. | |
| 7,348,802 B2 | 3/2008 | Kasanyal et al. | |
| 7,352,154 B2 | 4/2008 | Cook | |
| 7,361,952 B2 | 4/2008 | Miura et al. | |
| 7,371,963 B2 | 5/2008 | Suenaga et al. | |
| 7,372,712 B2 | 5/2008 | Stancu et al. | |
| 7,385,380 B2 | 6/2008 | Ishigaki et al. | |
| 7,385,833 B2 | 6/2008 | Keung | |
| 7,388,348 B2 | 6/2008 | Mattichak | |
| 7,391,190 B1 | 6/2008 | Rajagopalan | |
| 7,394,237 B2 | 7/2008 | Chou et al. | |
| 7,405,117 B2 | 7/2008 | Zuniga et al. | |
| 7,414,870 B2 | 8/2008 | Rottger et al. | |
| 7,420,354 B2 | 9/2008 | Cutler | |
| 7,420,815 B2 | 9/2008 | Love | |
| 7,432,691 B2 | 10/2008 | Cutler | |
| 7,435,134 B2 | 10/2008 | Lenox | |
| 7,435,897 B2 | 10/2008 | Russell | |
| 7,443,052 B2 | 10/2008 | Wendt et al. | |
| 7,443,152 B2 | 10/2008 | Utsunomiya | |
| 7,450,401 B2 | 11/2008 | Tida | |
| 7,456,510 B2 | 11/2008 | Ito et al. | |
| 7,456,523 B2 | 11/2008 | Kobayashi | |
| 7,463,500 B2 | 12/2008 | West | |
| 7,466,566 B2 | 12/2008 | Fukumoto | |
| 7,471,014 B2 | 12/2008 | Lum et al. | |
| 7,471,524 B1 | 12/2008 | Batarseh et al. | |
| 7,479,774 B2 | 1/2009 | Wai et al. | |
| 7,482,238 B2 | 1/2009 | Sung | |
| 7,485,987 B2 | 2/2009 | Mori et al. | |
| 7,495,419 B1 | 2/2009 | Ju | |
| 7,504,811 B2 | 3/2009 | Watanabe et al. | |
| 7,518,346 B2 | 4/2009 | Prexl et al. | |
| 7,538,451 B2 | 5/2009 | Nomoto | |
| 7,560,915 B2 | 7/2009 | Ito et al. | |
| 7,589,437 B2 | 9/2009 | Henne et al. | |
| 7,595,616 B2 | 9/2009 | Prexl et al. | |
| 7,596,008 B2 | 9/2009 | Iwata et al. | |
| 7,599,200 B2 | 10/2009 | Tomonaga | |
| 7,600,349 B2 | 10/2009 | Liebendorfer | |
| 7,602,080 B1 | 10/2009 | Hadar et al. | |
| 7,602,626 B2 | 10/2009 | Iwata et al. | |
| 7,605,498 B2 | 10/2009 | Ledenev et al. | |
| 7,612,283 B2 | 11/2009 | Toyomura et al. | |
| 7,615,981 B2 | 11/2009 | Wong et al. | |
| 7,626,834 B2 | 12/2009 | Chisenga et al. | |
| 7,634,667 B2 | 12/2009 | Weaver et al. | |
| 7,646,116 B2 | 1/2010 | Batarseh et al. | |
| 7,649,434 B2 | 1/2010 | Xu et al. | |
| 7,659,701 B1 | 2/2010 | Metsker et al. | |
| 7,701,083 B2 | 4/2010 | Savage | |
| 7,709,727 B2 | 5/2010 | Roehrig et al. | |
| 7,719,140 B2 | 5/2010 | Ledenev et al. | |
| 7,723,865 B2 | 5/2010 | Kitanaka | |
| 7,733,069 B2 | 6/2010 | Toyomura et al. | |
| 7,748,175 B2 | 7/2010 | Liebendorfer | |
| 7,759,575 B2 | 7/2010 | Jones et al. | |
| 7,763,807 B2 | 7/2010 | Richter | |
| 7,772,716 B2 | 8/2010 | Shaver, II et al. | |
| 7,777,570 B2 | 8/2010 | Lai | |
| 7,780,472 B2 | 8/2010 | Lenox | |
| 7,782,031 B2 | 8/2010 | Qiu et al. | |
| 7,783,389 B2 | 8/2010 | Yamada et al. | |
| 7,787,273 B2 | 8/2010 | Lu et al. | |
| 7,804,282 B2 | 9/2010 | Bertele | |
| 7,807,919 B2 | 10/2010 | Powell et al. | |
| 7,808,125 B1 | 10/2010 | Sachdeva et al. | |
| 7,812,592 B2 | 10/2010 | Prior et al. | |
| 7,812,701 B2 | 10/2010 | Lee et al. | |
| 7,821,225 B2 | 10/2010 | Chou et al. | |
| 7,824,189 B1 | 11/2010 | Lauermann et al. | |
| 7,839,022 B2 | 11/2010 | Wolfs | |
| 7,843,085 B2 | 11/2010 | Ledenev et al. | |
| 7,864,497 B2 | 1/2011 | Quardt et al. | |
| 7,868,599 B2 | 1/2011 | Rahman et al. | |
| 7,880,334 B2 | 2/2011 | Evans et al. | |
| 7,883,808 B2 | 2/2011 | Norimatsu et al. | |
| 7,884,278 B2 | 2/2011 | Powell et al. | |
| 7,893,346 B2 | 2/2011 | Nachamkin et al. | |
| 7,898,112 B2 | 3/2011 | Powell et al. | |
| 7,900,361 B2 | 3/2011 | Adest et al. | |
| 7,906,007 B2 | 3/2011 | Gibson et al. | |
| 7,906,870 B2 | 3/2011 | Ohm | |
| 7,919,952 B1 | 4/2011 | Fahrenbruch | |
| 7,919,953 B2 | 4/2011 | Porter et al. | |
| 7,925,552 B2 | 4/2011 | Tarbell et al. | |
| 7,944,191 B2 | 5/2011 | Xu | |
| 7,945,413 B2 | 5/2011 | Krein | |
| 7,948,221 B2 | 5/2011 | Watanabe et al. | |
| 7,952,897 B2 | 5/2011 | Nocentini et al. | |
| 7,960,650 B2 | 6/2011 | Richter et al. | |
| 7,960,950 B2 | 6/2011 | Glovinsky | |
| 7,962,249 B1 | 6/2011 | Zhang et al. | |
| 7,969,043 B2 | 6/2011 | Caraghiorghiopol et al. | |
| 7,969,133 B2 | 6/2011 | Zhang et al. | |
| 7,977,810 B2 | 7/2011 | Choi et al. | |
| 8,003,885 B2 | 8/2011 | Richter et al. | |
| 8,004,113 B2 | 8/2011 | Sander et al. | |
| 8,004,116 B2 | 8/2011 | Ledenev et al. | |
| 8,004,117 B2 | 8/2011 | Adest et al. | |
| 8,004,237 B2 | 8/2011 | Manor et al. | |
| 8,004,866 B2 | 8/2011 | Bucella et al. | |
| 8,013,472 B2 | 9/2011 | Adest et al. | |
| 8,018,748 B2 | 9/2011 | Leonard | |
| 8,035,249 B2 | 10/2011 | Shaver, II et al. | |
| 8,039,730 B2 | 10/2011 | Hadar et al. | |
| 8,049,363 B2 | 11/2011 | McLean et al. | |
| 8,050,804 B2 | 11/2011 | Kernahan | |
| 8,058,747 B2 | 11/2011 | Avrutsky et al. | |
| 8,058,752 B2 | 11/2011 | Erickson, Jr. et al. | |
| 8,067,855 B2 | 11/2011 | Mumtaz et al. | |
| 8,077,437 B2 | 12/2011 | Mumtaz et al. | |
| 8,080,986 B2 | 12/2011 | Lai et al. | |
| 8,089,780 B2 | 1/2012 | Mochikawa et al. | |
| 8,089,785 B2 | 1/2012 | Rodriguez | |
| 8,090,548 B2 | 1/2012 | Abdennadher et al. | |
| 8,093,756 B2 | 1/2012 | Porter et al. | |
| 8,093,757 B2 | 1/2012 | Wolfs | |
| 8,097,818 B2 | 1/2012 | Gerull et al. | |
| 8,098,055 B2 | 1/2012 | Avrutsky et al. | |
| 8,102,074 B2 | 1/2012 | Hadar et al. | |
| 8,102,144 B2 | 1/2012 | Capp et al. | |
| 8,111,052 B2 | 2/2012 | Glovinsky | |
| 8,116,103 B2 | 2/2012 | Zacharias et al. | |
| 8,138,631 B2 | 3/2012 | Allen et al. | |
| 8,138,914 B2 | 3/2012 | Wong et al. | |
| 8,139,335 B2 | 3/2012 | Quardt et al. | |
| 8,139,382 B2 * | 3/2012 | Zhang | G05F 1/67 363/71 |
| 8,148,849 B2 | 4/2012 | Zanarini et al. | |
| 8,158,877 B2 | 4/2012 | Klein et al. | |
| 8,169,252 B2 | 5/2012 | Fahrenbruch et al. | |
| 8,179,147 B2 | 5/2012 | Dargatz et al. | |
| 8,184,460 B2 | 5/2012 | O'Brien et al. | |
| 8,188,610 B2 | 5/2012 | Scholte-Wassink | |
| 8,204,709 B2 | 6/2012 | Presher, Jr. et al. | |
| 8,212,408 B2 | 7/2012 | Fishman | |
| 8,212,409 B2 | 7/2012 | Bettenwort et al. | |
| 8,232,790 B2 | 7/2012 | Leong et al. | |
| 8,233,301 B1 | 7/2012 | Guo | |
| 8,248,804 B2 | 8/2012 | Han et al. | |
| 8,271,599 B2 | 9/2012 | Eizips et al. | |
| 8,274,172 B2 | 9/2012 | Hadar et al. | |
| 8,279,644 B2 | 10/2012 | Zhang et al. | |
| 8,284,574 B2 | 10/2012 | Chapman et al. | |
| 8,289,183 B1 | 10/2012 | Foss | |
| 8,289,742 B2 | 10/2012 | Adest et al. | |
| 8,294,451 B2 | 10/2012 | Hasenfus | |
| 8,299,757 B2 | 10/2012 | Yamauchi et al. | |
| 8,299,773 B2 | 10/2012 | Jang et al. | |
| 8,304,932 B2 | 11/2012 | Ledenev et al. | |
| 8,310,101 B2 | 11/2012 | Amaratunga et al. | |
| 8,310,102 B2 | 11/2012 | Raju | |

(56) References Cited

U.S. PATENT DOCUMENTS

| 8,314,375 | B2 | 11/2012 | Arditi et al. |
| 8,319,471 | B2 | 11/2012 | Adest et al. |
| 8,324,921 | B2 | 12/2012 | Adest et al. |
| 8,325,059 | B2 | 12/2012 | Rozenboim |
| 8,344,548 | B2 | 1/2013 | Stern |
| 8,355,563 | B2 | 1/2013 | Kasahara et al. |
| 8,369,113 | B2 | 2/2013 | Rodriguez |
| 8,378,656 | B2 | 2/2013 | de Rooij et al. |
| 8,379,418 | B2 | 2/2013 | Falk |
| 8,391,031 | B2 | 3/2013 | Garrity |
| 8,391,032 | B2 | 3/2013 | Garrity et al. |
| 8,395,366 | B2 | 3/2013 | Uno |
| 8,405,248 | B2 | 3/2013 | Mumtaz et al. |
| 8,405,349 | B2 | 3/2013 | Kikinis et al. |
| 8,405,367 | B2 | 3/2013 | Chisenga et al. |
| 8,410,359 | B2 | 4/2013 | Richter |
| 8,410,889 | B2 | 4/2013 | Garrity et al. |
| 8,410,950 | B2 | 4/2013 | Takehara et al. |
| 8,415,552 | B2 | 4/2013 | Hadar et al. |
| 8,415,937 | B2 | 4/2013 | Hester |
| 8,427,009 | B2 | 4/2013 | Shaver, II et al. |
| 8,436,592 | B2 | 5/2013 | Saitoh |
| 8,461,809 | B2 | 6/2013 | Rodriguez |
| 8,466,789 | B2 | 6/2013 | Muhlberger et al. |
| 8,472,220 | B2 | 6/2013 | Garrity et al. |
| 8,473,250 | B2 | 6/2013 | Adest et al. |
| 8,509,032 | B2 | 8/2013 | Rakib |
| 8,526,205 | B2 | 9/2013 | Garrity |
| 8,531,055 | B2 | 9/2013 | Adest et al. |
| 8,542,512 | B2 | 9/2013 | Garrity |
| 8,570,017 | B2 | 10/2013 | Perichon et al. |
| 8,581,441 | B2 | 11/2013 | Rotzoll et al. |
| 8,587,151 | B2 | 11/2013 | Adest et al. |
| 8,618,692 | B2 | 12/2013 | Adest et al. |
| 8,624,443 | B2 | 1/2014 | Mumtaz |
| 8,653,689 | B2 | 2/2014 | Rozenboim |
| 8,669,675 | B2 | 3/2014 | Capp et al. |
| 8,670,255 | B2 | 3/2014 | Gong et al. |
| 8,674,548 | B2 | 3/2014 | Mumtaz |
| 8,674,668 | B2 | 3/2014 | Chisenga et al. |
| 8,686,333 | B2 | 4/2014 | Arditi et al. |
| 8,710,351 | B2 | 4/2014 | Robbins |
| 8,751,053 | B2 | 6/2014 | Hadar et al. |
| 8,773,236 | B2 | 7/2014 | Makhota et al. |
| 8,791,598 | B2 | 7/2014 | Jain |
| 8,796,884 | B2 | 8/2014 | Naiknaware et al. |
| 8,809,699 | B2 | 8/2014 | Funk |
| 8,811,047 | B2 | 8/2014 | Rodriguez |
| 8,816,535 | B2 | 8/2014 | Adest et al. |
| 8,823,212 | B2 | 9/2014 | Garrity et al. |
| 8,823,218 | B2 | 9/2014 | Hadar et al. |
| 8,823,342 | B2 | 9/2014 | Williams |
| 8,835,748 | B2 | 9/2014 | Frolov et al. |
| 8,841,916 | B2 | 9/2014 | Avrutsky |
| 8,842,397 | B2 | 9/2014 | Fahrenbruch et al. |
| 8,853,886 | B2 | 10/2014 | Avrutsky et al. |
| 8,854,193 | B2 | 10/2014 | Makhota et al. |
| 8,859,884 | B2 | 10/2014 | Dunton et al. |
| 8,860,241 | B2 | 10/2014 | Hadar et al. |
| 8,860,246 | B2 | 10/2014 | Hadar et al. |
| 8,872,439 | B2 | 10/2014 | Cohen |
| 8,878,563 | B2 | 11/2014 | Robbins |
| 8,917,156 | B2 | 12/2014 | Garrity et al. |
| 8,922,061 | B2 | 12/2014 | Arditi |
| 8,933,321 | B2 | 1/2015 | Hadar et al. |
| 8,934,269 | B2 | 1/2015 | Garrity |
| 8,947,194 | B2 | 2/2015 | Sella et al. |
| 8,963,375 | B2 | 2/2015 | DeGraaff |
| 8,963,378 | B1 | 2/2015 | Fornage et al. |
| 8,963,501 | B2 | 2/2015 | Shigemizu et al. |
| 8,963,518 | B2 | 2/2015 | Wolfs |
| 8,972,765 | B1 | 3/2015 | Krolak et al. |
| 9,010,645 | B2 | 4/2015 | Arnouse |
| 9,041,339 | B2 | 5/2015 | Adest et al. |
| 9,088,178 | B2 | 7/2015 | Adest et al. |
| 9,130,401 | B2 | 9/2015 | Adest et al. |
| 9,142,965 | B2 | 9/2015 | Grana |
| 9,257,848 | B2 | 2/2016 | Coccia et al. |
| 9,291,696 | B2 | 3/2016 | Adest et al. |
| 9,362,743 | B2 | 6/2016 | Gazit et al. |
| 9,397,497 | B2 | 7/2016 | Ledenev |
| 9,401,664 | B2 | 7/2016 | Perreault et al. |
| 9,407,161 | B2 | 8/2016 | Adest et al. |
| 9,466,737 | B2 | 10/2016 | Ledenev |
| 9,577,454 | B2 | 2/2017 | Seymour et al. |
| 9,647,442 | B2 | 5/2017 | Yoscovich et al. |
| 9,660,527 | B2 | 5/2017 | Glovinski |
| 9,673,630 | B2 | 6/2017 | Ledenev et al. |
| 9,819,178 | B2 | 11/2017 | Gazit et al. |
| 9,831,916 | B2 | 11/2017 | Behrends |
| 9,843,193 | B2 | 12/2017 | Getsla |
| 9,853,490 | B2 | 12/2017 | Adest et al. |
| 9,865,411 | B2 | 1/2018 | Friebe et al. |
| 9,869,701 | B2 | 1/2018 | Sella et al. |
| 9,923,516 | B2 | 3/2018 | Har-Shai et al. |
| 9,991,717 | B1 | 6/2018 | Rowe et al. |
| 9,995,796 | B1 | 6/2018 | Johnson |
| 10,032,939 | B2 | 7/2018 | Ledenev et al. |
| 10,256,770 | B2 | 4/2019 | Hadar et al. |
| 10,432,139 | B2 | 10/2019 | Chaintreuil et al. |
| 10,457,159 | B1 | 10/2019 | Castelaz et al. |
| 10,666,045 | B2 | 5/2020 | Gemin et al. |
| 10,673,253 | B2 | 6/2020 | Adest et al. |
| 10,931,119 | B2 | 2/2021 | Har-Shai et al. |
| 10,969,412 | B2 | 4/2021 | Sella et al. |
| 11,018,623 | B2 | 5/2021 | Loewenstern et al. |
| 11,205,946 | B2 | 12/2021 | Yoscovich et al. |
| 11,276,786 | B2 | 3/2022 | Hopf et al. |
| 11,476,799 | B2 | 10/2022 | Sella et al. |
| 11,682,918 | B2 | 6/2023 | Adest et al. |
| 11,728,724 | B2 | 8/2023 | Braginsky et al. |
| 2001/0000957 | A1 | 5/2001 | Birchfield et al. |
| 2001/0011881 | A1 | 8/2001 | Emori et al. |
| 2001/0013767 | A1 | 8/2001 | Takemoto |
| 2001/0023703 | A1 | 9/2001 | Kondo et al. |
| 2001/0032664 | A1 | 10/2001 | Takehara et al. |
| 2001/0034982 | A1 | 11/2001 | Nagao et al. |
| 2001/0035180 | A1 | 11/2001 | Kimura et al. |
| 2001/0048605 | A1 | 12/2001 | Kurokami et al. |
| 2001/0050102 | A1 | 12/2001 | Matsumi et al. |
| 2001/0054881 | A1 | 12/2001 | Watanabe |
| 2002/0002040 | A1 | 1/2002 | Kline et al. |
| 2002/0014262 | A1 | 2/2002 | Matsushita et al. |
| 2002/0017900 | A1 | 2/2002 | Takeda et al. |
| 2002/0034083 | A1 | 3/2002 | Ayyanar et al. |
| 2002/0038667 | A1 | 4/2002 | Kondo et al. |
| 2002/0041505 | A1 | 4/2002 | Suzui et al. |
| 2002/0044473 | A1 | 4/2002 | Toyomura et al. |
| 2002/0047309 | A1 | 4/2002 | Droppo et al. |
| 2002/0047693 | A1 | 4/2002 | Chang |
| 2002/0056089 | A1 | 5/2002 | Houston |
| 2002/0059035 | A1 | 5/2002 | Yagi et al. |
| 2002/0063552 | A1 | 5/2002 | Arakawa |
| 2002/0063625 | A1 | 5/2002 | Takehara et al. |
| 2002/0078991 | A1 | 6/2002 | Nagao et al. |
| 2002/0080027 | A1 | 6/2002 | Conley |
| 2002/0085397 | A1 | 7/2002 | Suzui et al. |
| 2002/0105765 | A1 | 8/2002 | Kondo et al. |
| 2002/0113689 | A1 | 8/2002 | Gehlot et al. |
| 2002/0118559 | A1 | 8/2002 | Kurokami et al. |
| 2002/0127980 | A1 | 9/2002 | Amanullah et al. |
| 2002/0134567 | A1 | 9/2002 | Rasmussen et al. |
| 2002/0148497 | A1 | 10/2002 | Sasaoka et al. |
| 2002/0149950 | A1 | 10/2002 | Takebayashi |
| 2002/0162585 | A1 | 11/2002 | Sugawara et al. |
| 2002/0165458 | A1 | 11/2002 | Carter et al. |
| 2002/0177401 | A1 | 11/2002 | Judd et al. |
| 2002/0179140 | A1 | 12/2002 | Toyomura |
| 2002/0180408 | A1 | 12/2002 | McDaniel et al. |
| 2002/0190696 | A1 | 12/2002 | Darshan |
| 2003/0001709 | A1 | 1/2003 | Visser |
| 2003/0002303 | A1 | 1/2003 | Riggio et al. |
| 2003/0025594 | A1 | 2/2003 | Akiyama et al. |
| 2003/0038615 | A1 | 2/2003 | Elbanhawy |

(56) References Cited

U.S. PATENT DOCUMENTS

| | | |
|---|---|---|
| 2003/0043597 A1 | 3/2003 | Betts-Lacroix |
| 2003/0047207 A1 | 3/2003 | Aylaian |
| 2003/0058593 A1 | 3/2003 | Bertele et al. |
| 2003/0058662 A1 | 3/2003 | Baudelot et al. |
| 2003/0062078 A1 | 4/2003 | Mimura |
| 2003/0066076 A1 | 4/2003 | Minahan |
| 2003/0066555 A1 | 4/2003 | Hui et al. |
| 2003/0075211 A1 | 4/2003 | Makita et al. |
| 2003/0080741 A1 | 5/2003 | LeRow et al. |
| 2003/0085621 A1 | 5/2003 | Potega |
| 2003/0090233 A1 | 5/2003 | Browe |
| 2003/0090246 A1 | 5/2003 | Shenai et al. |
| 2003/0094931 A1 | 5/2003 | Renyolds |
| 2003/0098056 A1 | 5/2003 | Fronek et al. |
| 2003/0107352 A1 | 6/2003 | Downer et al. |
| 2003/0111103 A1 | 6/2003 | Bower et al. |
| 2003/0116154 A1 | 6/2003 | Butler et al. |
| 2003/0121514 A1 | 7/2003 | Davenport et al. |
| 2003/0127126 A1 | 7/2003 | Yang |
| 2003/0140960 A1 | 7/2003 | Baum et al. |
| 2003/0156439 A1 | 8/2003 | Ohmichi et al. |
| 2003/0164695 A1 | 9/2003 | Fasshauer et al. |
| 2003/0185026 A1 | 10/2003 | Matsuda et al. |
| 2003/0193821 A1 | 10/2003 | Krieger et al. |
| 2003/0201674 A1 | 10/2003 | Droppo et al. |
| 2003/0206424 A1 | 11/2003 | Jungreis et al. |
| 2003/0214274 A1 | 11/2003 | Lethellier |
| 2003/0223257 A1 | 12/2003 | Onoe |
| 2004/0004402 A1 | 1/2004 | Kippley |
| 2004/0027101 A1 | 2/2004 | Vinciarelli et al. |
| 2004/0027112 A1 | 2/2004 | Kondo et al. |
| 2004/0041548 A1 | 3/2004 | Perry |
| 2004/0056642 A1 | 3/2004 | Nebrigic et al. |
| 2004/0056768 A1 | 3/2004 | Matsushita et al. |
| 2004/0061527 A1 | 4/2004 | Knee |
| 2004/0076028 A1 | 4/2004 | Achleitner et al. |
| 2004/0117676 A1 | 6/2004 | Kobayashi et al. |
| 2004/0118446 A1 | 6/2004 | Toyomura |
| 2004/0123894 A1 | 7/2004 | Erban |
| 2004/0124816 A1 | 7/2004 | DeLepaut |
| 2004/0125618 A1 | 7/2004 | De Rooij et al. |
| 2004/0140719 A1 | 7/2004 | Vulih et al. |
| 2004/0141345 A1 | 7/2004 | Cheng et al. |
| 2004/0144043 A1 | 7/2004 | Stevenson et al. |
| 2004/0150410 A1 | 8/2004 | Schoepf et al. |
| 2004/0164718 A1 | 8/2004 | McDaniel et al. |
| 2004/0165408 A1 | 8/2004 | West et al. |
| 2004/0167676 A1 | 8/2004 | Mizumaki |
| 2004/0169499 A1 | 9/2004 | Huang et al. |
| 2004/0170038 A1 | 9/2004 | Ichinose et al. |
| 2004/0189090 A1 | 9/2004 | Yanagida et al. |
| 2004/0189432 A1 | 9/2004 | Yan et al. |
| 2004/0201279 A1 | 10/2004 | Templeton |
| 2004/0201933 A1 | 10/2004 | Blanc |
| 2004/0207366 A1 | 10/2004 | Sung |
| 2004/0211456 A1 | 10/2004 | Brown et al. |
| 2004/0211458 A1 | 10/2004 | Gui et al. |
| 2004/0211459 A1 | 10/2004 | Suenaga et al. |
| 2004/0213169 A1 | 10/2004 | Allard et al. |
| 2004/0223351 A1 | 11/2004 | Kurokami et al. |
| 2004/0230343 A1 | 11/2004 | Zalesski |
| 2004/0233685 A1 | 11/2004 | Matsuo et al. |
| 2004/0246226 A1 | 12/2004 | Moon |
| 2004/0255999 A1 | 12/2004 | Matsushita et al. |
| 2004/0258141 A1 | 12/2004 | Tustison et al. |
| 2004/0262998 A1 | 12/2004 | Kunow et al. |
| 2004/0263119 A1 | 12/2004 | Meyer et al. |
| 2004/0263183 A1 | 12/2004 | Naidu et al. |
| 2004/0264225 A1 | 12/2004 | Bhavaraju et al. |
| 2005/0002214 A1 | 1/2005 | Deng et al. |
| 2005/0005785 A1 | 1/2005 | Poss et al. |
| 2005/0006958 A1 | 1/2005 | Dubovsky |
| 2005/0017697 A1 | 1/2005 | Capel |
| 2005/0017701 A1 | 1/2005 | Hsu |
| 2005/0030772 A1 | 2/2005 | Phadke |
| 2005/0040800 A1 | 2/2005 | Sutardja |
| 2005/0041442 A1 | 2/2005 | Balakrishnan |
| 2005/0057214 A1 | 3/2005 | Matan |
| 2005/0057215 A1 | 3/2005 | Matan |
| 2005/0068012 A1 | 3/2005 | Cutler |
| 2005/0068820 A1 | 3/2005 | Radosevich et al. |
| 2005/0077879 A1 | 4/2005 | Near |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0105306 A1 | 5/2005 | Deng et al. |
| 2005/0109386 A1 | 5/2005 | Marshall |
| 2005/0110454 A1 | 5/2005 | Tsai et al. |
| 2005/0121067 A1 | 6/2005 | Toyomura et al. |
| 2005/0122747 A1 | 6/2005 | Gaksch |
| 2005/0135031 A1 | 6/2005 | Colby et al. |
| 2005/0139258 A1 | 6/2005 | Liu et al. |
| 2005/0140335 A1 | 6/2005 | Lee et al. |
| 2005/0162018 A1 | 7/2005 | Realmuto et al. |
| 2005/0163063 A1 | 7/2005 | Kuchler et al. |
| 2005/0172995 A1 | 8/2005 | Rohrig et al. |
| 2005/0179420 A1 | 8/2005 | Satoh et al. |
| 2005/0191528 A1 | 9/2005 | Cortes et al. |
| 2005/0194937 A1 | 9/2005 | Jacobs |
| 2005/0201397 A1 | 9/2005 | Petite |
| 2005/0213272 A1 | 9/2005 | Kobayashi |
| 2005/0218876 A1 | 10/2005 | Nino |
| 2005/0225090 A1 | 10/2005 | Wobben |
| 2005/0226017 A1 | 10/2005 | Kotsopoulos et al. |
| 2005/0231183 A1 | 10/2005 | Li et al. |
| 2005/0242795 A1 | 11/2005 | Al-Kuran et al. |
| 2005/0248428 A1 | 11/2005 | Coleman et al. |
| 2005/0252545 A1 | 11/2005 | Nowlan et al. |
| 2005/0257827 A1 | 11/2005 | Gaudiana et al. |
| 2005/0269988 A1 | 12/2005 | Thrap |
| 2005/0275386 A1 | 12/2005 | Jepsen et al. |
| 2005/0275527 A1 | 12/2005 | Kates |
| 2005/0275979 A1 | 12/2005 | Xu |
| 2005/0281064 A1 | 12/2005 | Olsen et al. |
| 2005/0286510 A1 | 12/2005 | Nakajima et al. |
| 2005/0287402 A1 | 12/2005 | Maly et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0043792 A1 | 3/2006 | Hjort et al. |
| 2006/0043942 A1 | 3/2006 | Cohen |
| 2006/0053447 A1 | 3/2006 | Krzyzanowski et al. |
| 2006/0055384 A1 | 3/2006 | Jordan et al. |
| 2006/0066349 A1 | 3/2006 | Murakami |
| 2006/0068239 A1 | 3/2006 | Norimatsu et al. |
| 2006/0077046 A1 | 4/2006 | Endo |
| 2006/0085167 A1 | 4/2006 | Warfield et al. |
| 2006/0091958 A1 | 5/2006 | Bhatti et al. |
| 2006/0103360 A9 | 5/2006 | Cutler |
| 2006/0108979 A1 | 5/2006 | Daniel et al. |
| 2006/0109009 A1 | 5/2006 | Banke et al. |
| 2006/0113843 A1 | 6/2006 | Beveridge |
| 2006/0113979 A1 | 6/2006 | Ishigaki et al. |
| 2006/0116968 A1 | 6/2006 | Arisawa |
| 2006/0118162 A1 | 6/2006 | Saelzer et al. |
| 2006/0125449 A1 | 6/2006 | Unger |
| 2006/0132102 A1 | 6/2006 | Harvey |
| 2006/0149396 A1 | 7/2006 | Templeton |
| 2006/0152085 A1 | 7/2006 | Flett et al. |
| 2006/0162772 A1 | 7/2006 | Presher et al. |
| 2006/0163946 A1 | 7/2006 | Henne et al. |
| 2006/0164065 A1 | 7/2006 | Hoouk et al. |
| 2006/0167762 A1 | 7/2006 | Hahn-Carlson |
| 2006/0171182 A1 | 8/2006 | Siri et al. |
| 2006/0174939 A1 | 8/2006 | Matan |
| 2006/0176029 A1 | 8/2006 | McGinty et al. |
| 2006/0176031 A1 | 8/2006 | Forman et al. |
| 2006/0176036 A1 | 8/2006 | Flatness et al. |
| 2006/0176716 A1 | 8/2006 | Balakrishnan et al. |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0222912 A1 | 10/2006 | Smith |

(56)        References Cited

U.S. PATENT DOCUMENTS

| | | |
|---|---|---|
| 2006/0222916 A1 | 10/2006 | Norimatsu et al. |
| 2006/0225781 A1 | 10/2006 | Locher |
| 2006/0227577 A1 | 10/2006 | Horiuchi et al. |
| 2006/0227578 A1 | 10/2006 | Datta et al. |
| 2006/0231132 A1 | 10/2006 | Neussner |
| 2006/0232220 A1 | 10/2006 | Melis |
| 2006/0235717 A1 | 10/2006 | Sharma et al. |
| 2006/0237058 A1 | 10/2006 | McClintock et al. |
| 2006/0238750 A1 | 10/2006 | Shimotomai |
| 2006/0243318 A1 | 11/2006 | Feldmeier et al. |
| 2006/0261751 A1 | 11/2006 | Okabe et al. |
| 2006/0266408 A1 | 11/2006 | Horne et al. |
| 2006/0267515 A1 | 11/2006 | Burke et al. |
| 2006/0290317 A1 | 12/2006 | McNulty et al. |
| 2007/0001653 A1 | 1/2007 | Xu |
| 2007/0013349 A1 | 1/2007 | Bassett |
| 2007/0019613 A1 | 1/2007 | Frezzolini |
| 2007/0024257 A1 | 2/2007 | Boldo |
| 2007/0027644 A1 | 2/2007 | Bettenwort et al. |
| 2007/0029468 A1 | 2/2007 | Sinton et al. |
| 2007/0029636 A1 | 2/2007 | Kanemaru et al. |
| 2007/0030068 A1 | 2/2007 | Motonobu et al. |
| 2007/0035975 A1 | 2/2007 | Dickerson et al. |
| 2007/0040540 A1 | 2/2007 | Cutler |
| 2007/0044837 A1 | 3/2007 | Simburger et al. |
| 2007/0075689 A1 | 4/2007 | Kinder et al. |
| 2007/0075711 A1 | 4/2007 | Blanc et al. |
| 2007/0081364 A1 | 4/2007 | Andreycak |
| 2007/0085523 A1 | 4/2007 | Scoones et al. |
| 2007/0089778 A1 | 4/2007 | Horne et al. |
| 2007/0103108 A1 | 5/2007 | Capp et al. |
| 2007/0103297 A1 | 5/2007 | Armstrong et al. |
| 2007/0107767 A1 | 5/2007 | Hayden et al. |
| 2007/0115635 A1 | 5/2007 | Low et al. |
| 2007/0119718 A1 | 5/2007 | Gibson et al. |
| 2007/0121648 A1 | 5/2007 | Hahn |
| 2007/0133241 A1 | 6/2007 | Mumtaz et al. |
| 2007/0133421 A1 | 6/2007 | Young |
| 2007/0147075 A1 | 6/2007 | Bang |
| 2007/0158185 A1 | 7/2007 | Andelman et al. |
| 2007/0159866 A1 | 7/2007 | Siri |
| 2007/0164612 A1 | 7/2007 | Wendt et al. |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0209656 A1 | 9/2007 | Lee |
| 2007/0211888 A1 | 9/2007 | Corcoran et al. |
| 2007/0217178 A1 | 9/2007 | Johnson et al. |
| 2007/0223165 A1 | 9/2007 | Itri et al. |
| 2007/0227574 A1 | 10/2007 | Cart |
| 2007/0235071 A1 | 10/2007 | Work et al. |
| 2007/0236187 A1 | 10/2007 | Wai et al. |
| 2007/0241720 A1 | 10/2007 | Sakamoto et al. |
| 2007/0246546 A1 | 10/2007 | Yoshida |
| 2007/0247135 A1 | 10/2007 | Koga |
| 2007/0247877 A1 | 10/2007 | Kwon et al. |
| 2007/0262802 A1 | 11/2007 | Huard et al. |
| 2007/0271006 A1 | 11/2007 | Golden et al. |
| 2007/0273240 A1 | 11/2007 | Steele et al. |
| 2007/0273339 A1 | 11/2007 | Haines |
| 2007/0273342 A1 | 11/2007 | Kataoka et al. |
| 2007/0273351 A1 | 11/2007 | Matan |
| 2007/0284451 A1 | 12/2007 | Uramoto |
| 2007/0290636 A1 | 12/2007 | Beck et al. |
| 2007/0290656 A1 | 12/2007 | Lee Tai Keung |
| 2008/0021707 A1 | 1/2008 | Bou-Ghazale et al. |
| 2008/0023061 A1 | 1/2008 | Clemens et al. |
| 2008/0024098 A1 | 1/2008 | Hojo |
| 2008/0030198 A1 | 2/2008 | Kawata et al. |
| 2008/0036440 A1 | 2/2008 | Garmer |
| 2008/0042709 A1 | 2/2008 | Chen et al. |
| 2008/0055941 A1 | 3/2008 | Victor et al. |
| 2008/0072091 A1 | 3/2008 | Hanson et al. |
| 2008/0080177 A1 | 4/2008 | Chang |
| 2008/0088184 A1 | 4/2008 | Tung et al. |
| 2008/0088829 A1 | 4/2008 | Fuyuki |
| 2008/0089277 A1 | 4/2008 | Alexander et al. |
| 2008/0097655 A1 | 4/2008 | Hadar et al. |
| 2008/0106250 A1 | 5/2008 | Prior et al. |
| 2008/0111529 A1 | 5/2008 | Shah et al. |
| 2008/0115823 A1 | 5/2008 | Kinsey |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0136367 A1 | 6/2008 | Adest et al. |
| 2008/0142071 A1 | 6/2008 | Dorn et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0149167 A1 | 6/2008 | Liu |
| 2008/0150366 A1 | 6/2008 | Adest et al. |
| 2008/0150484 A1 | 6/2008 | Kimball et al. |
| 2008/0156551 A1 | 7/2008 | Kawahara et al. |
| 2008/0164766 A1 | 7/2008 | Adest et al. |
| 2008/0179949 A1 | 7/2008 | Besser et al. |
| 2008/0186004 A1 | 8/2008 | Williams |
| 2008/0191560 A1 | 8/2008 | Besser et al. |
| 2008/0191675 A1 | 8/2008 | Besser et al. |
| 2008/0192510 A1 | 8/2008 | Falk |
| 2008/0192519 A1 | 8/2008 | Iwata et al. |
| 2008/0198523 A1 | 8/2008 | Schmidt et al. |
| 2008/0205096 A1 | 8/2008 | Lai et al. |
| 2008/0218152 A1 | 9/2008 | Bo |
| 2008/0224652 A1 | 9/2008 | Zhu et al. |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0238372 A1 | 10/2008 | Cintra et al. |
| 2008/0246460 A1 | 10/2008 | Smith |
| 2008/0246463 A1 | 10/2008 | Sinton et al. |
| 2008/0252273 A1 | 10/2008 | Woo et al. |
| 2008/0264470 A1 | 10/2008 | Masuda et al. |
| 2008/0266913 A1 | 10/2008 | Brotto et al. |
| 2008/0266919 A1 | 10/2008 | Mallwitz |
| 2008/0283118 A1 | 11/2008 | Rotzoll et al. |
| 2008/0291707 A1 | 11/2008 | Fang |
| 2008/0294472 A1 | 11/2008 | Yamada |
| 2008/0297963 A1 | 12/2008 | Lee et al. |
| 2008/0298608 A1 | 12/2008 | Wilcox |
| 2008/0303503 A1 | 12/2008 | Wolfs |
| 2008/0304296 A1 | 12/2008 | NadimpalliRaju et al. |
| 2008/0304298 A1 | 12/2008 | Toba et al. |
| 2009/0010035 A1 | 1/2009 | Williams |
| 2009/0012917 A1 | 1/2009 | Thompson et al. |
| 2009/0014050 A1 | 1/2009 | Haaf |
| 2009/0014057 A1 | 1/2009 | Croft et al. |
| 2009/0014058 A1 | 1/2009 | Croft et al. |
| 2009/0015071 A1 | 1/2009 | Iwata et al. |
| 2009/0020151 A1 | 1/2009 | Fornage |
| 2009/0021877 A1 | 1/2009 | Fornage et al. |
| 2009/0039833 A1 | 2/2009 | Kitagawa |
| 2009/0039852 A1 | 2/2009 | Fishelov et al. |
| 2009/0064252 A1 | 3/2009 | Howarter et al. |
| 2009/0066357 A1 | 3/2009 | Fornage |
| 2009/0066382 A1 | 3/2009 | Yousefzadeh et al. |
| 2009/0066399 A1 | 3/2009 | Chen et al. |
| 2009/0069950 A1 | 3/2009 | Kurokami et al. |
| 2009/0073726 A1 | 3/2009 | Babcock |
| 2009/0078300 A1 | 3/2009 | Ang et al. |
| 2009/0080226 A1 | 3/2009 | Fornage |
| 2009/0084570 A1 | 4/2009 | Gherardini et al. |
| 2009/0097172 A1 | 4/2009 | Bremicker et al. |
| 2009/0097283 A1 | 4/2009 | Krein et al. |
| 2009/0101191 A1 | 4/2009 | Beck et al. |
| 2009/0102440 A1 | 4/2009 | Coles |
| 2009/0114263 A1 | 5/2009 | Powell et al. |
| 2009/0120485 A1 | 5/2009 | Kikinis |
| 2009/0121549 A1 | 5/2009 | Leonard |
| 2009/0127448 A1 | 5/2009 | Fuyuki |
| 2009/0133736 A1 | 5/2009 | Powell et al. |
| 2009/0140715 A1 | 6/2009 | Adest et al. |
| 2009/0141522 A1 | 6/2009 | Adest et al. |
| 2009/0145480 A1 | 6/2009 | Adest et al. |

(56) References Cited

U.S. PATENT DOCUMENTS

| | | |
|---|---|---|
| 2009/0146667 A1 | 6/2009 | Adest et al. |
| 2009/0146671 A1 | 6/2009 | Gazit |
| 2009/0147554 A1 | 6/2009 | Adest et al. |
| 2009/0150005 A1 | 6/2009 | Hadar et al. |
| 2009/0160258 A1 | 6/2009 | Allen et al. |
| 2009/0179500 A1 | 7/2009 | Ragonese et al. |
| 2009/0179662 A1 | 7/2009 | Moulton et al. |
| 2009/0182532 A1 | 7/2009 | Stoeber et al. |
| 2009/0183763 A1 | 7/2009 | Meyer |
| 2009/0184746 A1 | 7/2009 | Fahrenbruch |
| 2009/0189456 A1 | 7/2009 | Skutt |
| 2009/0190275 A1 | 7/2009 | Gilmore et al. |
| 2009/0195081 A1 | 8/2009 | Quardt et al. |
| 2009/0206666 A1 | 8/2009 | Sella et al. |
| 2009/0207543 A1 | 8/2009 | Boniface et al. |
| 2009/0217965 A1 | 9/2009 | Dougal et al. |
| 2009/0224817 A1 | 9/2009 | Nakamura et al. |
| 2009/0234692 A1 | 9/2009 | Powell et al. |
| 2009/0237042 A1 | 9/2009 | Glovinski |
| 2009/0237043 A1 | 9/2009 | Glovinsky |
| 2009/0238444 A1 | 9/2009 | Su et al. |
| 2009/0242011 A1 | 10/2009 | Proisy et al. |
| 2009/0243385 A1 | 10/2009 | Ichikawa |
| 2009/0243547 A1 | 10/2009 | Andelfinger |
| 2009/0273241 A1 | 11/2009 | Gazit et al. |
| 2009/0278496 A1 | 11/2009 | Nakao et al. |
| 2009/0282755 A1 | 11/2009 | Abbott et al. |
| 2009/0283129 A1 | 11/2009 | Foss |
| 2009/0283130 A1 | 11/2009 | Gilmore et al. |
| 2009/0284078 A1 | 11/2009 | Zhang et al. |
| 2009/0284232 A1 | 11/2009 | Zhang et al. |
| 2009/0284240 A1 | 11/2009 | Zhang et al. |
| 2009/0284998 A1 | 11/2009 | Zhang et al. |
| 2009/0295225 A1 | 12/2009 | Asplund et al. |
| 2009/0296434 A1 | 12/2009 | De Rooij et al. |
| 2009/0322494 A1 | 12/2009 | Lee |
| 2009/0325003 A1 | 12/2009 | Aberle et al. |
| 2010/0001587 A1 | 1/2010 | Casey et al. |
| 2010/0002349 A1 | 1/2010 | La Scala et al. |
| 2010/0013452 A1 | 1/2010 | Tang et al. |
| 2010/0020576 A1 | 1/2010 | Falk |
| 2010/0026097 A1 | 2/2010 | Avrutsky et al. |
| 2010/0026736 A1 | 2/2010 | Plut |
| 2010/0038907 A1 | 2/2010 | Hunt et al. |
| 2010/0043781 A1 | 2/2010 | Jones et al. |
| 2010/0052735 A1 | 3/2010 | Burkland et al. |
| 2010/0057267 A1 | 3/2010 | Liu et al. |
| 2010/0060000 A1 | 3/2010 | Scholte-Wassink |
| 2010/0071742 A1 | 3/2010 | de Rooij et al. |
| 2010/0085670 A1 | 4/2010 | Palaniswami et al. |
| 2010/0103579 A1 | 4/2010 | Carkner et al. |
| 2010/0115093 A1 | 5/2010 | Rice |
| 2010/0124027 A1 | 5/2010 | Handelsman et al. |
| 2010/0124087 A1 | 5/2010 | Falk |
| 2010/0126550 A1 | 5/2010 | Foss |
| 2010/0127570 A1 | 5/2010 | Hadar et al. |
| 2010/0127571 A1 | 5/2010 | Hadar et al. |
| 2010/0131108 A1 | 5/2010 | Meyer |
| 2010/0132757 A1 | 6/2010 | He et al. |
| 2010/0132758 A1 | 6/2010 | Gilmore |
| 2010/0132761 A1 | 6/2010 | Echizenya et al. |
| 2010/0133911 A1 | 6/2010 | Williams et al. |
| 2010/0139734 A1 | 6/2010 | Hadar et al. |
| 2010/0139743 A1 | 6/2010 | Hadar et al. |
| 2010/0141041 A1 | 6/2010 | Bose et al. |
| 2010/0141153 A1 | 6/2010 | Recker et al. |
| 2010/0147362 A1 | 6/2010 | King et al. |
| 2010/0154858 A1 | 6/2010 | Jain |
| 2010/0176773 A1 | 7/2010 | Capel |
| 2010/0181957 A1 | 7/2010 | Goeltner |
| 2010/0191383 A1 | 7/2010 | Gaul |
| 2010/0195357 A1 | 8/2010 | Fornage et al. |
| 2010/0195361 A1 | 8/2010 | Stem |
| 2010/0206378 A1 | 8/2010 | Erickson, Jr. et al. |
| 2010/0207764 A1 | 8/2010 | Muhlberger et al. |
| 2010/0207770 A1 | 8/2010 | Thiemann |
| 2010/0208501 A1 | 8/2010 | Matan et al. |
| 2010/0213897 A1 | 8/2010 | Tse |
| 2010/0214808 A1 | 8/2010 | Rodriguez |
| 2010/0217551 A1 | 8/2010 | Goff et al. |
| 2010/0229915 A1 | 9/2010 | Ledenev et al. |
| 2010/0241375 A1 | 9/2010 | Kumar et al. |
| 2010/0244575 A1 | 9/2010 | Coccia et al. |
| 2010/0246223 A1 | 9/2010 | Xuan |
| 2010/0264736 A1 | 10/2010 | Mumtaz et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0286836 A1 | 11/2010 | Shaver et al. |
| 2010/0288327 A1 | 11/2010 | Lisi et al. |
| 2010/0289337 A1 | 11/2010 | Stauth et al. |
| 2010/0294528 A1 | 11/2010 | Sella et al. |
| 2010/0294903 A1 | 11/2010 | Shmukler et al. |
| 2010/0295680 A1 | 11/2010 | Dumps |
| 2010/0297860 A1 | 11/2010 | Shmukler et al. |
| 2010/0301677 A1 | 12/2010 | Tomita |
| 2010/0301991 A1 | 12/2010 | Sella et al. |
| 2010/0308662 A1 | 12/2010 | Schatz et al. |
| 2010/0309692 A1 | 12/2010 | Chisenga et al. |
| 2010/0315043 A1 | 12/2010 | Chau |
| 2010/0321148 A1 | 12/2010 | Gevorkian |
| 2010/0326809 A1 | 12/2010 | Lang et al. |
| 2010/0327657 A1 | 12/2010 | Kuran |
| 2010/0327659 A1 | 12/2010 | Lisi et al. |
| 2010/0332047 A1 | 12/2010 | Arditi et al. |
| 2011/0006743 A1 | 1/2011 | Fabbro |
| 2011/0012430 A1 | 1/2011 | Cheng et al. |
| 2011/0019444 A1 | 1/2011 | Dargatz et al. |
| 2011/0025130 A1 | 2/2011 | Hadar et al. |
| 2011/0026282 A1 | 2/2011 | Chapman et al. |
| 2011/0027626 A1 | 2/2011 | Lattin |
| 2011/0031816 A1 | 2/2011 | Buthker et al. |
| 2011/0031946 A1 | 2/2011 | Egan et al. |
| 2011/0037600 A1 | 2/2011 | Takehara et al. |
| 2011/0043172 A1 | 2/2011 | Dearn |
| 2011/0045802 A1 | 2/2011 | Bland et al. |
| 2011/0049990 A1 | 3/2011 | Amaratunga et al. |
| 2011/0050002 A1 | 3/2011 | De Luca |
| 2011/0050190 A1 | 3/2011 | Avrutsky |
| 2011/0056533 A1 | 3/2011 | Kuan |
| 2011/0061705 A1 | 3/2011 | Croft et al. |
| 2011/0061713 A1 | 3/2011 | Powell et al. |
| 2011/0062784 A1 | 3/2011 | Wolfs |
| 2011/0068633 A1 | 3/2011 | Quardt et al. |
| 2011/0079263 A1 | 4/2011 | Avrutsky |
| 2011/0080147 A1 | 4/2011 | Schoenlinner et al. |
| 2011/0083733 A1 | 4/2011 | Marroquin et al. |
| 2011/0084553 A1 | 4/2011 | Adest et al. |
| 2011/0088741 A1 | 4/2011 | Dunton et al. |
| 2011/0101949 A1 | 5/2011 | Lopata et al. |
| 2011/0108087 A1 | 5/2011 | Croft et al. |
| 2011/0109158 A1 | 5/2011 | Olsen |
| 2011/0114154 A1 | 5/2011 | Lichy et al. |
| 2011/0115295 A1 | 5/2011 | Moon et al. |
| 2011/0115393 A1 | 5/2011 | He |
| 2011/0116294 A1 | 5/2011 | Wolf |
| 2011/0121441 A1 | 5/2011 | Halstead et al. |
| 2011/0121652 A1 | 5/2011 | Sella et al. |
| 2011/0125431 A1 | 5/2011 | Adest et al. |
| 2011/0132424 A1 | 6/2011 | Rakib |
| 2011/0133552 A1 | 6/2011 | Binder et al. |
| 2011/0133556 A1 | 6/2011 | Choi |
| 2011/0139213 A1 | 6/2011 | Lee |
| 2011/0140535 A1 | 6/2011 | Choi et al. |
| 2011/0140536 A1 | 6/2011 | Adest et al. |
| 2011/0141644 A1 | 6/2011 | Hastings et al. |
| 2011/0144822 A1 | 6/2011 | Choi |
| 2011/0161722 A1 | 6/2011 | Makhota et al. |
| 2011/0172842 A1 | 7/2011 | Makhota et al. |
| 2011/0173276 A1 | 7/2011 | Eizips et al. |
| 2011/0179726 A1 | 7/2011 | Pao et al. |
| 2011/0181251 A1 | 7/2011 | Porter et al. |
| 2011/0181340 A1 | 7/2011 | Gazit |
| 2011/0183537 A1 | 7/2011 | Fornage et al. |

(56) References Cited

U.S. PATENT DOCUMENTS

| | | |
|---|---|---|
| 2011/0198935 A1 | 8/2011 | Hinman et al. |
| 2011/0210610 A1 | 9/2011 | Mitsuoka et al. |
| 2011/0210611 A1 | 9/2011 | Ledenev et al. |
| 2011/0210612 A1 | 9/2011 | Leutwein |
| 2011/0218687 A1 | 9/2011 | Hadar et al. |
| 2011/0227411 A1 | 9/2011 | Arditi |
| 2011/0232714 A1 | 9/2011 | Bhavaraju et al. |
| 2011/0240100 A1 | 10/2011 | Lu et al. |
| 2011/0245989 A1 | 10/2011 | Makhota et al. |
| 2011/0246338 A1 | 10/2011 | Eich |
| 2011/0254372 A1 | 10/2011 | Haines et al. |
| 2011/0260866 A1 | 10/2011 | Avrutsky et al. |
| 2011/0267721 A1 | 11/2011 | Chaintreuil et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0273017 A1 | 11/2011 | Borup et al. |
| 2011/0273024 A1 | 11/2011 | Butzmann |
| 2011/0273302 A1 | 11/2011 | Fornage et al. |
| 2011/0278955 A1 | 11/2011 | Signorelli et al. |
| 2011/0285205 A1 | 11/2011 | Ledenev et al. |
| 2011/0285375 A1 | 11/2011 | Deboy |
| 2011/0290317 A1 | 12/2011 | Naumovitz et al. |
| 2011/0291486 A1 | 12/2011 | Adest et al. |
| 2011/0298288 A1 | 12/2011 | Cho et al. |
| 2011/0301772 A1 | 12/2011 | Zuercher et al. |
| 2011/0304204 A1 | 12/2011 | Avrutsky et al. |
| 2011/0304213 A1 | 12/2011 | Avrutsky et al. |
| 2011/0304215 A1 | 12/2011 | Avrutsky et al. |
| 2011/0316346 A1 | 12/2011 | Porter et al. |
| 2012/0007434 A1 | 1/2012 | Perreault et al. |
| 2012/0007558 A1 | 1/2012 | Pigott |
| 2012/0007613 A1 | 1/2012 | Gazit |
| 2012/0019966 A1 | 1/2012 | DeBoer |
| 2012/0026763 A1 | 2/2012 | Humphrey et al. |
| 2012/0026769 A1 | 2/2012 | Schroeder et al. |
| 2012/0032515 A1 | 2/2012 | Ledenev et al. |
| 2012/0033392 A1 | 2/2012 | Golubovic et al. |
| 2012/0033463 A1 | 2/2012 | Rodriguez |
| 2012/0039099 A1 | 2/2012 | Rodriguez |
| 2012/0042588 A1 | 2/2012 | Erickson, Jr. |
| 2012/0043818 A1 | 2/2012 | Stratakos et al. |
| 2012/0043823 A1 | 2/2012 | Stratakos et al. |
| 2012/0044014 A1 | 2/2012 | Stratakos et al. |
| 2012/0044717 A1 | 2/2012 | Suntio et al. |
| 2012/0048325 A1 | 3/2012 | Matsuo et al. |
| 2012/0049627 A1 | 3/2012 | Matsuo et al. |
| 2012/0049801 A1 | 3/2012 | Chang |
| 2012/0049819 A1 | 3/2012 | Mao et al. |
| 2012/0056483 A1 | 3/2012 | Capp et al. |
| 2012/0056591 A1 | 3/2012 | Abe et al. |
| 2012/0063177 A1 | 3/2012 | Garrity |
| 2012/0080943 A1 | 4/2012 | Phadke |
| 2012/0081009 A1 | 4/2012 | Shteynberg et al. |
| 2012/0081933 A1 | 4/2012 | Garrity |
| 2012/0081934 A1 | 4/2012 | Garrity et al. |
| 2012/0081937 A1 | 4/2012 | Phadke |
| 2012/0087159 A1 | 4/2012 | Chapman et al. |
| 2012/0091810 A1 | 4/2012 | Aiello et al. |
| 2012/0091817 A1 | 4/2012 | Seymour et al. |
| 2012/0098344 A1 | 4/2012 | Bergveld et al. |
| 2012/0104861 A1 | 5/2012 | Kojori et al. |
| 2012/0104863 A1 | 5/2012 | Yuan |
| 2012/0113554 A1 | 5/2012 | Paoletti et al. |
| 2012/0119584 A1 | 5/2012 | Hadar et al. |
| 2012/0126624 A1 | 5/2012 | Hester et al. |
| 2012/0127764 A1 | 5/2012 | Phadke et al. |
| 2012/0133372 A1 | 5/2012 | Tsai et al. |
| 2012/0134058 A1 | 5/2012 | Pamer et al. |
| 2012/0138123 A1 | 6/2012 | Newdoll et al. |
| 2012/0139343 A1 | 6/2012 | Adest et al. |
| 2012/0146420 A1 | 6/2012 | Wolfs |
| 2012/0146583 A1 | 6/2012 | Gaul et al. |
| 2012/0161526 A1 | 6/2012 | Huang et al. |
| 2012/0161528 A1 | 6/2012 | Mumtaz et al. |
| 2012/0169124 A1 | 7/2012 | Nakashima et al. |
| 2012/0169291 A1 | 7/2012 | Abe et al. |
| 2012/0174961 A1 | 7/2012 | Larson et al. |
| 2012/0175961 A1 | 7/2012 | Har-Shai et al. |
| 2012/0175963 A1 | 7/2012 | Adest et al. |
| 2012/0187769 A1 | 7/2012 | Spannhake et al. |
| 2012/0194003 A1 | 8/2012 | Schmidt et al. |
| 2012/0199172 A1 | 8/2012 | Avrutsky |
| 2012/0200311 A1 | 8/2012 | Chaintreuil |
| 2012/0212066 A1 | 8/2012 | Adest et al. |
| 2012/0215367 A1 | 8/2012 | Eizips et al. |
| 2012/0217797 A1 | 8/2012 | Butzmann |
| 2012/0217973 A1 | 8/2012 | Avrutsky |
| 2012/0228931 A1 | 9/2012 | Butzmann |
| 2012/0240490 A1 | 9/2012 | Gangemi |
| 2012/0242156 A1 | 9/2012 | Butzmann et al. |
| 2012/0253533 A1 | 10/2012 | Eizips et al. |
| 2012/0253541 A1 | 10/2012 | Arditi et al. |
| 2012/0255591 A1 | 10/2012 | Arditi et al. |
| 2012/0268969 A1 | 10/2012 | Cuk |
| 2012/0271576 A1 | 10/2012 | Kamel et al. |
| 2012/0274145 A1 | 11/2012 | Taddeo |
| 2012/0274264 A1 | 11/2012 | Mun et al. |
| 2012/0280571 A1 | 11/2012 | Hargis |
| 2012/0299380 A1 | 11/2012 | Haupt |
| 2012/0318320 A1 | 12/2012 | Robbins |
| 2013/0002335 A1 | 1/2013 | DeGraaff |
| 2013/0026839 A1 | 1/2013 | Grana |
| 2013/0026840 A1 | 1/2013 | Arditi et al. |
| 2013/0026842 A1 | 1/2013 | Arditi et al. |
| 2013/0026843 A1 | 1/2013 | Arditi et al. |
| 2013/0038124 A1 | 2/2013 | Newdoll et al. |
| 2013/0039028 A1 | 2/2013 | Korman et al. |
| 2013/0049710 A1 | 2/2013 | Kraft et al. |
| 2013/0057223 A1 | 3/2013 | Lee |
| 2013/0062956 A1 | 3/2013 | Meyer et al. |
| 2013/0062958 A1 | 3/2013 | Erickson, Jr. et al. |
| 2013/0063119 A1 | 3/2013 | Lubomirsky |
| 2013/0069438 A1 | 3/2013 | Liu et al. |
| 2013/0082724 A1 | 4/2013 | Noda et al. |
| 2013/0094112 A1 | 4/2013 | Burghardt et al. |
| 2013/0094262 A1 | 4/2013 | Avrutsky |
| 2013/0134790 A1 | 5/2013 | Amaratunga et al. |
| 2013/0175971 A1 | 7/2013 | Har-Shai et al. |
| 2013/0181533 A1 | 7/2013 | Capp et al. |
| 2013/0192657 A1 | 8/2013 | Hadar et al. |
| 2013/0193765 A1 | 8/2013 | Yoscovich |
| 2013/0194706 A1 | 8/2013 | Har-Shai et al. |
| 2013/0200709 A1* | 8/2013 | Kirchner ............... H02J 3/381 |
| | | 307/77 |
| 2013/0200710 A1 | 8/2013 | Robbins |
| 2013/0214607 A1 | 8/2013 | Harrison |
| 2013/0222144 A1 | 8/2013 | Hadar et al. |
| 2013/0229834 A1 | 9/2013 | Garrity et al. |
| 2013/0229842 A1 | 9/2013 | Garrity |
| 2013/0234518 A1 | 9/2013 | Mumtaz et al. |
| 2013/0235637 A1 | 9/2013 | Rodriguez |
| 2013/0269181 A1 | 10/2013 | McBride et al. |
| 2013/0271096 A1 | 10/2013 | Inagaki |
| 2013/0279210 A1 | 10/2013 | Chisenga et al. |
| 2013/0285459 A1 | 10/2013 | Jaoui et al. |
| 2013/0294126 A1 | 11/2013 | Garrity et al. |
| 2013/0307556 A1 | 11/2013 | Ledenev et al. |
| 2013/0313909 A1 | 11/2013 | Storbeck et al. |
| 2013/0320778 A1 | 12/2013 | Hopf et al. |
| 2013/0321013 A1 | 12/2013 | Pisklak et al. |
| 2013/0328541 A1 | 12/2013 | Euler et al. |
| 2013/0332093 A1 | 12/2013 | Adest et al. |
| 2013/0335861 A1 | 12/2013 | Laschinski et al. |
| 2014/0062206 A1 | 3/2014 | Bryson |
| 2014/0062209 A1 | 3/2014 | Liu et al. |
| 2014/0062396 A1 | 3/2014 | Reddy |
| 2014/0077756 A1 | 3/2014 | Kataoka et al. |
| 2014/0097808 A1 | 4/2014 | Clark et al. |
| 2014/0119072 A1 | 5/2014 | Behrends et al. |
| 2014/0119076 A1 | 5/2014 | Chang et al. |
| 2014/0167715 A1 | 6/2014 | Wu et al. |
| 2014/0169053 A1 | 6/2014 | Ilic et al. |

(56) References Cited

U.S. PATENT DOCUMENTS

| 2014/0191583 A1 | 7/2014 | Chisenga et al. |
| 2014/0210485 A1 | 7/2014 | Lang et al. |
| 2014/0233136 A1 | 8/2014 | Heerdt |
| 2014/0246915 A1 | 9/2014 | Mumtaz |
| 2014/0246927 A1 | 9/2014 | Mumtaz |
| 2014/0252859 A1 | 9/2014 | Chisenga et al. |
| 2014/0265551 A1 | 9/2014 | Willis |
| 2014/0265579 A1 | 9/2014 | Mumtaz |
| 2014/0265629 A1 | 9/2014 | Gazit et al. |
| 2014/0265638 A1 | 9/2014 | Orr et al. |
| 2014/0268913 A1 | 9/2014 | Zheng et al. |
| 2014/0277796 A1 | 9/2014 | Peskin et al. |
| 2014/0293491 A1 | 10/2014 | Robbins |
| 2014/0306543 A1 | 10/2014 | Garrity et al. |
| 2014/0327313 A1 | 11/2014 | Arditi et al. |
| 2014/0327995 A1 | 11/2014 | Panjwani et al. |
| 2014/0354245 A1 | 12/2014 | Batikoff et al. |
| 2015/0022006 A1 | 1/2015 | Garrity et al. |
| 2015/0028683 A1 | 1/2015 | Hadar et al. |
| 2015/0028692 A1 | 1/2015 | Makhota et al. |
| 2015/0061409 A1 | 3/2015 | Dunton et al. |
| 2015/0069844 A1 | 3/2015 | Wu et al. |
| 2015/0100265 A1 | 4/2015 | Duchemin |
| 2015/0103572 A1 | 4/2015 | Jean |
| 2015/0131187 A1 | 5/2015 | Krein et al. |
| 2015/0161872 A1 | 6/2015 | Beaulieu et al. |
| 2015/0171789 A1 | 6/2015 | Har-Shai et al. |
| 2015/0183328 A1 | 7/2015 | Kusch et al. |
| 2015/0188415 A1 | 7/2015 | Abido et al. |
| 2015/0214889 A1 | 7/2015 | Nam et al. |
| 2015/0236589 A1 | 8/2015 | Baba |
| 2015/0263609 A1 | 9/2015 | Weida et al. |
| 2015/0318410 A1 | 11/2015 | Higuma |
| 2015/0351264 A1 | 12/2015 | Linderman |
| 2015/0364918 A1 | 12/2015 | Singh et al. |
| 2015/0372490 A1 | 12/2015 | Bakas et al. |
| 2015/0381108 A1 | 12/2015 | Hoft et al. |
| 2015/0381111 A1 | 12/2015 | Nicolescu et al. |
| 2016/0006392 A1 | 1/2016 | Hoft |
| 2016/0036235 A1 | 2/2016 | Getsla |
| 2016/0126367 A1 | 5/2016 | Dunton et al. |
| 2016/0172900 A1 | 6/2016 | Welch, Jr. |
| 2016/0181802 A1 | 6/2016 | Jacobson et al. |
| 2016/0190931 A1 | 6/2016 | Zhang |
| 2016/0211841 A1 | 7/2016 | Harrison |
| 2016/0226252 A1 | 8/2016 | Kravtiz et al. |
| 2016/0226257 A1 | 8/2016 | Porter et al. |
| 2016/0241039 A1 | 8/2016 | Cheng et al. |
| 2016/0268809 A1 | 9/2016 | Ledenev et al. |
| 2016/0270245 A1 | 9/2016 | Linderman |
| 2016/0276820 A1 | 9/2016 | Olivas et al. |
| 2016/0293115 A1 | 10/2016 | Yamashita et al. |
| 2016/0329715 A1 | 11/2016 | Orr et al. |
| 2016/0336899 A1 | 11/2016 | Ledenev et al. |
| 2016/0380436 A1 | 12/2016 | Porter et al. |
| 2017/0104413 A1 | 4/2017 | Busch et al. |
| 2017/0138804 A1 | 5/2017 | Lebental et al. |
| 2017/0179876 A1 | 6/2017 | Freeman et al. |
| 2017/0179886 A1 | 6/2017 | Oishi et al. |
| 2017/0184343 A1 | 6/2017 | Freer et al. |
| 2017/0207746 A1 | 7/2017 | Yoscovich et al. |
| 2017/0211190 A1 | 7/2017 | Glasscock et al. |
| 2017/0222542 A1 | 8/2017 | Adest et al. |
| 2017/0271879 A1 | 9/2017 | Ledenev et al. |
| 2017/0278375 A1 | 9/2017 | Galin et al. |
| 2017/0288384 A1 | 10/2017 | Loewenstern et al. |
| 2017/0331325 A1 | 11/2017 | Ristau |
| 2018/0034411 A1 | 2/2018 | Charles et al. |
| 2018/0145593 A1 | 5/2018 | Xi et al. |
| 2018/0191292 A1 | 7/2018 | Ehlmann |
| 2018/0248513 A1 | 8/2018 | Höft |
| 2018/0351401 A1 | 12/2018 | Binder et al. |
| 2019/0379279 A1 | 12/2019 | Adest et al. |
| 2019/0393834 A1 | 12/2019 | Har-Shai et al. |
| 2020/0176937 A1 | 6/2020 | Azad |
| 2020/0279963 A1 | 9/2020 | Yoscovich et al. |
| 2020/0373841 A1 | 11/2020 | Xie et al. |
| 2021/0036557 A1 | 2/2021 | Haug et al. |

FOREIGN PATENT DOCUMENTS

| AU | 2009202125 A1 | 12/2009 |
| AU | 2012225199 A1 | 10/2013 |
| CA | 1183574 A | 3/1985 |
| CA | 2063243 A1 | 12/1991 |
| CA | 2301657 A1 | 3/1999 |
| CA | 2394761 A1 | 6/2001 |
| CA | 2658087 A1 | 6/2001 |
| CA | 2443450 A1 | 3/2005 |
| CA | 2572452 A1 | 1/2006 |
| CA | 2613038 A1 | 1/2007 |
| CA | 2704605 A1 | 5/2009 |
| CA | 2702392 C | 9/2015 |
| CN | 2071396 U | 2/1991 |
| CN | 1106523 A | 8/1995 |
| CN | 2284479 Y | 6/1998 |
| CN | 1188453 A | 7/1998 |
| CN | 2305016 Y | 1/1999 |
| CN | 1236213 A | 11/1999 |
| CN | 1244745 A | 2/2000 |
| CN | 1262552 A | 8/2000 |
| CN | 1064487 C | 4/2001 |
| CN | 1309451 A | 8/2001 |
| CN | 1362655 A | 8/2002 |
| CN | 2514538 Y | 10/2002 |
| CN | 1122905 C | 10/2003 |
| CN | 2579063 Y | 10/2003 |
| CN | 1474492 A | 2/2004 |
| CN | 1523726 A | 8/2004 |
| CN | 1551377 A | 12/2004 |
| CN | 1185782 C | 1/2005 |
| CN | 2672668 Y | 1/2005 |
| CN | 2672938 Y | 1/2005 |
| CN | 1588773 A | 3/2005 |
| CN | 1201157 C | 5/2005 |
| CN | 1614854 A | 5/2005 |
| CN | 2706955 Y | 6/2005 |
| CN | 1245795 C | 3/2006 |
| CN | 1787717 A | 6/2006 |
| CN | 1794537 A | 6/2006 |
| CN | 1838191 A | 9/2006 |
| CN | 1841254 A | 10/2006 |
| CN | 1841823 A | 10/2006 |
| CN | 1848588 A | 10/2006 |
| CN | 1892239 A | 1/2007 |
| CN | 1902809 A | 1/2007 |
| CN | 1929276 A | 3/2007 |
| CN | 1930925 A | 3/2007 |
| CN | 1933315 A | 3/2007 |
| CN | 2891438 Y | 4/2007 |
| CN | 101030752 A | 9/2007 |
| CN | 101050770 A | 10/2007 |
| CN | 101107712 A | 1/2008 |
| CN | 100371843 C | 2/2008 |
| CN | 101128974 A | 2/2008 |
| CN | 101136129 A | 3/2008 |
| CN | 101180781 A | 5/2008 |
| CN | 101257221 A | 9/2008 |
| CN | 100426175 C | 10/2008 |
| CN | 201167381 Y | 12/2008 |
| CN | 201203438 Y | 3/2009 |
| CN | 100487970 C | 5/2009 |
| CN | 101488271 A | 7/2009 |
| CN | 101521459 A | 9/2009 |
| CN | 101523230 A | 9/2009 |
| CN | 101647172 A | 2/2010 |
| CN | 101672252 A | 3/2010 |
| CN | 101697462 A | 4/2010 |
| CN | 101779291 A | 7/2010 |
| CN | 101847939 A | 9/2010 |
| CN | 201601477 U | 10/2010 |
| CN | 201623478 U | 11/2010 |
| CN | 201623651 U | 11/2010 |
| CN | 101902051 A | 12/2010 |

(56) References Cited

FOREIGN PATENT DOCUMENTS

| | | | |
|---|---|---|---|
| CN | 101902171 | A | 12/2010 |
| CN | 101904015 | A | 12/2010 |
| CN | 201663167 | U | 12/2010 |
| CN | 101939660 | A | 1/2011 |
| CN | 101951011 | A | 1/2011 |
| CN | 101951190 | A | 1/2011 |
| CN | 101953051 | A | 1/2011 |
| CN | 101953060 | A | 1/2011 |
| CN | 101976855 | A | 2/2011 |
| CN | 101976952 | A | 2/2011 |
| CN | 101980409 | A | 2/2011 |
| CN | 102084584 | A | 6/2011 |
| CN | 102089883 | A | 6/2011 |
| CN | 102117815 | A | 7/2011 |
| CN | 102148584 | A | 8/2011 |
| CN | 201926948 | U | 8/2011 |
| CN | 201956938 | U | 8/2011 |
| CN | 202034903 | U | 11/2011 |
| CN | 102273039 | A | 12/2011 |
| CN | 202103601 | U | 1/2012 |
| CN | 102362550 | A | 2/2012 |
| CN | 102386259 | A | 3/2012 |
| CN | 202178274 | U | 3/2012 |
| CN | 102474112 | A | 5/2012 |
| CN | 102565635 | A | 7/2012 |
| CN | 102771017 | A | 11/2012 |
| CN | 102845136 | A | 12/2012 |
| CN | 202871823 | U | 4/2013 |
| CN | 103227475 | A | 7/2013 |
| CN | 103280768 | A | 9/2013 |
| CN | 103299501 | A | 9/2013 |
| CN | 203367304 | U | 12/2013 |
| CN | 103548226 | A | 1/2014 |
| CN | 103580463 | A | 2/2014 |
| CN | 103875144 | A | 6/2014 |
| CN | 104143916 | A | 11/2014 |
| CN | 104158482 | A | 11/2014 |
| CN | 104253585 | A | 12/2014 |
| CN | 104488155 | A | 4/2015 |
| CN | 104685785 | A | 6/2015 |
| CN | 104779636 | A | 7/2015 |
| CN | 105075046 | A | 11/2015 |
| CN | 105164915 | A | 12/2015 |
| CN | 105490298 | A | 4/2016 |
| CN | 105553422 | A | 5/2016 |
| CN | 205609261 | U | 9/2016 |
| CN | 106093721 | A | 11/2016 |
| CN | 207304483 | U | 5/2018 |
| DE | 1161639 | B | 1/1964 |
| DE | 3236071 | A1 | 1/1984 |
| DE | 3525630 | A1 | 1/1987 |
| DE | 3729000 | A1 | 3/1989 |
| DE | 4019710 | A1 | 1/1992 |
| DE | 4032569 | A1 | 4/1992 |
| DE | 4041672 | A1 | 6/1992 |
| DE | 9312710 | U1 | 10/1993 |
| DE | 4232356 | A1 | 3/1994 |
| DE | 4325436 | A1 | 2/1995 |
| DE | 4328511 | A1 | 3/1995 |
| DE | 19515786 | A1 | 11/1995 |
| DE | 19502762 | A1 | 8/1996 |
| DE | 19614861 | A1 | 7/1997 |
| DE | 19609189 | A1 | 9/1997 |
| DE | 19618882 | A1 | 11/1997 |
| DE | 19701897 | A1 | 7/1998 |
| DE | 19718046 | A1 | 11/1998 |
| DE | 19732218 | C1 | 3/1999 |
| DE | 19737286 | A1 | 3/1999 |
| DE | 19838230 | A1 | 2/2000 |
| DE | 19846818 | A1 | 4/2000 |
| DE | 19859732 | A1 | 6/2000 |
| DE | 19904561 | C1 | 8/2000 |
| DE | 19928809 | A1 | 1/2001 |
| DE | 019937410 | A1 | 2/2001 |
| DE | 19961705 | A1 | 7/2001 |
| DE | 10064039 | A1 | 12/2001 |
| DE | 10060108 | A1 | 6/2002 |
| DE | 10103431 | A1 | 8/2002 |
| DE | 10136147 | A1 | 2/2003 |
| DE | 10219956 | A1 | 4/2003 |
| DE | 10222621 | A1 | 11/2003 |
| DE | 202004001246 | U1 | 4/2004 |
| DE | 10345302 | A1 | 4/2005 |
| DE | 102004043478 | A1 | 4/2005 |
| DE | 102004053942 | A1 | 5/2006 |
| DE | 102004037446 | A1 | 6/2006 |
| DE | 69734495 | T2 | 7/2006 |
| DE | 69735169 | T2 | 8/2006 |
| DE | 102005012213 | A1 | 8/2006 |
| DE | 102005018173 | A1 | 10/2006 |
| DE | 20 2005 020161 | U1 | 11/2006 |
| DE | 102005036153 | A1 | 12/2006 |
| DE | 102005030907 | A1 | 1/2007 |
| DE | 102005032864 | A1 | 1/2007 |
| DE | 102006023563 | A1 | 11/2007 |
| DE | 102006026073 | A1 | 12/2007 |
| DE | 202007002077 | U1 | 4/2008 |
| DE | 102006060815 | A1 | 6/2008 |
| DE | 602004011201 | T2 | 12/2008 |
| DE | 102007051134 | A1 | 3/2009 |
| DE | 202008012345 | U1 | 3/2009 |
| DE | 102007037130 | B3 | 4/2009 |
| DE | 102007050031 | B3 | 4/2009 |
| DE | 202009007318 | U1 | 8/2009 |
| DE | 102008042199 | A1 | 4/2010 |
| DE | 102008057874 | A1 | 5/2010 |
| DE | 102009051186 | A1 | 5/2010 |
| DE | 102009022569 | A1 | 12/2010 |
| DE | 102010023549 | A1 | 12/2011 |
| DE | 202011109688 | U1 | 3/2012 |
| DE | 102013101314 | A1 | 8/2014 |
| DE | 102013106255 | A1 | 12/2014 |
| DE | 102013106808 | A1 | 12/2014 |
| DE | 102016117229 | A1 | 3/2018 |
| EP | 0027405 | A1 | 4/1981 |
| EP | 169673 | A1 | 1/1986 |
| EP | 0178757 | A2 | 4/1986 |
| EP | 0206253 | A1 | 12/1986 |
| EP | 0231211 | A1 | 8/1987 |
| EP | 0293219 | A2 | 11/1988 |
| EP | 0340006 | A2 | 11/1989 |
| EP | 0418612 | A1 | 3/1991 |
| EP | 419093 | A2 | 3/1991 |
| EP | 420295 | A1 | 4/1991 |
| EP | 0521467 | A2 | 1/1993 |
| EP | 0576271 | A2 | 12/1993 |
| EP | 0577334 | A2 | 1/1994 |
| EP | 604777 | A1 | 7/1994 |
| EP | 0628901 | A2 | 12/1994 |
| EP | 0642199 | A1 | 3/1995 |
| EP | 653692 | A2 | 5/1995 |
| EP | 0670915 | A1 | 9/1995 |
| EP | 677749 | A2 | 10/1995 |
| EP | 756178 | A2 | 1/1997 |
| EP | 0756372 | A1 | 1/1997 |
| EP | 0780750 | A2 | 6/1997 |
| EP | 0809293 | A1 | 11/1997 |
| EP | 824273 | A2 | 2/1998 |
| EP | 827254 | A2 | 3/1998 |
| EP | 0895146 | A1 | 2/1999 |
| EP | 0906660 | A1 | 4/1999 |
| EP | 0947904 | A2 | 10/1999 |
| EP | 0947905 | A2 | 10/1999 |
| EP | 964415 | A1 | 12/1999 |
| EP | 0978884 | A3 | 3/2000 |
| EP | 1012886 | A1 | 6/2000 |
| EP | 1024575 | A2 | 8/2000 |
| EP | 1034465 | A1 | 9/2000 |
| EP | 1035640 | A1 | 9/2000 |
| EP | 1039361 | A1 | 9/2000 |
| EP | 1039620 | A2 | 9/2000 |
| EP | 1039621 | A2 | 9/2000 |
| EP | 1047179 | A1 | 10/2000 |
| EP | 1130770 | A2 | 9/2001 |

(56)  References Cited

FOREIGN PATENT DOCUMENTS

| | | | |
|---|---|---|---|
| EP | 1143594 | A2 | 10/2001 |
| EP | 1187291 | A2 | 3/2002 |
| EP | 1235339 | A2 | 8/2002 |
| EP | 1239573 | A1 | 9/2002 |
| EP | 1239576 | A2 | 9/2002 |
| EP | 1254505 | A2 | 11/2002 |
| EP | 1271742 | A2 | 1/2003 |
| EP | 1291997 | A2 | 3/2003 |
| EP | 1330009 | A2 | 7/2003 |
| EP | 1339153 | A2 | 8/2003 |
| EP | 1369983 | A1 | 12/2003 |
| EP | 1376706 | A2 | 1/2004 |
| EP | 1388774 | A1 | 2/2004 |
| EP | 1400988 | A2 | 3/2004 |
| EP | 1407534 | A2 | 4/2004 |
| EP | 1120895 | A3 | 5/2004 |
| EP | 1418482 | A1 | 5/2004 |
| EP | 1429393 | A2 | 6/2004 |
| EP | 1442473 | A2 | 8/2004 |
| EP | 1447561 | A1 | 8/2004 |
| EP | 1457857 | A2 | 9/2004 |
| EP | 1463188 | A2 | 9/2004 |
| EP | 1475882 | A2 | 11/2004 |
| EP | 1503490 | A1 | 2/2005 |
| EP | 1521345 | A1 | 4/2005 |
| EP | 1526633 | A2 | 4/2005 |
| EP | 1531542 | A2 | 5/2005 |
| EP | 1531545 | A2 | 5/2005 |
| EP | 1532727 | A2 | 5/2005 |
| EP | 1552563 | A2 | 7/2005 |
| EP | 1562281 | A1 | 8/2005 |
| EP | 1580862 | A1 | 9/2005 |
| EP | 1603212 | A2 | 12/2005 |
| EP | 1610571 | A2 | 12/2005 |
| EP | 1623495 | A1 | 2/2006 |
| EP | 1642355 | A2 | 4/2006 |
| EP | 0964457 | A3 | 5/2006 |
| EP | 1657557 | A1 | 5/2006 |
| EP | 1657797 | A1 | 5/2006 |
| EP | 1684397 | A2 | 7/2006 |
| EP | 1691246 | A2 | 8/2006 |
| EP | 1706937 | A1 | 10/2006 |
| EP | 1708070 | A1 | 10/2006 |
| EP | 1716272 | A1 | 11/2006 |
| EP | 1728413 | A1 | 12/2006 |
| EP | 1734373 | A2 | 12/2006 |
| EP | 1750193 | A1 | 2/2007 |
| EP | 1766490 | A1 | 3/2007 |
| EP | 1782146 | A2 | 5/2007 |
| EP | 1785800 | A1 | 5/2007 |
| EP | 1837985 | A2 | 9/2007 |
| EP | 1842121 | A2 | 10/2007 |
| EP | 1609250 | B1 | 1/2008 |
| EP | 1887675 | A2 | 2/2008 |
| EP | 1901419 | A2 | 3/2008 |
| EP | 1902349 | A2 | 3/2008 |
| EP | 1911101 | A1 | 4/2008 |
| EP | 1914857 | A1 | 4/2008 |
| EP | 2048679 | A1 | 4/2009 |
| EP | 2054944 | A2 | 5/2009 |
| EP | 2061088 | A2 | 5/2009 |
| EP | 2092625 | A2 | 8/2009 |
| EP | 2092631 | A2 | 8/2009 |
| EP | 2130286 | A1 | 12/2009 |
| EP | 2135296 | A2 | 12/2009 |
| EP | 2135348 | A2 | 12/2009 |
| EP | 2144133 | A1 | 1/2010 |
| EP | 2179451 | A1 | 4/2010 |
| EP | 2206159 | A2 | 7/2010 |
| EP | 2232690 | A1 | 9/2010 |
| EP | 2234237 | A1 | 9/2010 |
| EP | 2249457 | A1 | 11/2010 |
| EP | 2256819 | A1 | 12/2010 |
| EP | 2315328 | A2 | 4/2011 |
| EP | 2355268 | A1 | 8/2011 |
| EP | 2374190 | A1 | 10/2011 |
| EP | 2386122 | A2 | 11/2011 |
| EP | 2393178 | A2 | 12/2011 |
| EP | 2395648 | A2 | 12/2011 |
| EP | 2495766 | A1 | 9/2012 |
| EP | 2515424 | A2 | 10/2012 |
| EP | 2533299 | A1 | 12/2012 |
| EP | 2549635 | A1 | 1/2013 |
| EP | 2561596 | A2 | 2/2013 |
| EP | 2581941 | A2 | 4/2013 |
| EP | 2615644 | A1 | 7/2013 |
| EP | 2621045 | A2 | 7/2013 |
| EP | 2666222 | A1 | 11/2013 |
| EP | 2722979 | A1 | 4/2014 |
| EP | 2779251 | A1 | 9/2014 |
| EP | 3176933 | A1 | 6/2017 |
| EP | 2139104 | B1 | 10/2017 |
| EP | 3252909 | A1 | 12/2017 |
| EP | 3382871 | A1 | 10/2018 |
| ES | 2249147 | A1 | 3/2006 |
| ES | 2249149 | A1 | 3/2006 |
| FR | 2796216 | A1 | 1/2001 |
| FR | 2819653 | A1 | 7/2002 |
| FR | 2894401 | A1 | 6/2007 |
| GB | 310362 | A | 9/1929 |
| GB | 612859 | A | 11/1948 |
| GB | 1211885 | A | 11/1970 |
| GB | 1231961 | A | 5/1971 |
| GB | 1261838 | A | 1/1972 |
| GB | 1571681 | A | 7/1980 |
| GB | 1597508 | A | 9/1981 |
| GB | 2128017 | A | 4/1984 |
| GB | 2327208 | A | 1/1999 |
| GB | 2339465 | A | 1/2000 |
| GB | 2376801 | A | 12/2002 |
| GB | 2399463 | A | 9/2004 |
| GB | 2399465 | A | 9/2004 |
| GB | 2415841 | A | 1/2006 |
| GB | 2419968 | A | 5/2006 |
| GB | 2421847 | A | 7/2006 |
| GB | 2434490 | A | 7/2007 |
| GB | 2476508 | A | 6/2011 |
| GB | 2480015 | B | 12/2011 |
| GB | 2482653 | A | 2/2012 |
| GB | 2483317 | A | 3/2012 |
| GB | 2485527 | A | 5/2012 |
| GB | 2486408 | A | 6/2012 |
| GB | 2487368 | A | 7/2012 |
| GB | 2497275 | A | 6/2013 |
| GB | 2498365 | A | 7/2013 |
| GB | 2498790 | A | 7/2013 |
| GB | 2498791 | A | 7/2013 |
| GB | 2499991 | A | 9/2013 |
| JP | S56042365 | A | 4/1981 |
| JP | S60027964 | A | 2/1985 |
| JP | S60148172 | A | 8/1985 |
| JP | 61065320 | A | 4/1986 |
| JP | S62154121 | A | 7/1987 |
| JP | S62154122 | A | 7/1987 |
| JP | H01311874 | A | 12/1989 |
| JP | H04219982 | A | 8/1992 |
| JP | H04364378 | A | 12/1992 |
| JP | H05003678 | A | 1/1993 |
| JP | H06035555 | A | 2/1994 |
| JP | H06141261 | A | 5/1994 |
| JP | H07026849 | A | 1/1995 |
| JP | H07058843 | A | 3/1995 |
| JP | H07-222436 | A | 8/1995 |
| JP | H07322529 | A | 12/1995 |
| JP | 8009557 | A | 1/1996 |
| JP | H08033347 | A | 2/1996 |
| JP | H08066050 | A | 3/1996 |
| JP | H0897460 | A | 4/1996 |
| JP | 08138754 | A | 5/1996 |
| JP | H08116628 | A | 5/1996 |
| JP | H08181343 | A | 7/1996 |
| JP | H08185235 | A | 7/1996 |
| JP | H08204220 | A | 8/1996 |
| JP | H08227324 | A | 9/1996 |

(56) References Cited

FOREIGN PATENT DOCUMENTS

| | | | |
|---|---|---|---|
| JP | H08316517 | A | 11/1996 |
| JP | H08317664 | A | 11/1996 |
| JP | 097644 | A | 1/1997 |
| JP | H094692 | A | 1/1997 |
| JP | H09097918 | A | 4/1997 |
| JP | H09148611 | A | 6/1997 |
| JP | H09148613 | A | 6/1997 |
| JP | H09275644 | A | 10/1997 |
| JP | 2676789 | B2 | 11/1997 |
| JP | H1017445 | A | 1/1998 |
| JP | H1075580 | A | 3/1998 |
| JP | H10201086 | A | 7/1998 |
| JP | H10201105 | A | 7/1998 |
| JP | H10308523 | A | 11/1998 |
| JP | 11041832 | A | 2/1999 |
| JP | H1146457 | A | 2/1999 |
| JP | 11103538 | A | 4/1999 |
| JP | 2892183 | B2 | 5/1999 |
| JP | 11206038 | A | 7/1999 |
| JP | H11266545 | A | 9/1999 |
| JP | 11289891 | A | 10/1999 |
| JP | 11318042 | A | 11/1999 |
| JP | H11332088 | A | 11/1999 |
| JP | 2000020150 | A | 1/2000 |
| JP | 2000051074 | A | 2/2000 |
| JP | 3015512 | B2 | 3/2000 |
| JP | 2000-112545 | A | 4/2000 |
| JP | 2000-116010 | A | 4/2000 |
| JP | 2000160789 | A | 6/2000 |
| JP | 2000166097 | A | 6/2000 |
| JP | 2000174307 | A | 6/2000 |
| JP | 2000232791 | A | 8/2000 |
| JP | 2000232793 | A | 8/2000 |
| JP | 2000316282 | A | 11/2000 |
| JP | 2000324852 | A | 11/2000 |
| JP | 2000339044 | A | 12/2000 |
| JP | 2000341974 | A | 12/2000 |
| JP | 2000347753 | A | 12/2000 |
| JP | 2000358330 | A | 12/2000 |
| JP | 200185716 | A | 3/2001 |
| JP | 2001060120 | A | 3/2001 |
| JP | 2001075662 | A | 3/2001 |
| JP | 2001086765 | A | 3/2001 |
| JP | 2001178145 | A | 6/2001 |
| JP | 2001189476 | A | 7/2001 |
| JP | 2001224142 | A | 8/2001 |
| JP | 2001238466 | A | 8/2001 |
| JP | 2001250964 | A | 9/2001 |
| JP | 2001255949 | A | 9/2001 |
| JP | 2001-320827 | A | 11/2001 |
| JP | 2002073184 | A | 3/2002 |
| JP | 2002231578 | A | 8/2002 |
| JP | 2002238246 | A | 8/2002 |
| JP | 2002-262461 | A | 9/2002 |
| JP | 2002270876 | A | 9/2002 |
| JP | 2002300735 | A | 10/2002 |
| JP | 2002339591 | A | 11/2002 |
| JP | 2002354677 | A | 12/2002 |
| JP | 2003068312 | A | 3/2003 |
| JP | 2003102134 | A | 4/2003 |
| JP | 2003124492 | A | 4/2003 |
| JP | 2003132959 | A | 5/2003 |
| JP | 2003132960 | A | 5/2003 |
| JP | 2003134661 | A | 5/2003 |
| JP | 2003134667 | A | 5/2003 |
| JP | 2003168487 | A | 6/2003 |
| JP | 2003282916 | A | 10/2003 |
| JP | 2003289674 | A | 10/2003 |
| JP | 3499941 | B2 | 2/2004 |
| JP | 2004047279 | A | 2/2004 |
| JP | 2004055603 | A | 2/2004 |
| JP | 2004-096090 | A | 3/2004 |
| JP | 2004111754 | A | 4/2004 |
| JP | 2004-147465 | A | 5/2004 |
| JP | 2004194500 | A | 7/2004 |
| JP | 2004260944 | A | 9/2004 |
| JP | 2004-334704 | A | 11/2004 |
| JP | 2004312994 | A | 11/2004 |
| JP | 2005-151662 | A | 6/2005 |
| JP | 3656531 | B2 | 6/2005 |
| JP | 2005192314 | A | 7/2005 |
| JP | 2005-235082 | A | 9/2005 |
| JP | 2005251039 | A | 9/2005 |
| JP | 2005-276942 | A | 10/2005 |
| JP | 2005283516 | A | 10/2005 |
| JP | 2005-312287 | A | 11/2005 |
| JP | 2006041440 | A | 2/2006 |
| JP | 2006262619 | A | 9/2006 |
| JP | 2006271083 | A | 10/2006 |
| JP | 2006278755 | A | 10/2006 |
| JP | 2007058845 | A | 3/2007 |
| JP | 2007104872 | A | 4/2007 |
| JP | 2007225625 | A | 9/2007 |
| JP | 4174227 | B2 | 10/2008 |
| JP | 2010-146047 | A | 7/2010 |
| JP | 2010245532 | A | 10/2010 |
| JP | 2011-055634 | A | 3/2011 |
| JP | 2011-249790 | A | 12/2011 |
| JP | 2012-60714 | A | 3/2012 |
| JP | 2012511299 | A | 5/2012 |
| JP | 2012178535 | A | 9/2012 |
| JP | 2015-233386 | A | 12/2015 |
| KR | 20010044490 | A | 6/2001 |
| KR | 20030050390 | A | 6/2003 |
| KR | 20040086088 | A | 10/2004 |
| KR | 100468127 | B1 | 1/2005 |
| KR | 200402282 | Y1 | 11/2005 |
| KR | 20060060825 | A | 6/2006 |
| KR | 20070036528 | A | 4/2007 |
| KR | 100725755 | B1 | 5/2007 |
| KR | 20080092747 | A | 10/2008 |
| KR | 100912892 | B1 | 8/2009 |
| KR | 101073143 | B1 | 10/2011 |
| NL | 1011483 | C2 | 9/2000 |
| TW | 497326 | B | 8/2002 |
| TW | 200913291 | A | 3/2009 |
| WO | 8202134 | A1 | 6/1982 |
| WO | 1984003402 | A1 | 8/1984 |
| WO | 1988004801 | A1 | 6/1988 |
| WO | 9003680 | A1 | 4/1990 |
| WO | 1992007418 | A1 | 4/1992 |
| WO | 1993013587 | A1 | 7/1993 |
| WO | 95/25374 | A1 | 9/1995 |
| WO | 95/34121 | A1 | 12/1995 |
| WO | 1996007130 | A1 | 3/1996 |
| WO | 1996013093 | A1 | 5/1996 |
| WO | 1998023021 | A2 | 5/1998 |
| WO | 1999028801 | A1 | 6/1999 |
| WO | 00/00839 | A1 | 1/2000 |
| WO | 00/21178 | A1 | 4/2000 |
| WO | 0042689 | A1 | 7/2000 |
| WO | 0075947 | A1 | 12/2000 |
| WO | 0077522 | A1 | 12/2000 |
| WO | 01/13502 | A1 | 2/2001 |
| WO | 01047095 | A2 | 6/2001 |
| WO | 02/17469 | A1 | 2/2002 |
| WO | 0231517 | | 4/2002 |
| WO | 02056126 | A1 | 7/2002 |
| WO | 2002073785 | A1 | 9/2002 |
| WO | 02078164 | A1 | 10/2002 |
| WO | 02093655 | A1 | 11/2002 |
| WO | 03012569 | A1 | 2/2003 |
| WO | 03/026114 | A2 | 3/2003 |
| WO | 2003036688 | A2 | 5/2003 |
| WO | 2003050938 | A2 | 6/2003 |
| WO | 2003071655 | A1 | 8/2003 |
| WO | 03084041 | A1 | 10/2003 |
| WO | 2003098703 | | 11/2003 |
| WO | 2004001942 | A1 | 12/2003 |
| WO | 2004006342 | A1 | 1/2004 |
| WO | 2004008619 | A2 | 1/2004 |
| WO | 2004023278 | A2 | 3/2004 |
| WO | 2004053993 | A1 | 6/2004 |
| WO | 2004090993 | A2 | 10/2004 |

(56) References Cited

FOREIGN PATENT DOCUMENTS

| WO | 2004098261 A2 | 11/2004 |
| WO | 2004100344 A2 | 11/2004 |
| WO | 2004100348 A1 | 11/2004 |
| WO | 2004107543 A2 | 12/2004 |
| WO | 2005015584 A2 | 2/2005 |
| WO | 2005027300 A1 | 3/2005 |
| WO | 2005036725 A1 | 4/2005 |
| WO | 2005053189 A1 | 6/2005 |
| WO | 2005069096 A1 | 7/2005 |
| WO | 2005076444 A1 | 8/2005 |
| WO | 2005076445 A1 | 8/2005 |
| WO | 2005089030 A1 | 9/2005 |
| WO | 2005112551 A2 | 12/2005 |
| WO | 2005119278 A1 | 12/2005 |
| WO | 2005119609 A2 | 12/2005 |
| WO | 2005124498 A1 | 12/2005 |
| WO | 2006002380 A2 | 1/2006 |
| WO | 2006005125 A1 | 1/2006 |
| WO | 2006007198 A1 | 1/2006 |
| WO | 2006011071 A2 | 2/2006 |
| WO | 2006011359 A1 | 2/2006 |
| WO | 2006013600 A2 | 2/2006 |
| WO | 2006033143 A1 | 3/2006 |
| WO | 2006045016 A2 | 4/2006 |
| WO | 2006048688 A1 | 5/2006 |
| WO | 2006048689 A2 | 5/2006 |
| WO | 2006/074561 A1 | 7/2006 |
| WO | 2006071436 A2 | 7/2006 |
| WO | 2006078685 A2 | 7/2006 |
| WO | 2006079503 A2 | 8/2006 |
| WO | 2006089778 A2 | 8/2006 |
| WO | 2006110613 A2 | 10/2006 |
| WO | 2006/125664 A1 | 11/2006 |
| WO | 2006117551 A2 | 11/2006 |
| WO | 2006130520 A2 | 12/2006 |
| WO | 2006137948 A2 | 12/2006 |
| WO | 2007006564 A2 | 1/2007 |
| WO | 2007007360 A2 | 1/2007 |
| WO | 2007010326 A1 | 1/2007 |
| WO | 2007/020419 A1 | 2/2007 |
| WO | 2007048421 A2 | 5/2007 |
| WO | 2007072517 A1 | 6/2007 |
| WO | 2007073951 A1 | 7/2007 |
| WO | 2007080429 A2 | 7/2007 |
| WO | 2007084196 A2 | 7/2007 |
| WO | 2007090476 A2 | 8/2007 |
| WO | 2006124130 A9 | 10/2007 |
| WO | 2007113358 A1 | 10/2007 |
| WO | 2007124518 A1 | 11/2007 |
| WO | 2007129808 A1 | 11/2007 |
| WO | 2007142693 A2 | 12/2007 |
| WO | 2008008528 A2 | 1/2008 |
| WO | 2008026207 A2 | 3/2008 |
| WO | 2008/046370 A1 | 4/2008 |
| WO | 2008/077473 A2 | 7/2008 |
| WO | 2008069926 A3 | 8/2008 |
| WO | 2008097591 A2 | 8/2008 |
| WO | 2008119034 A1 | 10/2008 |
| WO | 2008121266 A2 | 10/2008 |
| WO | 2008125915 A2 | 10/2008 |
| WO | 2008132551 A2 | 11/2008 |
| WO | 2008132553 A2 | 11/2008 |
| WO | 2008142480 A2 | 11/2008 |
| WO | 2009003680 A1 | 1/2009 |
| WO | 2009006879 A2 | 1/2009 |
| WO | 2009007782 A2 | 1/2009 |
| WO | 2009011780 A2 | 1/2009 |
| WO | 2009020917 A2 | 2/2009 |
| WO | 2009/026602 A1 | 3/2009 |
| WO | 2009046533 A1 | 4/2009 |
| WO | 2009051221 A1 | 4/2009 |
| WO | 2009051222 A1 | 4/2009 |
| WO | 2009051853 A1 | 4/2009 |
| WO | 2009051854 A1 | 4/2009 |
| WO | 2009051870 A1 | 4/2009 |
| WO | 2009055474 A1 | 4/2009 |
| WO | 2009/059877 A1 | 5/2009 |
| WO | 2009056957 A2 | 5/2009 |
| WO | 2009059028 A2 | 5/2009 |
| WO | 2009064683 A2 | 5/2009 |
| WO | 2009/072075 A2 | 6/2009 |
| WO | 2009/073867 A1 | 6/2009 |
| WO | 2009072076 A2 | 6/2009 |
| WO | 2009072077 A1 | 6/2009 |
| WO | 2009073868 A1 | 6/2009 |
| WO | 2009073995 A2 | 6/2009 |
| WO | 2009075985 A2 | 6/2009 |
| WO | 2009098729 A1 | 8/2009 |
| WO | 2009114341 A2 | 9/2009 |
| WO | 2009118682 A2 | 10/2009 |
| WO | 2009118683 A2 | 10/2009 |
| WO | 2009136358 A1 | 11/2009 |
| WO | 2009140539 A2 | 11/2009 |
| WO | 2009140543 A2 | 11/2009 |
| WO | 2009155392 A1 | 12/2009 |
| WO | 2010/002960 A1 | 1/2010 |
| WO | 2010/003941 A2 | 1/2010 |
| WO | 2009/140536 A3 | 2/2010 |
| WO | 2009/140551 A3 | 2/2010 |
| WO | 2010014116 A1 | 2/2010 |
| WO | 2010020385 A2 | 2/2010 |
| WO | 2010/042124 A1 | 4/2010 |
| WO | 2010037393 A1 | 4/2010 |
| WO | 2010056777 A1 | 5/2010 |
| WO | 2010/071855 A2 | 6/2010 |
| WO | 2010062410 A1 | 6/2010 |
| WO | 2010062662 A2 | 6/2010 |
| WO | 2010065043 A1 | 6/2010 |
| WO | 2010065388 A1 | 6/2010 |
| WO | 2010072717 A1 | 7/2010 |
| WO | 2010078303 A2 | 7/2010 |
| WO | 2010080672 A2 | 7/2010 |
| WO | 2010091025 A2 | 8/2010 |
| WO | 2010094012 A1 | 8/2010 |
| WO | 2010118503 A1 | 10/2010 |
| WO | 2010120315 A1 | 10/2010 |
| WO | 2010/132369 A1 | 11/2010 |
| WO | 20100134057 A1 | 11/2010 |
| WO | 2011005339 A1 | 1/2011 |
| WO | 2011011711 A2 | 1/2011 |
| WO | 2011014275 A1 | 2/2011 |
| WO | 2011017721 A1 | 2/2011 |
| WO | 2011019936 A1 | 2/2011 |
| WO | 2011023732 A2 | 3/2011 |
| WO | 2011028456 A2 | 3/2011 |
| WO | 2011028457 A2 | 3/2011 |
| WO | 2011044641 A1 | 4/2011 |
| WO | 2011049985 A1 | 4/2011 |
| WO | 2011059067 A1 | 5/2011 |
| WO | 2011074025 A1 | 6/2011 |
| WO | 2011076707 A2 | 6/2011 |
| WO | 2011085259 A2 | 7/2011 |
| WO | 2011089607 A1 | 7/2011 |
| WO | 2011109746 A2 | 9/2011 |
| WO | 2011119587 A2 | 9/2011 |
| WO | 2011133843 A2 | 10/2011 |
| WO | 2011133928 A2 | 10/2011 |
| WO | 2011151672 A1 | 12/2011 |
| WO | 2012024538 A3 | 5/2012 |
| WO | 2012100263 A2 | 7/2012 |
| WO | 2013015921 A1 | 1/2013 |
| WO | 2013019899 A2 | 2/2013 |
| WO | 2013064828 A1 | 5/2013 |
| WO | 2013130563 A1 | 9/2013 |
| WO | 2014143021 A1 | 9/2014 |
| WO | 2017/125375 A1 | 7/2017 |
| WO | 2018122835 A1 | 7/2018 |

OTHER PUBLICATIONS

QT Technical Application Papers, "ABB Circuit-Breakers for Direct current Applications", ABB SACE S.p.A., an ABB Group Com-

(56) References Cited

OTHER PUBLICATIONS pany, L.V. Breakers, via Baioni, 35, 24123 Bergamo-Italy, Tel.: +39 035.395.111—Telefax: +39 035.395.306-433, Sep. 2007.

Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.

"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.

Fairchild Semiconductor, Application Note 9016, IGBT Basics 1, by K.S. Oh Feb. 1, 2001.

"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.

Walker, "A DC Circuit Breaker for an Electric Vehicle Battery Pack", Australasian Universities Power Engineering Conference and IEAust Electric Energy Conference, Sep. 26-29, 1999.

Combined Search and Examination Report for GB1018872.0 dated Apr. 15, 2011, 2 pages.

International Search Report and Opinion of International Patent Application PCT/2009/051221, dated Oct. 19, 2009.

International Search Report and Opinion of International Patent Application PCT/2009/051222, dated Oct. 7, 2009.

Communication in EP07874025.5 dated Aug. 17, 2011.

IPRP for PCT/IB2008/055095 dated Jun. 8, 2010, with Written Opinion.

ISR for PCT/IB2008/055095 dated Apr. 30, 2009.

ISR for PCT/IL07/01064 dated Mar. 25, 2008.

IPRP for PCT/IB2007/004584 dated Jun. 10, 2009, with Written Opinion.

IPRP for PCT/IB2007/004591 dated Jul. 13, 2010, with Written Opinion.

IPRP for PCT/IB2007/004643 dated Jun. 10, 2009, with Written Opinion.

Written Opinion for PCT/IB2008/055092 submitted with IPRP dated Jun. 8, 2010.

IPRP for PCT/US2008/085754 dated Jun. 8, 2010, with Written Opinion dated Jan. 21, 2009.

IPRP for PCT/US2008/085755 dated Jun. 8, 2010, with Written Opinion dated Jan. 20, 2009.

IPRP for PCT/IB2009/051221 dated Sep. 28, 2010, with Written Opinion.

IPRP for PCT/IB2009/051222 dated Sep. 28, 2010, with Written Opinion.

IPRP for PCT/IB2009/051831 dated Nov. 9, 2010, with Written Opinion.

IPRP for PCT/US2008/085736 dated Jun. 7, 2011, with Written Opinion.

IPRP for PCT/IB2010/052287 dated Nov. 22, 2011, with Written Opinion.

ISR for PCT/IB2010/052413 dated Sep. 7, 2010.

UK Intellectual Property Office, Application No. GB1109618.7, Patents Act 1977, Examination Report Under Section 18(3), Sep. 16, 2011.

UK Intellectual Property Office, Patents Act 1977: Patents Rules Notification of Grant: Patent Serial No. GB2480015, Nov. 29, 2011.

Walker, et al. "PV String Per-Module Maximum Power Point Enabling Converters", School of Information Technology and Electrical Engineering The University of Queensland, Sep. 28, 2003.

Walker, "Cascaded DC-DC Converter Connection of Photovoltaic Modules", 33rd Annual IEEE Power Electronics Specialists Conference. PESC 2002. Conference Proceedings. Cairns, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.

Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.

Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, pp. 1619-1922.

Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.

Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.

Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.

IPRP for PCT/IL2007/001064 dated Mar. 17, 2009, with Written Opinion dated Mar. 25, 2008.

IPRP for PCT/IB2007/004586 dated Jun. 10, 2009, with Written Opinion.

Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.

IPRP PCT/IB2007/004610—date of issue Jun. 10, 2009.

Extended European Search Report—EP12176089.6—Mailing date: Nov. 8, 2012.

Gwon-Jong Yu et al: "Maximum power point tracking with temperature compensation of photovoltaic for air conditioning system with fuzzy controller", 19960513; 19960513-19960517, May 13, 1996 (May 13, 1996), pp. 1429-1432, XP010208423.

Extended European Search Report—EP12177067.1—Mailing Date: Dec. 7, 2012.

GB Combined Search and Examination Report—GB1200423.0—Mailing date: Apr. 30, 2012.

GB Combined Search and Examination Report—GB1201506.1—Mailing date: May 22, 2012.

"Study of Energy Storage Capacitor Reduction for Single Phase PWM Rectifier", Ruxi Wang et al., Virginia Polytechnic Institute and State University, Feb. 2009.

"Multilevel Inverters: A Survey of Topologies, Controls, and Applications", Jose Rodriguez et al., IEEE Transactions on Industrial Electronics, vol. 49, No. 4, Aug. 2002.

Extended European Search Report—EP 08878650.4—Mailing date: Mar. 28, 2013.

Satcon Solstice—Satcon Solstice 100 KW System Solution Sheet—2010.

John Xue, "PV Module Series String Balancing Converters", University of Queensland—School of Information Technology & Electrical Engineering, Nov. 6, 2002.

Robert W. Erickson, "Future of Power Electronics for Photovoltaics", IEEE Applied Power Electronics Conference, Feb. 2009.

Chinese Office Action—CN Appl. 201310035221.8—dated Aug. 11, 2016.

Zhou, Wilson and Theo Phillips—"Industry's First 4-Switch Buck-Boost Controller Achieves Highest Efficiency Using a Single Inductor—Design Note 369"—Linear Technology Corporation—www.linear.com—2005.

"Micropower Synchronous Buck-Boost DC/DC Converter"—Linear Technology Corporation—www.linear.com/LTC3440—2001.

Mar. 5-9, 1995—Caricchi, F. et al.—20 KW Water-Cooled Prototype of a Buck-Boost Bidirectional DC-DC Converter Topology for Electrical Vehicle Motor Drives—University of Rome—IEEE 1995—pp. 887-892.

(56) References Cited

OTHER PUBLICATIONS

Roy, Arunanshu et al—"Battery Charger using Bicycle"—EE318 Electronic Design Lab Project Report, EE Dept, IIT Bombay, Apr. 2006.
Jun. 20-25, 2004—Viswanathan, K et al—Dual-Mode Control of Cascade Buck-Boost PFC Converter—35th Annual IEEE Power Electronics Specialists Conference—Aachen, Germany, 2004.
Zhang, Pei et al.—"Hardware Design Experiences in ZebraNet"—Department of Electrical Engineering, Princeton University—SenSys '04, Nov. 3-5, 2004.
"High Efficiency, Synchronous, 4-Switch Buck-Boost Controller"—Linear Technology Corporation—www.linear.com/LTC3780—2005.
May 19-24, 2002—Chomsuwan, Komkrit et al. "Photovoltaic Grid-Connected Inverter Using Two-Switch Buck-Boost Converter"—Department of Electrical Engineering, King Mongkut's Institute of Technology Ladkrabang, Thailand, National Science and Technology Development Agency, Thailand—IEEE—2002.
Midya, Pallab et al.—"Buck or Boost Tracking Power Converter"—IEEE Power Electronics Letters, vol. 2, No. 4—Dec. 2004.
Chinese Office Action—CN Appl. 201510111948.9—dated Sep. 14, 2016.
Chinese Office Action—CN Appl. 201310066888.4—dated Nov. 2, 2016.
"Power-Switching Converters—the Principle, Simulation and Design of the Switching Power (the Second Edition)", Ang, Oliva, et al., translated by Xu Dehong, et al., China Machine Press, Aug. 2010, earlier publication 2005.
European Notice of Opposition—EP Patent 2092625—mailed Nov. 29, 2016.
Mar. 8, 2003—Vishay Siliconix "Si 7884DP—n-Channel 40-V (D-S) MOSFET" (2003).
Chinese Office Action—CN 201510423458.2—mailed Jan. 3, 2017 (english translation provided).
Chinese Office Action—CN 201410098154.9—mailed Mar. 3, 2017 (english translation provided).
European Search Report—EP Appl. 13150911.9—Apr. 7, 2017.
Howard et al., "Relaxation on a Mesh: a Formalism for Generalized Localization." Proceedings of the IEEE/RSJ International Conference on Intelligent Robots and Systems (IROS 2001). Wailea, Hawaii, Oct. 2001.
Chinese Office Action and Search Report—CN 201510578586.4—mailed Apr. 19, 2017.
Jul. 13, 2017—Chinese Office Action—CN201210007491.3.
Jul. 31, 2014—Huimin Zhou et al.—"PV Balancers: Concept, Architectures, and Realization"—IEEE Transactions on Power Electronics, vol. 30, No. 7, pp. 3479-3487.
Sep. 15, 2012—Huimin Zhou et. al—"PV balancers: Concept, architectures, and realization"—Energy Conversion Congress and Exposition (ECCE), 2012 IEEE, IEEE pp. 3749-3755.
Jul. 17, 2017—International Search Report—PCT/US2017/031571.
Aug. 4, 2017—European Search Report—EP 17165027.
Jul. 19, 2016—Notice of Opposition—EP 2374190—EP App No. 08878650.4.
Sep. 28, 2017—European Office Action—EP 08857835.6.
Nov. 2, 2017—EP Search Report App No. 13157876.7.
Nov. 11, 2017—EP Search Report—App No. 17171489.2.
Dec. 14, 2017—EP Search Report App No. 17188362.2.
Dec. 15, 2017—EP Search Report App No. 17188365.5.
2000; Bascope, G.V.T. Barbi, I; "Generation of Family of Non-isolated DC-DC PWM Converters Using New Three-state Switching Cells"; 2000 IEEE 31st Annual Power Electronics Specialists Conference in Galway, Ireland; vol. 2.
Jan. 20, 2005; Duncan, Joseph, A Global Maximum Power Point Tracking DC-DC Converter, Massachussetts Institute of Technology, Dept. of Electrical Engineering and Computer Science Dissertation; 8 pages.
2005; Edelmoser, K.H. et al.; High Efficiency DC-to-AC Power Inverter with Special DC Interface; Professional Paper, ISSN 0005-1144, Automatika 46 (2005) 3-4, 143-148, 6 pages.

2006; Esmaili, Gholamreza; "Application of Advanced Power Electornics in Renewable Energy Sources and Hygrid Generating Systems" Ohio State Univerty, Graduate Program in Electrical and Computer Engineering, Dissertation. 169 pages.
Nov. 13, 2007; Gomez, M; "Consulting in the Solar Power Age," IEEE-CNSV: Consultants' Network of Scilion Valley; 30 pages.
Jul. 25, 1995-Jun. 30, 1998; Kern, G; "SunSine (TM)300: Manufacture of an AC Photovoltaic Module," Final Report, Phases I & II; National Renewable Energy Laboratory, Mar. 1999; NREL-SR-520-26085; 33 pages.
May 1, 2000; Kroposki, H. Thomas and Witt, B & C; "Progress in Photovoltaic Components and Systems," National Renewable Energy Laboratory; NREL-CP-520-27460; 7 pages.
Jan. 22-23, 1998. Oldenkamp, H. et al; "AC Modules: Past, Present and Future" Workshop Installing the Solar Solution; Hatfield, UK; 6 pages.
Linear Technology Specification Sheet, LTC3443—"High Current Micropower 600kHz Synchronous Buck-Boost DC/DC Converter"—2004.
Linear Technology Specification Sheet, LTC3780—"High Efficiency Synchronous, 4-Switch Buck-Boost Controller"—2005.
Apr. 22, 2004—MICREL—MIC2182 High Efficiency Synchronous Buck Controller.
Apr. 1972—Methods for Utilizing Maximum Power From a Solar Array—Decker, DK.
2000—Evaluating MPPT converter topologies using a MATLAB PV model—Walker, Geoffrey.
Jun. 30, 2008—Wang, Ucilia; Greentechmedia; "National Semi Casts Solarmagic"; www.greentechmedia.com; 3 pages; accessed Oct. 24, 2017.
Sep. 2004; Yuvarajan, S; Dchuan Yu; Shanguang, Xu; " A Novel Power Converter for PHotovoltaic Applications," Journal of Power Sources; vol. 135, No. 1-2, pp. 327-331.
Jun. 1998—Stern M., et al., "Development of a Low-Cost Integrated 20-kW-AC Solar Tracking Subarray for Grid- Connected PV Power System Applications—Final Technical Report"—National Renewable Energy Laboratory; 41 pages.
1997; Verhoeve, C.W.G., et al., "Recent Test Results of AC_Module inverters," Netherlands Energy Research Foundation ECN, 1997; 3 pages.
2004—Nobuyoshi, M. et al., "A Controlling Method for Charging Photovoltaic Generation Power Obtained by a MPPT Control Method to Series Connected Ultra-Electric Double Layer Capacitors"—Industry Application Conference, 2004. 39th IAS Annual Meeting. Conference Record of the 2004 IEEE.
Feb. 23-27, 1992—Miwa, Brett et al., "High Efficiency Power Factor Correction Using Interleaving Techniques"—Applied Power Electronics Conference and Exposition, 1992. APEC '92. Conference Proceedings 1992., Seventh Annual.
Jan. 1, 2005; Linear Technology Specification Sheet, LTC3780—"High Efficiency Synchronous, 4-Switch Buck-Boost Controller".
Dec. 19, 2005; Edelmoser, K.H. et al.; High Efficiency DC-to-AC Power Inverter with Special DC Interface; Professional Paper, ISSN 0005-1144, Automatika 46 (2005) 3-4, 143-148, 6 pages.
Jan. 29, 2019—European Search Report for EP App No. 18199117.5.
Jul. 12, 2019—European Search Report—EP 19170538.3.
Sep. 4, 2019—Extended European Search Report—EP 19181247.8.
Aug. 6, 2019—Notice of Opposition of European Patent 2232663—Fronius International GmbH.
Sep. 5, 2019—Notice of Opposition of European Patent 2549635—Huawei Technologies Co.
Sep. 5, 2019—Notice of Opposition of European Patent 2549635—Fronius International GmbH.
Solide Arbeit, Heinz Neuenstein, Dec. 2007.
Spitzenwirkungsgrad mit drei Spitzen, Heinz Neuenstien and Andreas Schlumberger, Jan. 2007.
Technical Information, Temperature Derating for Sunny Boy, Sunny Mini Central, Sunny Tripower, Aug. 9, 2019.
Prinout from Energy Matters online Forum, Jul. 2011.
Wayback Machine Query for Energy Matters Online Forum Jul. 2011.
Nov. 27, 2019—European Search Report—3567562.

(56)          References Cited

OTHER PUBLICATIONS

Baocheng, DC to AC Inverter with Improved One Cycle Control, 2003.
Brekken, Utility-Connected Power Converter for Maximizing Power Transfer From a Photovoltaic Source While Drawing Ripple-Free Current, 2002.
Cramer, Modulorientierter Stromrichter Geht In Serienfertigung , SPVSE, 1994.
Cramer, Modulorientierter Stromrichter, Juelich, Dec. 31, 1995.
Cramer, String-Wechselrichter Machen Solarstrom Billiger, Elektronik, Sep. 1996.
Dehbonei, A Combined Voltage Controlled and Current Controlled "Dual Converter" for a Weak Grid Connected Photovoltaic System with Battery Energy Storage, 2002.
Engler, Begleitende Untersuchungen zur Entwicklung eines Multi-String-Wechselrichters, SPVSE, Mar. 2002.
Geipel, Untersuchungen zur Entwicklung modulorientierter Stromrichter Modulorientierter Stromrichter für netzgekoppelte Photovoltaik-Anlagen, SPVSE, 1995.
Hoor, DSP-Based Stable Control Loops Design for a Single Stage Inverter, 2006.
Isoda, Battery Charging Characteristics in Small Scaled Photovoltaic System Using Resonant Dc-Dc Converter With Electric Isolation, 1990.
Jones, Communication Over Aircraft Power lines, Dec. 2006/Jan. 2007.
Kalaivani, A Novel Control Strategy for the Boost DC - AC Inverter, 2006.
Lee, Powering The Dream, IET Computing & Control Engineering, Dec. 2006/Jan. 2007.
Lee, A Novel Topology for Photovoltaic Series Connected DC/DC Converter with High Efficiency Under Wide Load Range, Jun. 2007.
Lin, LLC DC/DC Resonant Converter with PLL Control Scheme, 2007.
Niebauer, Solarenergie Optimal Nutzen, Stromversorgung, Elektronik, 1996.
Rodrigues, Experimental Study of Switched Modular Series Connected DC-DC Converters, 2001.
Sanchis, Buck-Boost DC-AC Inverter: Proposal for a New Control Strategy, 2004.
Sen, A New DC-to-AC Inverter With Dynamic Robust Performance, 1998.
Shaojun, Research on a Novel Inverter Based on DC/DC Converter Topology, 2003.
Siri, Sequentially Controlled Distributed Solar-Array Power System with Maximum Power Tracking, 2004.
Walko, Poised For Power, IEE Power Engineer, Feb./Mar. 2005.
White, Electrical Isolation Requirements in Power-Over-Ethernet (POE) Power Sourcing Equipment (PSE), 2006.
Yu, Power Conversion and Control Methods for Renewable Energy Sources, May 2005.
Zacharias, Modularisierung in der PV-Systemtechnik—Schnittstellen zur Standardisierung der Komponenten, Institut für Solare Energieversorgungstechnik (ISET), 1996.
Dec. 24, 2019—CN Office Action—CN Application 201610946835. 5.
Jan. 30, 2020—EP Office Action—EP 18204177.2.
Feb. 3, 2020—Chinese Office Action—201710749388.9.
Mar. 24, 2020—Non-Final Rejection—U.S. Appl. No. 15/593,761.
Apr. 20, 2020—European Search Report—EP 20151729.9.
Apr. 23, 2020—European Search Report—EP 19217486.0.
May 12, 2020—Extended European Search Report—EP 20161381. 7.
Jul. 8, 2020—CN Office Action—CN 201710362679.2.
Sep. 17, 2020—Extended European Search Report—EP Application 20176744.9.
Oct. 12, 2020—CN Office Action—CN 201610946835.5.
Nov. 12, 2020—Preliminary Opinion by EPO—EP 12188944.8.
International Search Report for corresponding PCT/GB2004/001965, completed Aug. 16, 2004 by A. Roider.

Mar. 5-9, 1995—Naik et al., A Novel Grid Interface for Photovoltaic, Wind-Electric, and Fuel-Cell Systems With a Controllable Power Factor or Operation, IEEE, 1995, pp. 995-998.
Petkanchin, Processes following changes of phase angle between current and voltage in electric circuits, Aug. 1999, Power Engineering Review, IEEE vol. 19, Issue 8, pp. 59-60.
Mumtaz, Asim, et al., "Grid Connected PV Inverter Using a Commercially Available Power IC," PV in Europe Conference, Oct. 2002, 3 pages, Rome, Italy.
Koutroulis, Eftichios, et al., "Development of a Microcontroller-Based, Photovoltaic Maximum Power Point Tracking Control System," IEEE Transactions on Power Electronics, Jan. 2001, pp. 46-54, vol. 16, No. 1, IEEE.
European Search Report—EP App. 14159457.2—mailed Jun. 12, 2015.
European Search Report and Written Opinion—EP Appl. 12150819. 6—dated Jul. 6, 2015.
Alonso, O. et al. "Cascaded H-Bridge Multilevel Converter for Grid Connected Photovoltaic Generators With Independent Maximum Power Point Tracking of Each Solar Array." IEEE 34th Annual Power Electronics Specialists Conference. vol. 2, Jun. 15, 2003.
Alonso, et al., "Cascaded H-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.
Chinese Office Action—CN Appl. 201280006369.2—dated Aug. 4, 2015.
Chinese Office Action—CN Appl. 201210253614.1—dated Aug. 18, 2015.
Extended European Search Report, EP Application 04753488.8, mailed Apr. 29, 2015.
International Search Report from PCT/US04/16668, form PCT/ISA/220, filing date May 27, 2004.
Office Action U.S. Appl. No. 13/785,857, dated Jun. 6, 2013.
Partial Extended European Search Report, EP Application 04753488. 8, mailed Feb. 2, 2015.
The International Search Report (Form PCT /ISA/220) Issued in corresponding international application No. PCT/US04/16668, filed May 27, 2004.
International Search Report—PCT/US2004/016668, form PCT/ISA/220—filing date May 27, 2004—mailed Jan. 19, 2005.
Written Opinion of the International Searching Authority—PCT/US2004/016668, form PCT/ISA/220—filing date May 27, 2004—mailed Jan. 19, 2005.
Extended European Search Report—EP Appl. 04753488.8—mailed Apr. 29, 2015.
Supplementary Partial European Search Report—EP Appl. 04753488. 8—mailed Feb. 2, 2015.
US Office Action—U.S. Appl. No. 13/785,857—mailed Jun. 6, 2013.
European Office Action—EP Appl. 09725443.7—dated Aug. 18, 2015.
Definition of Isomorphism by Merriam-Webster, <http://www.merriaum-webster.com/dictionary/isomorphism, dated Oct. 20, 2015.
Definition of Isomorphic by Merriam-Webster, <http://www.merriam-webster.com/dictionary/isomorphic, dated Oct. 20, 2015.
Chinese Office Action—CN Appl. 201110349734.7—dated Oct. 13, 2015.
Chinese Office Action—CN Appl. 201210007491.3—dated Nov. 23, 2015.
European Office Action—EP Appl. 12176089.6—dated Dec. 16, 2015.
Chinese Office Action—CN Appl. 201310035223.7—dated Dec. 29, 2015.
Chinese Office Action—CN Application 201210334311.2—dated Jan. 20, 2016.
European Search Report—EP Appl. 13800859.4—mailed Feb. 15, 2016.
Chinese Office Action—CN App. 201310035221.8—mailed Mar. 1, 2016.
PCT/2008/058473 International Preliminary Report, 6 pages, Nov. 2, 2009.

(56) References Cited

OTHER PUBLICATIONS

International Search Report and Written Opinion, WO 2010080672, dated Aug. 19, 2010.

PCT/US2010/045352 International Search Report and Written Opinion; 12 pages; Oct. 26, 2010.

International Search Report and Written Opinion mailed Feb. 6, 2009,. In counteprart PCT/US2008/008451, 13 pages.

European Search Report: dated Jan. 10, 2013 in corresponding EP application No. 09838022.3, 7 pages.

D. Ton and W. Bower; Summary Report of the DOE High-Tech Inverter Workshop; Jan. 2005.

First Action Interview Pre-Interview Communication from U.S. Appl. No. 13/174,495 mailed Jun. 18, 2014, 7 pgs.

Johnson et al., "Arc-fault detector algorithm evaluation method utilizing prerecorded arcing signatures", Photovoltaic Specialists Conference (PVSC), Jun. 2012.

Aug. 6, 2007—Philippe Welter, et al. "Electricity at 32 kHz," Photon International, The Photovoltaic Magazine, Http://www.photon-magazine.com/archiv/articles.aspx?criteria=4&HeftNr=0807 &Title=Elec . . . printed May 27, 2011).

PCT/US2009/069582 Int. Search Report—dated Aug. 19, 2010.

Chinese Office Action—CN Appl. 201210007491.3—mailed Apr. 25, 2016.

CN Office Action—CN Appl. 201310004123.8—dated May 5, 2016.

Law et al., "Design and Analysis of Switched-Capacitor-Based Step-Up Resonant Converters," IEEE Transactions on Circuits and Systems, vol. 52, No. 5, published May 2005.

CN Office Action—CN Appl. 201310066888.4—dated May 30, 2016.

European Search Report—EP Appl. 13152966.1—dated Jul. 21, 2016.

European Search Report—EP Appl. 12183811.4—dated Aug. 4, 2016.

European Notice of Opposition—EP Patent 2374190—dated Jul. 19, 2016.

"Es werde Dunkelheit. Freischaltung von Solarmodulen im Brandfall"— "Let there be Darkness: Quality control of Solar Modules in Case of Fire"; PHOTON, May 2005, 75-77, ISSN 1430-5348, English translation provided.

Chinese Office Action—CN Appl. 201380029450.7—dated Jul. 28, 2016.

GB Combined Search and Examination Report—GB1203763.6—Mailing date: Jun. 25, 2012.

Mohammad Reza Amini et al., "Quasi Resonant DC Link Inverter with a Simple Auxiliary Circuit", Journal of Power Electronics, vol. 11, No. 1, Jan. 2011.

Khairy Fathy et al., "A Novel Quasi-Resonant Snubber-Assisted ZCS-PWM DC-DC Converter with High Frequency Link", Journal of Power Electronics, vol. 7, No. 2, Apr. 2007.

May 22, 1998—Cheng K.W.E., "New Generation of Switched Capacitor Converters", Department of Electrical Engineering, The Hong Kong Polytechnic University, Hung Hom, Hong Kong, Power Electronics Conference, PESC 98.

1999—Per Karlsson, "Quasi Resonant DC Link Converters - Analysis and Design for a Battery Charger Application", Universitetstryckeriet, Lund University, 1999, ISBN 91-88934-14-4; Added to Lund University Publications on Jun. 4, 2012.

Hsiao Sung-Hsin et al., "ZCS Switched-Capacitor Bidirectional Converters with Secondary Output Power Amplifier for Biomedical Applications", Power Electronics Conference (IPEC) Jun. 21, 2010.

Nov. 27-30, 2007—Yuang-Shung Lee et al., "A Novel QR ZCS Switched-Capacitor Bidirectional Converter", IEEE, 2007.

Antti Tolvanen et al., "Seminar on Solar Simulation Standards and Measurement Principles", May 9, 2006 Hawaii.

J.A. Eikelboom and M.J. Jansen, "Characterisation of PV Modules of New Generations—Results of tests and simulations", Jun. 2000.

Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.

C. Liu et al., "Advanced Algorithm for Mppt Control of Photovoltaic Systems", Canadian Solar Buildings Conference, Montreal, Aug. 20-24, 2004.

May 22, 1998—Chihchiang Hua and Chihming Shen, "Study of Maximum Power Tracking Techniques and Control of DC/DC Converters for Photovoltaic Power System", IEEE.

Tore Skjellnes et al., "Load sharing for parallel inverters without communication", Nordic Workshop in Power and Industrial Electronics, Aug. 12-14, 2002.

Jun. 23, 2000—Giorgio Spiazzi at el., "A New Family of Zero-Current-Switching Variable Frequency dc-dc Converters", IEEE.

Nayar, C.V., M. Ashari and W.W.L Keerthiphala, "A Grid Interactive Photovoltaic Uninterruptible Power Supply System Using Battery Storage and a Back up Diesel Generator", IEEE Transactions on Energy Conversion, vol. 15, No. 3, Sep. 2000, pp. 348?353.

Ph. Strauss et al., "AC coupled PV Hybrid systems and Micro Grids-state of the art and future trends", 3rd World Conference on Photovoltaic Energy Conversion, Osaka, Japan May 11-18, 2003.

Jul. 16-20, 2000—Nayar, C.V., abstract, Power Engineering Society Summer Meeting, 2000. IEEE, 2000, pp. 1280-1282 vol. 2.

Mar. 15, 2004—D. C. Martins et al., "Analysis of Utility Interactive Photovoltaic Generation System using a Single Power Static Inverter", Asian J. Energy Environ., vol. 5, Issue 2, (2004), pp. 115-137.

Rafael C. Beltrame et al., "Decentralized Multi String Pv System With Integrated ZVT Cell", Congresso Brasileiro de Automática / 12 a 16-setembro-2010, Bonito-MS.

Sergio Busquets-Monge et al., "Multilevel Diode-clamped Converter for Photovoltaic Generators With Independent Voltage Control of Each Solar Array", IEEE Transactions On Industrial Electronics, vol. 55, No. 7, Jul. 2008.

Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.

Office Action—JP 2011-539491—Mailing date: Mar. 26, 2013.

Supplementary European Search Report—EP08857456—Mailing Date Dec. 6, 2013.

Extended European Search Report—EP14151651.8—Mailing date: Feb. 25, 2014.

Iyomori H et al: "Three-phase bridge power block module type auxiliary resonant AC link snubber-assisted soft switching inverter for distributed AC power supply", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 650-656, XP031895550, ISBN: 978-4-88552-196-6.

Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved from the Internet: URL:http:jjscholar.lib.vt.edu/theses/available/etd-012299-165108/unrestricted/THESIS. PDF, [retrieved on Mar. 5, 2013].

Yoshida M et al: "Actual efficiency and electromagnetic noises evaluations of a single inductor resonant AC link snubber-assisted three-phase soft-switching inverter", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.

Third party observation—EP07874025.5—Mailing date: Aug. 6, 2011.

Extended European Search Report—EP 13152967.9—Mailing date: Aug. 28, 2014.

Extended European Search Report—EP 14159696—Mailing Date: Jun. 20, 2014.

Gow Ja A et al: "A Modular DC-DC Converter and Maximum Power Tracking Controller for Medium to Large Scale Photovoltaic Generating Plant"8<SUP>th </SUP> European Conference on Power Electronics and Applications. Lausaane, CH, Sep. 7-9, 1999, EPE. European Conference on Power Electronics and Applications, Brussls: EPE Association, BE, vol. Conf. 8, Sep. 7, 1999, pp. 1-8, XP000883026.

Chihchiang Hua et al: "Comparative Study of Peak Power Tracking Techniques for Solar Storage System" Applied Power Electronics Conference and Exposition, 1998. APEC '98. Conference Proceed-

(56) References Cited

OTHER PUBLICATIONS ings 1998, Thirteenth Annual Anaheim, CA USA Feb. 15-19, 1998, New York, NY, USA, IEEE, US, Feb. 15, 1998, pp. 679-685, XP010263666.

Matsuo H et al: "Novel Solar Cell Power Supply System Using the Multiple-input DC-DC Converter" 20<SUP>th</ SUP> International telecommunications Energy Conference. Intelec '98 San Francisco, CA, Oct. 4-8, 1998, Intelec International Telecommunications Energy Conference, New York, NY: IEEE, US, Oct. 4, 1998, pp. 797-802, XP000896384.

Chihchiang Hua et al: "DSP-based controller application in battery storage of photovoltaic system" Industrial Electronics, Control, and Instrumentation, 1996, Proceedings of the 1996 IEEE IECON 22<SUP>nd</SUP> International Conference on Taipei, Taiwan Aug. 5-10, 1996, New York, NY, USA, IEEE, US, Aug. 5, 1996, pp. 1705-1710, XP010203239.

Hua C et al: "Implementation of a DSP-Controlled Photovoltaic System with Peak Power Tracking"IEEE Transactions on industrial Electronics, IEEE, Inc. New York, US, vol. 45, No. 1, Feb. 1, 1998, pp. 99-107, XP000735209.

I. Weiss et al.: "A new PV system technology-the development of a magnetic power transmission from the PV module to the power bus" 16th European Photovoltaic Solar Energy Conference, vol. III, May 1-5, 2000, pp. 2096-2099, XP002193468 Glasgow, UK cited in the application.

Basso, Tim, "IEEE Standard for Interconnecting Distributed Resources With the Electric Power System," IEEE PES Meeting, Jun. 9, 2004.

Feb. 11, 2003—Boostbuck. com, "The Four Boostbuck Topologies," located at http://www.boostbuck.com/TheFourTopologies. html.

Apr. 2002—Gautam, Nalin K et al., "An Efficient Algorithm to Simulate the Electrical Performance of Solar Photovoltaic Arrays," Energy, vol. 27, No. 4, pp. 347-361, 2002.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Wiles, John, "Photovoltaic Power Systems and the National Electrical Code: Suggested Practices," Sandia National Laboratories, document No. SAND2001-0674, Mar. 2001.

Hewes, J. "Relays," located at http://web.archive.org/web/20030816010159/www.kpsec.freeuk.com/components/relay.htm, Aug. 16, 2003.

Jan. 1, 1993—Definition of "remove" from Webster's Third New International Dictionary, Unabridged, 1993.

Jan. 1, 1993—Definition of "removable" from Webster's Third New International Dictionary, Unabridged, 1993.

Advanced Energy Group, "The Basics of Solar Power Systems," located at http://web.archive. org/web/20010331044156/http://www.solar4power.com/solar-power-basics.html, Mar. 31, 2001.

International Patent Application No. PCT/AU2005/001017, International Search Report and Written Opinion, Aug. 18, 2005.

Baek, Ju-Won et al., "High Boost Converter using Voltage Multiplier," 2005 IEEE Conference, IECON 05, pp. 567-572, Nov. 2005.

Wikimedia Foundation, Inc., "Electric Power Transmission," located at http://web.archive.org/web/20041210095723/en.wikipedia.org/wiki/Electric-power-transmission, Nov. 17, 2004.

Jacobsen, K.S., "Synchronized Discrete Multi-Tone (SDMT) Modulation for Cable Modems: Making the Most of the Scarce Reverse Channel Bandwidth," Conference Proceedings of Wescon/97, pp. 374-380, Nov. 4, 1997.

Loyola, L. et al., "A Multi-Channel Infrastructure based on DCF Access Mechanism for Wireless LAN Mesh Networks Compliant with IEEE 802.11," 2005 Asia-Pacific Conference on Communications, pp. 497-501, Oct. 5, 2005.

Summons to Oral Proceedings Pursuant to Rule 115(1) EPC, dated Feb. 26, 2024 regarding EP Patent No. 2557650.

"Parallel connection and shunt of resistors", Fundamentals of Circuit, Wang Lianqi, Xidian university Publishing House, pp. 19-21.

Jun. 1, 2024—Chinese Office Action—CN App. No. 202110496807. 9.

Subudhi et al., "A Comparative Study on Maximum Power Point Tracking Techniques for Photovoltaic Power Systems," IEEE Transactions on Sustainable Energy, vol. 4, No. 1, Jan. 2013.

Dec. 31, 2020—CN Invalidation Decision—CN 200780045351.2.

Dec. 31, 2020—CN Invalidation Decision—CN 201210253614.1.

Mar. 3, 2021—EP Office Action—EP 17188365.5.

May 7, 2021—Chinese Office Action—CN 20181025083.8.

Jun. 21, 2021—Japanese Office Action—JP 2017-158887.

Zhao Junjian & al.: "Analysis of high efficiency DC/DC converter processing partial input/output power", 14th Workshop on Control and Modeling for Power Electronics, Jun. 23, 2013 (Jun. 23, 2013), DOI: 10.1109/COMPEL.2013.6626440.

Apr. 14, 2021—European Summons to Oral Proceedings—EP 17724234.4.

PV Balancers: Concept, Architectures, and Realization—Huimmin Zhou—IEEE Transactions on Power Electronics vol. 30 No. 7—Jul. 7, 2015.

Petition for Inter Partes Review of U.S. Pat. No. 10,256,770; IPR 2021-00540; Petitioner *Altenergy Power Systems Inc* vs. Patent Owner *Tigo Energy Inc*.

Declaration in Support of Petition for Inter Partes Review of U.S. Pat. No. 10,256,770; IPR 2021-00540; Petitioner *Altenergy Power Systems Inc* vs. Patent Owner *Tigo Energy Inc*.

Petition for Inter Partes Review of U.S. Pat. No. 8,988,321; IPR 2021-00541; Petitioner *Altenergy Power Systems Inc* vs. Patent Owner *Tigo Energy Inc*.

Declaration in Support of Petition for Inter Partes Review of U.S. Pat. No. 8,933,321; IPR 2021-00541; Petitioner *Altenergy Power Systems Inc* vs. Patent Owner *Tigo Energy Inc*.

Petition for Inter Partes Review of U.S. Pat. No. 8,933,321; IPR 2021-01286; Petitioner *SunSpec Alliance* vs. Patent Owner *Tigo Energy Inc*.

Declaration in Support of Petition for Inter Partes Review of U.S. Pat. No. 8,933,321; IPR 2021-01286; Petitioner *SunSpec Alliance* vs. Patent Owner *Tigo Energy Inc*.

Petition for Inter Partes Review of U.S. Pat. No. 10,256,770; IPR 2021-01287; Petitioner *SunSpec Alliance* vs. Patent Owner *Tigo Energy Inc*.

Declaration in Support of Petition for Inter Partes Review of U.S. Pat. No. 10,256,770; IPR 2021-01287; Petitioner *SunSpec Alliance* vs. Patent Owner *Tigo Energy Inc*.

Maxouris, et al. "United States sets record for most Covid-19 deaths reported in one day," Jan. 13, 2021, CNN, https://www.cnn.com/2021/01/12/health/us-coronavirus-tuesday/index.html.

Texas Instruments, CMOS Ripple-Carry Binary Counter/Dividers, acquired from Harris Semiconductor SCHS030D—Revised Dec. 2003.

Excerpts from IEEE 100—The Authoritative Dictionary of IEEE Standards Terms (7th Ed. 2000).

Excerpts from Paul Horowitz & Winfield Hill—The Art of Electronics (2d. Ed. 1989).

Webeck, Evan, "Coronavirus: California sets another daily case record in possible first sign of 'surge on top of a surge," Jan. 5, 2021, The Mercury News (California).

Declaration of Randy R. Dunton in Support of Petition for Inter Partes Review of U.S. Pat. No. 8,933,321, Petitioner *Altenergy POwer Systems, Inc.* v. *Tigo Energy Inc.*, IPR2021-00541.

Declaration of Randy R. Dunton in Support of Petition for Inter Partes Review of U.S. Pat. No. 10,256,770, Petitioner *Altenergy Power Systems, Inc.* v. *Tigo Energy Inc.*, IPR2021-00540.

Declaration of Randy R. Dunton in Support of Petition for Inter Partes Review of U.S. Pat. No. 8,933,321, Petitioner *SunSpec Alliance* v. Patent Owner *Tigo Energy Inc.*, IPR2021-01286.

Declaration of Randy R. Dunton in Support of Petition for Inter Partes Review of U.S. Pat. No. 10,256,770, Petitioner *SunSpec Alliance* v. Patent Owner *Tigo Energy Inc.*, IPR2021-01287.

Nov. 17, 2021—CN Office Action—CN App No. 201810025083.8.

Dec. 16, 2021—EP Office Action—EP App. No. 19178054.3.

Noguchi, Short-Current Pulse-Based Maximum-Power-Point Tracking Method for Multiple Photovoltaic-and-Converter Module System, IECON, Feb. 2002.

(56)        References Cited

OTHER PUBLICATIONS

Siri, Maximum Power Tracking in Parallel Connected Converters, IEEE, Jul. 1993.
Solero, Performance of A 10 kW Power Electronic Interface For Combined Wind/PV Isolated Generating Systems, PESC, 1996.
Wu, An Improved Dynamic Power Distribution Control Scheme for Pwm Controlled Converter Modules, IEEE, 1992.
Jun. 30, 2022—Extended EP Search Report—EP App. No. 22150308.9.
Jul. 7, 2023—European Search Report—EP App. No. 22191698.4.
Oct. 5, 2023—European Search Report—EP App. No. 23180721.5.
Dec. 12, 2023—Japanese Office Action—JP App. No. 2020-004452.
Jan. 18, 2023—Chinese Notice of Allowance—CN App. No. 202010044554.7.
Jan. 30, 2024—CN Office Action—CN 202110858752.1.
Storfer, Lior, "Enhancing Cable Modem TCP Performance," Texas Instruments Inc. white paper, Jul. 2003.
Philips Semiconductors, Data Sheet PSMN005-55B; PSMN005-55P N-channel logic trenchMOS transistor, Oct. 1999, Product specification, pp. 1-11.
International Preliminary Report on Patentability Issued in corresponding international application No. PCT/ US04/16668, filed May 27, 2004.
International Application No. PCT/US13/27965, International Preliminary Examination Report, Sep. 2, 2014.
International Patent Application PCT/US13/027965, International Search Report and Written Opinion, Jun. 2, 2013.
International Application No. PCT/US12/44045, International Preliminary Examination Report, Jan. 28, 2014.
International Patent Application No. PCT/US2012/044045, International Search Report and Written Opinion, Jan. 2, 2013.
International Patent Application No. PCT/US2009/047734, International Search Report and Written Opinion, May 4, 2010.
Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.
International Patent Application No. PCT/US2010/029929, International Search Report and Written Opinion, Oct. 27, 2010.
Lowe, Electronics Basis: What is a Latch Circuit, http://www.dummies.com/how-to/content/electronics-basics-what-is-a-latch-circuit.html, from Electronics All-in-One for Dummies, Feb. 2012, downloaded Jul. 13, 2014.
International Patent Application No. PCT/US2011/020591, International Search Report and Written Opinion, Aug. 8, 2011.
International Patent Application No. PCT/US2011/033544, International Search Report and Written Opinion, Nov. 24, 2011.
J. Keller and B. Kroposki, titled, "Understanding Fault Characteristics of Inverter-Based Distributed Energy Resources", in a Technical Report NREL/TP-550-46698, published Jan. 2010, pp. 1 through 48.
International Patent Application No. PCT/US2008/081827, International Search Report and Written Opinion, Jun. 24, 2009.
International Patent Application No. PCT/US2010/046274 International Search Report and Written Opinion, Apr. 22, 2011.
International Patent Application No. PCT/US2011/033658, International Search Report and Written Opinion, Jan. 13, 2012.
International Patent Application No. PCT/US2011/029392, International Search Report and Written Opinion, Oct. 24, 2011.
European Patent Application No. 09829487.9, Extended Search Report, Apr. 21, 2011.
International Patent Application No. PCT/US2009/062536, International Search Report and Written Opinion, Jun. 17, 2010.
International Patent Application No. PCT/US2010/022915, International Search Report and Written Opinion, Aug. 23, 2010.
International Patent Application No. PCT/US2010/046272, International Search Report and Written Opinion, Mar. 31, 2011.
Exell et al., "The Design and Development of a Solar Powered Refrigerator", [retrieved on Feb. 13, 2013], Retrieved from the Internet <URL: http://www.appropedia.org/The_Design_and_Development_of_a_Solar_Powered_Refrigerator>, pp. 1-64.
"Development of Water-Lithium Bromide Low-Temperature Absorption Refridgerating Machine", 2002 Energy & Environment on Database on Noteworthy contributions for Science and Technology (Japan), Research Data (No. 1748) [online], [retrieved on Aug. 29, 2012]. Retrieved from the Internet: <URL: http://dbnstl.nii.ac.jp/english/detail/1748>, pp. 1-4.
Dictionary.com, "air conditioning" [online], [retrieved on Aug. 28, 2012]. Retrieved from the Internet: <URL: http://dictionary.reference.com/browse/air+conditioning?s=t>, pp. 1-3.
International Patent Application No. PCT/US2010/029936, International Search Report and Written Opinion, Nov. 12, 2010.
International Patent Application No. PCT/US08/75127, International Search Report and Written Opinion, Apr. 28, 2009.
International Patent Application No. PCT/US09/35890, International Search Report and Written Opinion, Oct. 1, 2009.
European Patent Application No. 08845104.2, Extended Search Report, Jul. 31, 2014.
European Patent Application No. 11772811.3, Extended Search Report, Dec. 15, 2014.
International Patent Application No. PCT/US2008/082935, International Search Report and Written Opinion, Jun. 25, 2009.
Bhatnagar et al., Silicon Carbide High Voltage (400 V) Shottky Barrier Diodes, IEEE Electron Device Letters, vol. 13 (10) p. 501-503 Oct. 10, 1992.
Jun. 6-10, 2004—Rodriguez, C., and G. A. J. Amaratunga. "Dynamic stability of grid-connected photovoltaic systems." Power Engineering Society General Meeting, 2004. IEEE, pp. 2194-2200.
Nov. 3-Dec. 29, 1999—Kikuchi, Naoto, et al. "Single phase amplitude modulation inverter for utility interaction photovoltaic system." Industrial Electronics Society, 1999. IECON'99 Proceedings. The 25th Annual Conference of the IEEE. vol. 1. IEEE, 1999.
Oct. 7-12, 1990—Nonaka, Sakutaro, et al. "Interconnection system with single phase Igbt Pwm Csi between photovoltaic arrays and the utility line." Industry Applications Society Annual Meeting, 1990., Conference Record of the 1990 IEEE.
Jun. 23-27, 2002—Calais, Martina, et al. "Inverters for single-phase grid connected photovoltaic systems-an overview." Power Electronics Specialists Conference, 2002. pesc 02. 2002 IEEE 33rd Annual. vol. 4. IEEE, 2002.
Jul. 1999—Marra, Enes Goncalves, and José Antenor Pomilio. "Self-excited induction generator controlled by a VS-PWM bidirectional converter for rural applications." Industry Applications, IEEE Transactions on 35.4 (1999): 877-883.
Apr. 2-5, 2002—Xiaofeng Sun, Weiyang Wu, Xin Li, Qinglin Zhao: A Research on Photovoltaic Energy Controlling System with Maximum Power Point Tracking:; Proceedings of the Power Conversion Conference—Osaka 2002 (Cat. No. 02TH8579) IEEE-Piscataway, NJ, USA, ISBN 0-7803-7156-9, vol. 2, p. 822-826, XP010590259: the whole document.
International Search Report for corresponding PCT/GB2005/050198 completed Jun. 28, 2006 by C. Wirner of the EPO.
Brunello, Gustavo, et al., "Shunt Capacitor Bank Fundamentals and Protection," 2003 Conference for Protective Relay Engineers, Apr. 8-10, 2003, pp. 1-17, Texas A&M University, College Station, TX, USA.
Cordonnier, Charles-Edouard, et al., "Application Considerations for Sensefet Power Devices," PCI Proceedings, May 11, 1987, pp. 47-65.
Jun. 9-11, 2003—Kotsopoulos, Andrew, et al., "Predictive DC Voltage Control of Single-Phase PV Inverters with Small DC Link Capacitance," IEEE International Symposium, Month Unknown, 2003, pp. 793-797.
Meinhardt, Mike, et al., "Multi-String-Converter with Reduced Specific Costs and Enhanced Functionality," Solar Energy, May 21, 2001, pp. 217-227, vol. 69, Elsevier Science Ltd.
Mar. 6-10, 2005—Kimball, et al.: "Analysis and Design of Switched Capacitor Converters"; Grainger Center for Electric Machinery and Electromechanics, University of Illinois at Urbana-Champaign, 1406 W. Green St, Urbana, IL 61801 USA, © 2005 IEEE; pp. 1473-1477.

(56)     References Cited

OTHER PUBLICATIONS

Martins, et al.: "Interconnection of a Photovoltaic Panels Array to a Single-Phase Utility Line From a Static Conversion System"; Power Electronics Specialists Conference, 2000. PESC 00. 2000 IEEE 31st Annual; Jun. 18, 2000-Jun. 23, 2000; ISSN: 0275-9306; pp. 1207-1211, vol. 3.

International Search Report for corresponding PCT/GB2005/050197, completed Dec. 20, 2005 by K-R Zettler of the EPO.

Kjaer, Soeren Baekhoej, et al., "Design Optimization of a Single Phase Inverter for Photovoltaic Applications," IEEE 34th Annual Power Electronics Specialist Conference, Jun. 15-19, 2003, pp. 1183-1190, vol. 3, IEEE.

Jun. 23-27, 2002—Shimizu, Toshihisa, et al., "A Flyback-type Single Phase Utility Interactive Inverter with Low-frequency Ripple Current Reduction on the DC Input for an AC Photovoltaic Module System," IEEE 33rd Annual Power Electronics Specialist Conference 2002, pp. 1483-1488, vol. 3, IEEE.

Written Opinion of PCT/GB2005/050197, Feb. 14, 2006 (mailing date), Enecsys Limited.

Jun. 17-21, 2001—Yatsuki, Satoshi, et al., "A Novel AC Photovoltaic Module System based on the Impedance-Admittance Conversion Theory," IEEE 32nd Annual Power Electronics Specialists Conference, Month Unknown, 2001, pp. 2191-2196, vol. 4, IEEE.

Mar. 4-8, 2001—Andersen Gert, et al.,—Aalborg University, Institute of Energy Technology, Denmark—"Currect Programmed Control of a Single Phase Two-Switch Buck-Boost Power Factor Correction Circut"—Applied Power Electronics Conference and Exposition, 2001. APEC 2001. Sixteenth Annual IEEE.

Feb. 22-26, 2004—Andersen, Gert et al., - "Utilizing the free running Current Programmed Control as a Power Factor Correction Technique for the two switch Buck-Boost converter"—Applied Power Electronic Conference and Exposition, 2004. APEC '04. Nineteenth Annual IEEE.

Mar. 3-7, 1996—Caricchi F et al.,—"Prototype of Innovative Wheel Direct Drive With Water-Cooled Exial-Flux Motor for Electric Vehicle Applications"—Applied Power Electronics Conference and Expositions, 1996. APEC '96. Conference Proceedings 1996., Eleventh Annual IEEE.

Feb. 15-19, 1998—Caricchi, F. et al.,—"Study of Bi-Directional Buck-Boost Converter Topologies for Application in Electrical Vehicle Motor Drives"—Applied Power Electronics Conference and Exposition, 1998, APEC '98. Conference Proeedings 1998., Thirteenth Annual IEEE.

Nov. 27-30, 1990—Ensling, JHR—"Maximum Power Point Tracking: A Cost Saving Necessity in Solar Energy Systems"—Industrial Electornics Society, 1990. IECON '90., 16th Annual Conference of IEEE.

Feb. 22-26, 2004—Gaboriault, Mark et al.,—"A High Efficiency, Non-Inverting, Buck-Boost DC-DC Converter"—Applied Power Electronics Conference and Exposition, 2004. APEC '04. Nineteenth Annual IEEE.

Feb. 15-19, 1998—Hua, et al.,—"Comparative Study of Peak Power Tracking Techniques for Solar Storage System"—Applied Power Electronics Conference and Exposition, 1998. APEC'98. Conferenced Proceedings 1998., Thirteenth Annual IEEE.

Jun. 20-24, 1993—Sullivan, et al., "A High-Efficiency Maximum Power Point Tracker for Photovoltaic Arrays in a Solar-Powered Race Vehicle"—University of California, Berkeley, Department of Electrical Engineering and OCmputer Sciences—Power Electronics Specialists Conference, 1993. PESC '93 Record., 24th Annual IEEE.

May 19-24, 2002—Bower et at.,—"Certification of Photovoltaic Inverters: The Initial Step Toward PV System Certification"—Photovoltaic Specialists Conferences, 2002. Conference Record of the Twenty-Ninth IEEE.

Jun. 17-21, 2001—Tse et al., "A Novel Maximum Power Point Tracking Technique for PV Panels"—Power Electronics Specialists Conferences, 2001. PESC. 2001 IEEE 32nd Annual.

May 12-18, 2008—Cuadras et al., "Smart Interfaces for Low Power Energy Harvesting Systems"—Instrumentation and Measurement Technology Conferences Proceedings, 2008. IMTC 2008. IEEE.

Dec. 5-9, 1994—Haan, et al., " Test Results of a 130 W Ac Module; a modular solar as power station"—Photovoltaic Energy Conversion 1994. Conference Record of the Twenty Fourth. IEEE Phtovoltaic Specialists Conference - 1994.

Sep. 1-3, 2008—Jung, et al., "Soft Switching Boost Converter for Photovoltaic Power Generation System"—Power Electronics and Motion Control Conference, 2008. EPE-PEMC 2008.

Jun. 3-5, 2008—Duan, et al., "A Novel High-Efficiency Inverter for Stand Alone and Grid-Connected Systems"—Industrial Electronics and Applications, 2008. ICIEA 2008.

Nov. 7, 2002—Ertl, et al., "A Novel Multicell DC-AC Converter for Applicaiton in Renewable Energy Systems"—IEEE Transactions on Industrial Electronics (vol. 49, Issue 5, Oct. 2002).

Oct. 8-12, 2000 Hashimoto, et al., "A Novel High Peforamance Utility Interactive Photovoltain Inverter System"—Industry Applications Conference, 2000. Conference Record of the 2000 IEEE.

Feb. 22-26, 2004—Ho, et al., "An Integrated Inverter with Maximum Power Tracking for Grid-Connected PV Systems"—Applied Power Electronics Conference and Exposition, 2004. APEC '04. Nineteenth Annual IEEE.

Nov. 14, 1997 Hua et al., "Control of DC/DC Converters for Solar Energy System with Maximum Power Tracking"—Industrial Electronics, Control and Instrumentation, 1997. IECON 97. 23rd International Conference on Industrial Electronics, Control and Instrumentation vol. 4 of 4.

Sept. 1-3, 2008 Lee et al., "Soft Switching Mutli-Phase Boost Converter for Photovoltaic System"—Power Electronics and Motion Control Conference, 2008. EPE-PEMC 2008.

Jul. 5, 2005, Yao et al., "Tapped-Inductor Buck Converter for High-Step-Down DC-DC Conversion" IEEE Transactions on Power Electronics (vol. 20, Issue 4, Jul. 2005).

Sep. 21-23, 1998 Kretschmar, et al., "An AC Converter with a Small DC Link Capacitor for a 15KW Permanent Magnet Synchronous Integral Motor"—Power Electronics and Variable Speed Drives, 1998. Sevent International Converterest (Conf. Publ. No. 456).

May 25, 2000—Hong Lim, et al., "Simple Maximum Power Point Tracker for Photovoltaic Arrays"—Electronics Letters (vol. 36, Issue 11, May 25, 2000).

Aug. 14-16, 2004 Nishida et al., "A Novel Type of Utility-Interactive Inverter for Phtovoltaic System"—Power Electronics and Mtion Control Conference, 2004. IPEMC 2004.

May 30-Jun. 3, 2011 Jung, et al., "DC-Link Ripple Reduction of Series-connected Module Integrated Converter for Photovoltaic Systems."—Power Electronics and ECCE Asia (ICPE & ECCE).

Jan. 8, 2007, Li et al., "An Analysis of ZVS Two-Inductor Boost Converter under Variable Frequency Operation"—IEEE Transactions on Power Electronics (vol. 22, Issue 1, Jan. 2007).

Sep. 17, 2007 Rodriguez et al., "Analytic Solution to the Photovoltaic Maximum Power Point Problem"—IEEE Transactions on Circuits and Systems I: Regular Papers (vol. 54, Issue 9, Sep. 2007).

Jun. 27, 1997, Reimann et al., "A Novel Control Principle of Bi-Directional DC-DC Power Conversion"—Powre Electronics Specialists Conference 1997. PESC '97 Record.

Sep. 15-22, 2000 Russell et al., "The Massachusetts Electric Solar Project: A Pilot Project to Commercialize Residential PV Systems"—Photovoltaic Specialists Conference, 2000, Conference Record of the Twenty-Eighth IEEE Photovoltaic Specialists Conference—2000.

May 2001, Shimizu et al., "Generation Control Circuit for Photvoltaic Modules"—IEEE Transactions of Power Electronics (vol. 16, Issue 3, May 2001).

Feb. 6-10, 2000, Siri, Kasemsan "Study of System Instability in Current-Mode Converter Power Systems Operating in Solar Array Voltage Regulation Mode"—Applied Power Electronics Conference and Exposition, 2000. APEC 2000. Fiftheenth Annual IEEE.

Aug. 13-16, 1990—Rajan, Anita "A Maximum Power Point Tracker Optimized for Solar Powered Cars"—Future Transportation Technology Conference and Expostion.

Jul. 10, 1995—"Battery I.D. chip from Dallas Semiconductor monitors and reports battery pack temperature"—Business Wire.

(56)         References Cited

OTHER PUBLICATIONS

Nov. 3, 1999—Takahashi et al., "Development of a Long-Life Three-Phase Flywheel UPS Using an Electrolytic Capacitorless Converter/Inverter"—Electrical Engineering in Japan, vol. 127.

Jan. 2001—Walker, Geoffrey "Evaluating MPPT Converter Topologies Using a Matlab PV Model"—"Journal of Electrical and Electronics Engineering, Australia".

Feb. 13, 2007—Roman et al., "Experimental Results of Controlled PV Module for Building Integrated PV Systems"—Solar Energy 82 (2008) 471-480.

2006—Bower et al., "Innovative PV Micro-Inverter Topology Eliminates Electrolytic Capacitors for Longer Lifetime"—IEEE 1-4244-0016-3/06/ pp. 2038-2041.

Aug. 23-27, 1993—Case et al., "A Minimum Component Photovoltaic Array Maximum Power Point Tracker"—European Space Power Conference vol. 1. Power Systems, Power Electronics.

Jun. 4, 1997—Maranda et al., "Optimization of the Master-Slave Inverter System for Grid-Connected Photovoltaic Plants"—Energy Convers. Mgmt. vol. 39, No. 12 pp. 1239-1246.

2005—Kang et al., "Photovoltaic Power Interface Circuit Incorporated with a Buck-Boost Converter and a Full-Bridge Inverter"—Applied Energy 82, pp. 266-283.

Nov. 21, 1997—Feuermann et al., "Reversable Low Soalr Heat Gain Windows for Energy Savings"—Solar Energy vol. 62, No. 3 pp. 169-175.

May 16, 2005—Enrique et al., "Theoretical assessment of the maximum power point tracking efficiency of photovoltaic facilities with different converter topologies"—Solar Energy 81 (2007) p. 31-38.

Dehbonei, Hooman "Power Conditioning for Distrbuted Renewable Energy Generation"—Curtin University of Technology, School of Electrical and Computer Engineering, 2003 568 pages Dissertation: Thesis. Abstract, 1 page—retrieved on Nov. 13, 2017 on https:// books.google.com/books/about/Power_Conditioning_for_Distributed_Renew.html?id=3wVXuAAACAAJ.

Korean Patent Application No. 102005-7008700, filed May 13, 2015. Applicant: Exar Corporation.

Jan. 23, 2018—EP Search Report, EP App No. 17187230.2.

Apr. 16, 2018—EP Examination Report 12707899.6.

Aug. 9, 2010 Hong, Wei, et al., "Charge Equalization of Battery POwer Modules in Series" The 2010 International Power Electronics Conference, IEEE, p. 1568-1572.

Jun. 6, 2018—EP Search Report EP App No. 18151594.1.

Jun. 29, 2018—EP Search Report—EP App No. 18175980.4.

Jun. 23, 2000; Bascope, G.V.T. Barbi, I; "Generation of Family of Non-isolated DC-DC PWM Converters Using New Three-state Switching Cells"; 2000 IEEE 31st Annual Power Electronics Specialists Conference in Galway, Ireland; vol. 2.

Oct. 3-7, 2004; Nobuyoshi, M. et al., "A Controlling Method for Charging Photovoltaic Generation Power Obtained by a MPPT Control Method to Series Connected Ultra-Electric Double Layer Capacitors"—Industry Application Conference, 2004. 39th IAS Annual Meeting. Conference Record of the 2004 IEEE.

GB Combined Search and Examination Report - GB1201499.9 - Mailing date: May 28, 2012.

Ciobotaru, et al., Control of single-stage single-phase PV inverter, Aug. 7, 2006.

International Search Report and Written Opinion for PCT/IB2007/004591 dated Jul. 5, 2010.

European Communication for EP07873361.5 dated Jul. 12, 2010.

European Communication for EP07874022.2 dated Oct. 18, 2010.

European Communication for EP07875148.4 dated Oct. 18, 2010.

Chen, et al., "A New Low-Stress Buck-Boost Converter for Universal-Input PFC Applications", IEEE Applied Power Electronics Conference, Feb. 2001, Colorado Power Electronics Center Publications.

Chen, et al., "Buck-Boost PWM Converters Having Two Independently Controlled Switches", IEEE Power Electronics Specialists Conference, Jun. 2001, Colorado Power Electronics Center Publications.

Esram, et al., "Comparison of Photovoltaic Array Maximum Power Point Tracking Techniques", IEEE Transactions on Energy Conversion, vol. 22, No. 2, Jun. 2007, pp. 439-449.

Walker, et al., "Photovoltaic DC-DC Module Integrated Converter for Novel Cascaded and Bypass Grid Connection Topologies-Design and Optimisation", 37th IEEE Power Electronics Specialists Conference, Jun. 18-22, 2006, Jeju, Korea.

Geoffrey R. Walker Affidavit re: U.S. Appl. No. 11/950,271, submitted in an IDS for U.S. Appl. No. 11/950,271 on Mar. 9, 2010.

International Search Report for PCT/IB2007/004610 dated Feb. 23, 2009.

International Search Report for PCT/IB2007/004584 dated Jan. 28, 2009.

International Search Report for PCT/IB2007/004586 dated Mar. 5, 2009.

International Search Report for PCT/IB2007/004643 dated Jan. 30, 2009.

International Search Report for PCT/US2008/085736 dated Jan. 28, 2009.

International Search Report for PCT/US2008/085754 dated Feb. 9, 2009.

International Search Report for PCT/US2008/085755 dated Feb. 3, 2009.

Kajihara, et al., "Model of Photovoltaic Cell Circuits Under Partial Shading", 2005 IEEE, pp. 866-870.

Knaupp, et al., "Operation of a 10 KW PV Façade with 100 W AC Photovoltaic Modules", 1996 IEEE, 25th PVSC, May 13-17, 1996, pp. 1235-1238, Washington, DC.

Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.

Chen, et al., "Predictive Digital Current Programmed Control", IEEE Transactions on Power Electronics, vol. 18, Issue 1, Jan. 2003.

Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.

Alonso, "A New Distributed Converter Interface for PV Panels", 20th European Photovoltaic Solar Energy Conference, 6-10, Jun. 2005, Barcelona, Spain, pp. 2288-2291.

Alonso, "Experimental Results of Intelligent PV Module for Grid-Connected PV Systems", 21st European Photovoltaic Solar Energy Conference, Sep. 4-8, 2006, Dresden, Germany, pp. 2297-2300.

Enslin, "Integrated Photovoltaic Maximum Power Point Tracking Converter", IEEE Transactions on Industrial Electronics, vol. 44, No. 6, Dec. 1997, pp. 769-773.

Sep. 7-9, 1999—Lindgren, "Topology for Decentralised Solar Energy Inverters with a Low Voltage AC-Bus", Chalmers University of Technology, Department of Electrical Power Engineering, EPE '99—Lausanne.

Jun. 20-25, 2004—Nikraz, "Digital Control of a Voltage Source Inverter in a Photovoltaic Applications", 2004 35th Annual IEEE Power Electronics Specialists Conference, Aachen, Germany, 2004, pp. 3266-3271.

Orduz, "Evaluation Test Results of a New Distributed MPPT Converter", 22nd European Photovoltaic Solar Energy Conference, Sep. 3-7, 2007, Milan, Italy.

Jun. 17-21, 2007—Palma, "A Modular Fuel Cell, Modular DC-DC Converter Concept for High Performance and Enhanced Reliability", IEEE 2007, pp. 2633-2638.

Sep. 16-19, 1996—Quaschning, "Cost Effectiveness of Shadow Tolerant Photovoltaic Systems", Berlin University of Technology, Institute of Electrical Energy Technology, Renewable Energy Section. EuroSun '96, pp. 819-824.

Roman, "Intelligent PV Module for Grid-Connected PV Systems", IEEE Transactions on Industrial Electronics, vol. 52, No. 4, Aug. 2006, pp. 1066-1073.

Roman, "Power Line Communications in Modular PV Systems", 20th European Photovoltaic Solar Energy Conference, 6-10, Jun. 2005, Barcelona, Spain, pp. 2249-2252.

(56)     References Cited

OTHER PUBLICATIONS

Uriarte, "Energy Integrated Management System for PV Applications", 20th European Photovoltaic Solar Energy Conference, Jun. 6-10, 2005, Barcelona, Spain, pp. 2292-2295.

Walker, "Cascaded DC-DC Converter Connection of Photovoltaic Modules", IEEE Transactions on Power Electronics, vol. 19, No. 4, Jul. 2004, pp. 1130-1139.

Oct. 3-7, 1999—Matsui, et al., "A New Maximum Photovoltaic Power Tracking Control Scheme Based on Power Equilibrium at DC Link", IEEE, 1999, pp. 804-809.

Hou, et al., Application of Adaptive Algorithm of Solar Cell Battery Charger, Apr. 2004.

Sep. 15-22, 2000—Stamenic, et al., "Maximum Power Point Tracking for Building Integrated Photovoltaic Ventilation Systems".

International Preliminary Report on Patentability for PCT/IB2008/055092 dated Jun. 8, 2010.

International Search Report for PCT/IB2008/055092 dated Sep. 8, 2009.

International Search Report and Opinion of International Patent Application WO2009136358 (PCT/IB2009/051831), dated Sep. 16, 2009.

Informal Comments to the International Search Report dated Dec. 3, 2009.

PCT/IB2010/052287 International Search Report and Written Opinion dated Sep. 2, 2010.

UK Intellectual Property office, Combined Search and Examination Report for GB1100450.4 under Sections 17 and 18 (3), Jul. 14, 2011.

Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.

Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.

Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.

Sandia Report SAND96-2797 I UC-1290 Unlimited Release, Printed Dec. 1996, "Photovoltaic Power Systems and The National Electrical Code: Suggested Practices", by John Wiles, Southwest Technology Development Institute New Mexico State University Las Cruces, NM.

* cited by examiner

402 Connect in series a voltage-compensation circuit within string(s)

404 Monitor power

406 Power maximised?

No

Yes

408 Configure a compensation voltage

410 Add the compensation voltage to voltage of string

400

MAXIMIZING POWER IN A PHOTOVOLTAIC DISTRIBUTED POWER SYSTEM

CROSS-REFERENCE TO RELATED APPLICATIONS

This application is a continuation of U.S. application Ser. No. 16/787,730, filed Feb. 11, 2020, which is a continuation of U.S. application Ser. No. 15/720,919 filed Sep. 29, 2017, now U.S. Pat. No. 10,608,553, which is a continuation of U.S. application Ser. No. 13/754,059, filed Jan. 30, 2013, now U.S. Pat. No. 9,812,984, which claims priority to United Kingdom Application GB1201499.9 filed Jan. 30, 2012, the contents of which are hereby incorporated by reference in their entirety.

BACKGROUND

1. Technical Field

The exemplary features presented relate to a photovoltaic power harvesting system including multiple photovoltaic strings and, more particularly to system and method for maximizing power in each photovoltaic string.

2. Description of Related Art

Reference is made to FIG. 1 which shows a photovoltaic power harvesting system 10 according to conventional art. A photovoltaic string 109 includes a series connection of photovoltaic panels 101. Photovoltaic strings 109 may be connected in parallel to give a parallel direct current (DC) power output. The parallel DC power output connects to the input of a direct current (DC) to alternating current (AC) inverter 103. The AC power output of inverter 103 connects across an AC load 105. AC load 105 may be an AC load such as an AC motor or may be an electrical power grid.

By way of a simplified numerical example, three strings 109 may be used with an inverter 103. If two strings 109 are equally irradiated such that each string operates with a string voltage of 600 volts (V) and string current of 10 amperes (A); each of the two strings generates (10 A·600 V) 6 kilowatts (kW). It is also assumed that the two equally irradiated strings 109 may be operating at maximum power.

If however, one string 109 is partially shaded or if one or more panels 101 is under performing, there may still be a string voltage of 600V as set by the other two equally irradiated strings 109, however, the string current in the one under performing string 109 may only be only 6 amperes. The under performing string 109 is not operating at maximum power point. For instance, it may be that the under performing string 109 has a maximum power point of 550 volts for a current of 10 amperes. In this situation, the power lost by the under performing string 109 is 1.9 kW (550V·10 A−600V·6 A). The under performing string 109, therefore, produces 3.6 kW (600V·6 A). Overall power harvested from system 10 is, therefore 15.6 kW (3.6 kW+2·6 kW).

Reference is now made to FIG. 2 which shows another power harvesting system 20 according to conventional art, according to international patent application publication WO2010002960. System 20 is directed to reduce power losses compared to the losses of system 10. Each photovoltaic string 109 includes a series connection of photovoltaic panels 101. Each photovoltaic string 109 is connected in parallel to an input of a DC-to-DC converter 205. The output of converter 205 connects to a DC bus 211. The DC voltage generated by photovoltaic string 109 is converted by converter 205 to the voltage of DC bus 211. Each photovoltaic string 109 together with the respective DC-DC converter 205 forms a photovoltaic string module 207. A number of modules 207 with outputs from respective DC-to-DC converters 205 may be connected in parallel to DC bus 211. The parallel combined outputs of modules 207 may be also connected to an input of a direct current (DC) to alternating current (AC) inverter 103 via DC bus 211. Inverter 103 converts the combined DC power outputs of modules 207 to an alternating current power at an output of inverter 103. The output of inverter 103 connects to AC load 105.

Still referring to FIG. 2, using the same numerical example as in system 10 (FIG. 1), three modules 207 may be used with inverter 103. Two strings 109 may be equally irradiated such that each string of the two strings operates with a string voltage of 600 volts and string current of 10 amperes. Each of the two strings generates (10 amperes·600 volts) or 6 kilowatts. If the one remaining string 109 is under performing, there may be maximum power point for the under performing string 109 of 550 volts and current of 10 amperes. Each DC-to-DC converter 205 may be configured to maximize power on each respective output to give 600 volts on DC bus 211. The two equally irradiated modules 207 each produce 6 kW (10 amperes·600 volts) and the under performing unit 207 produces 5.5 kW (10 amperes·550 volts). Giving an overall power harvested from system 20 of 17.5 kW. It can be seen that system 20 offers an improvement of 1.9 kW over system 10 in terms of minimized losses and increased power harvested. The improvement has been achieved through multiple DC-DC converters 205 which operate at wattage levels of around 6 kW. The high power DC-DC converters 205 in a power harvesting system may add to the cost of installation and maintenance of the power harvesting system and may present an overall decreased level of reliability for the power harvesting system because DC-DC converters 205 operate at high wattage levels.

The terms "monitoring", "sensing" and "measuring" are used herein interchangeably.

The terms "power grid" and "mains grid" are used herein interchangeably and refer to a source of alternating current (AC) power provided by a power supply company.

The term "converter" as used herein applies to DC-to-DC converters, AC-to-DC converters, DC-to-AC inverters, buck converters, boost converters, buck-boost converters, full-bridge converters and half-bridge converters or any other circuit for electrical power conversion/inversion known in the art.

The term "DC load" as used herein applies to the DC inputs of converters, batteries, DC motors or DC generators.

The term "AC load" as used herein applies to the AC inputs of converters, transformers, AC motors or AC generators.

BRIEF SUMMARY

Various power harvesting systems may be provided including multiple parallel-connected photovoltaic strings, each photovoltaic string includes a series-connection of photovoltaic panels. Multiple voltage-compensation circuits may be connected in series respectively with the photovoltaic strings. The voltage-compensation circuits may be configured to provide respective compensation voltages to the photovoltaic strings to maximize power harvested from the photovoltaic strings. The voltage-compensation circuits may include respective inputs which may be connected to a source of power and respective outputs which may be connected in series with the photovoltaic strings. The voltage-compensation circuits may be an alternating current (AC) to direct current (DC) converter where the source of power is a source of AC power, or a DC-of-DC converter where the source of power is a source of DC power. The source of power may be provided by the power grid.

The power harvesting system may include further, a direct current power output attached to the parallel-connected photovoltaic strings. The voltage-compensation circuits may include source power inputs connected to the direct current power output.

The power harvesting system may also include a direct current power output attached to the parallel-connected photovoltaic strings and an inverter including a DC power input attached to the direct current power output. The inverter preferably includes an AC power output. The inverter may be configured to invert direct current power generated by the parallel-connected photovoltaic strings to alternating current power at the AC power output. The voltage-compensation circuits may include source power inputs from the AC power output.

The power harvesting system may include a central controller operatively attached to the voltage-compensation circuits. The central controller may be adapted to control the compensation voltages by tracking maximum power produced from all the parallel-connected photovoltaic strings. A power sensor may be connected to the direct current power output and the central controller. The power sensor may be adapted to sense power in the direct current power output and report a sensed power to the central controller. The central controller may control the compensation voltages to maximize power from all the parallel-connected photovoltaic strings based on the sensed power.

The voltage-compensation circuits may be optionally configured to provide the compensation voltages in the photovoltaic strings additional to the voltages provided by the series connected photovoltaic panels.

The power harvesting system may also include, multiple sensors operatively connected respectively to the voltage-compensation circuits. The sensors may be adapted to measure a circuit parameter of the photovoltaic strings. The voltage-compensation circuits may be adapted to provide the compensation voltages based on the at least one circuit parameter to maximize power in the photovoltaic strings. The circuit parameter may include respective currents flowing in the photovoltaic strings. The at least one circuit parameter may include respective voltages of the photovoltaic strings.

According to features presented there is provided a power harvesting system which includes a photovoltaic string including a series connection of photovoltaic panels and a voltage-compensation circuit connected in series with the photovoltaic string. The voltage-compensation circuit may be configured to provide a compensation voltage to the string to maximize power harvested from the photovoltaic string. The voltage-compensation circuit may include an input connectible to a source of power and an output connectible in series with the photovoltaic string.

The power harvesting system may further include a direct current power output attached to the photovoltaic string. The voltage-compensation circuit includes a DC-to-DC converter having a source power input connected to the direct current power output. The voltage-compensation circuit may have an AC-to-DC converter with an alternating current (AC) source input provided from an AC power source. The AC-to-DC converter also includes a DC output which connects in series with the photovoltaic string. A direct current power output attached to the photovoltaic string and an inverter having a DC inverter input connected to the direct current power output. The AC-to-DC converter may be connectible at the AC source input to either a power grid, or an AC output of the inverter.

According to features presented there is provided a method in a power harvesting system which includes a photovoltaic string. The photovoltaic string may include a series-connection of photovoltaic panels. The method connects in series a voltage-compensation circuit within the photovoltaic string. A circuit parameter may be monitored within the photovoltaic string. A compensation voltage of the voltage-compensation circuit may be configured based on the monitoring. The compensation voltage may be added serially within the photovoltaic string, thereby maximizing the power harvested from the photovoltaic string. A DC load may be attached to the photovoltaic string. An input of the voltage-compensation circuit may be connected to either a source of AC power or a source of DC power. The circuit parameter may include a current produced by the photovoltaic string, a voltage across the photovoltaic string or the power produced by the photovoltaic string.

BRIEF DESCRIPTION OF THE DRAWINGS

The invention is herein described, by way of example only, with reference to the accompanying drawings, wherein.

DETAILED DESCRIPTION

Figure 1:
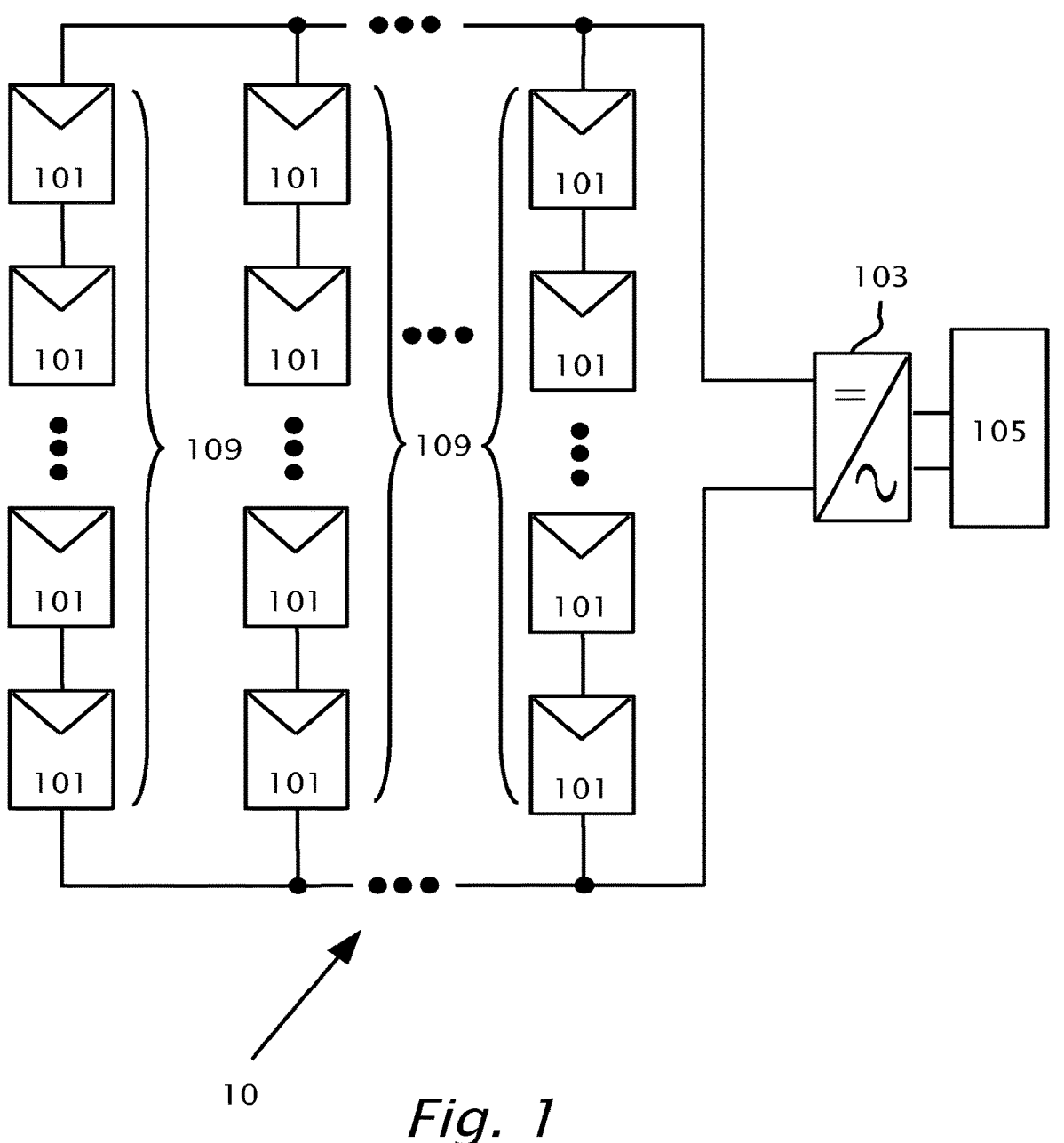
FIG. 1 shows a photovoltaic power harvesting system according to conventional art.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

It should be noted, that although the discussion herein relates primarily to photovoltaic systems, the present invention may, by non-limiting example, alternatively be configured using other distributed power systems including (but not limited to) wind turbines, hydro turbines, fuel cells, storage systems such as battery, super-conducting flywheel, and capacitors, and mechanical devices including conventional and variable speed diesel engines, Stirling engines, gas turbines, and micro-turbines.

By way of introduction, features of the present invention are directed towards maximizing output power from under-performing or partially shaded photovoltaic strings in a power harvesting system of parallel connected photovoltaic strings. The features may provide maximal overall power output of the system and reduced installation and maintenance cost of the system. The features may also provide increased reliability of the system, owing to lower power operating levels of switching converters added to each of the photovoltaic string compared with DC-DC converters 205 used in conventional system 20.

Figure 3A:
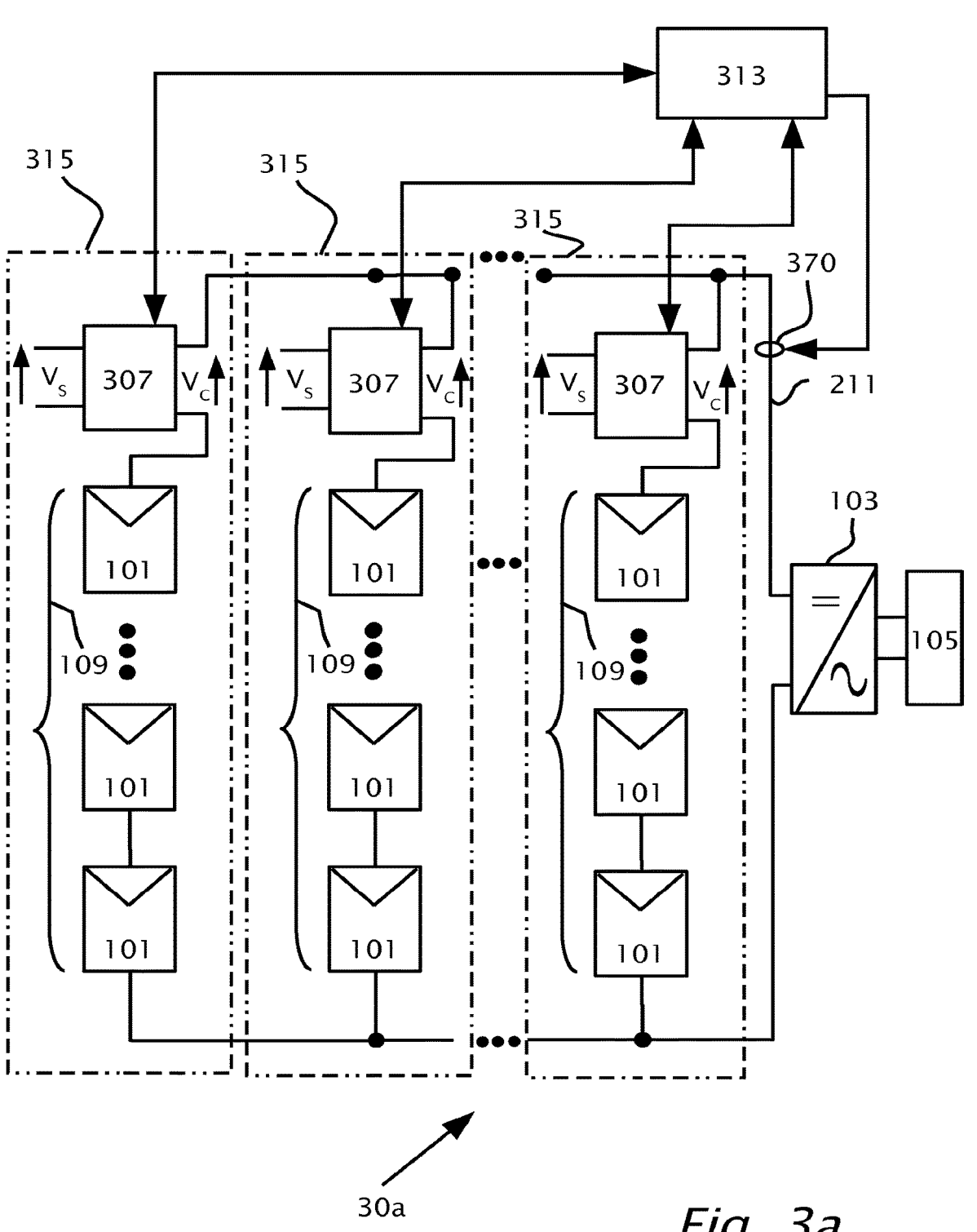
FIG. 3*a* shows a power harvesting system according to a feature of the present invention.

Reference is now made to FIG. 3a which shows a power harvesting system 30a according to a feature of the present invention. A number of photovoltaic panels 101 are connected in series to form a photovoltaic string 109. String 109 is connected in series with a voltage-compensation circuit 307 to provide a compensated string 315. A source voltage ($V_S$) may be input to voltage-compensation circuit 307. A number of compensated strings 315 may be connected together in parallel to give direct current (DC) power output 211. A power sensor 370 operatively connected to central controller 313 measures the power on DC output 211. DC power output 211 is connected to an input of a DC to alternating current (AC) inverter 103. Inverter 103 converts the combined DC power output 211 of strings 315 to an alternating current power at an output of inverter 103. The output of inverter 103 connects to AC load 105. A central controller 313 may be operatively attached to each voltage-compensation circuit 307 by bi-directional control and communication lines as shown, by wireless communication or by power line communications in DC bus 211. Central controller 313 may include a microprocessor with on-board memory and an interface which may include analogue to digital converters (ADCs) and digital to analogue converters (DACs).

Figure 3B:
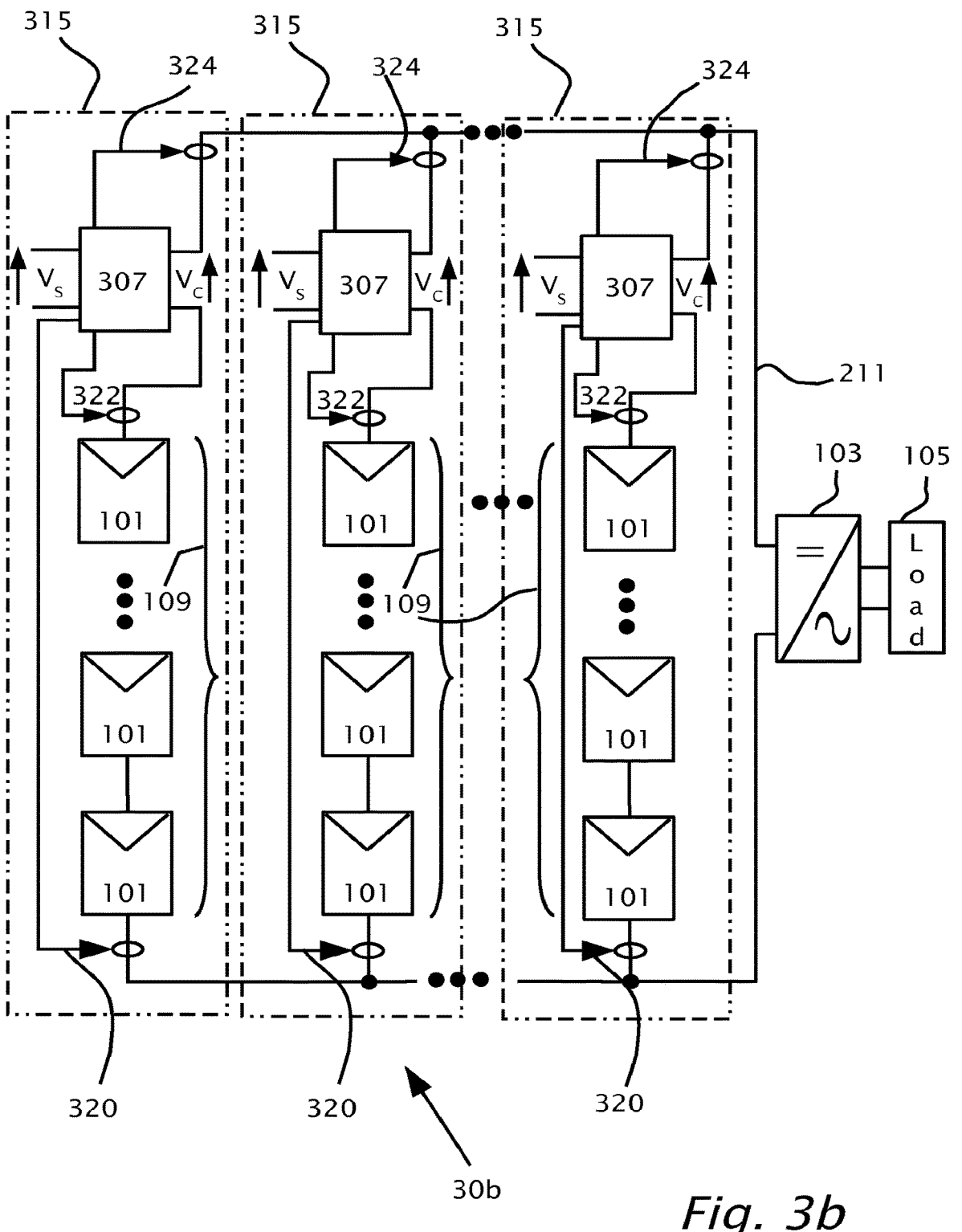
FIG. 3*b* shows a power harvesting system according to another feature of the present invention.

Reference is now made to FIG. 3b which shows a power harvesting system 30b according to another feature of the present invention. String 109 is connected in series with voltage-compensation circuit 307 to provide a compensated string 315. A source voltage ($V_S$) may be input to voltage-compensation circuit 307. A number of compensated strings 315 may be connected together in parallel to give direct current (DC) power output 211. DC power output 211 is connected to an input of a DC to alternating current (AC) inverter 103. Inverter 103 converts the combined DC power output 211 of strings 315 to an alternating current power at an output of inverter 103. The output of inverter 103 connects to AC load 105. System 30a is the same as system 30b except that system 30b does not have central controller 313. Instead, monitoring and control in system 30b is performed by each circuit 307, which may include a microprocessor with on-board memory and an interface which may include analogue to digital converters (ADCs) and digital to analogue converters (DACs). Each circuit 307 is operatively attached to sensors 320, 322 and 324. Sensors 320 and 322 may be adapted to sense the voltage across photovoltaic string 109 as well as current in string 109. Alternatively, sensors 320 and 324 may be adapted to sense the voltage across a compensated string 315 and current in string 315. Alternatively, sensors 324 and 322 may be adapted to sense the voltage ($V_C$) across a circuit 307 as well as current through the circuit 307.

Figure 3C:
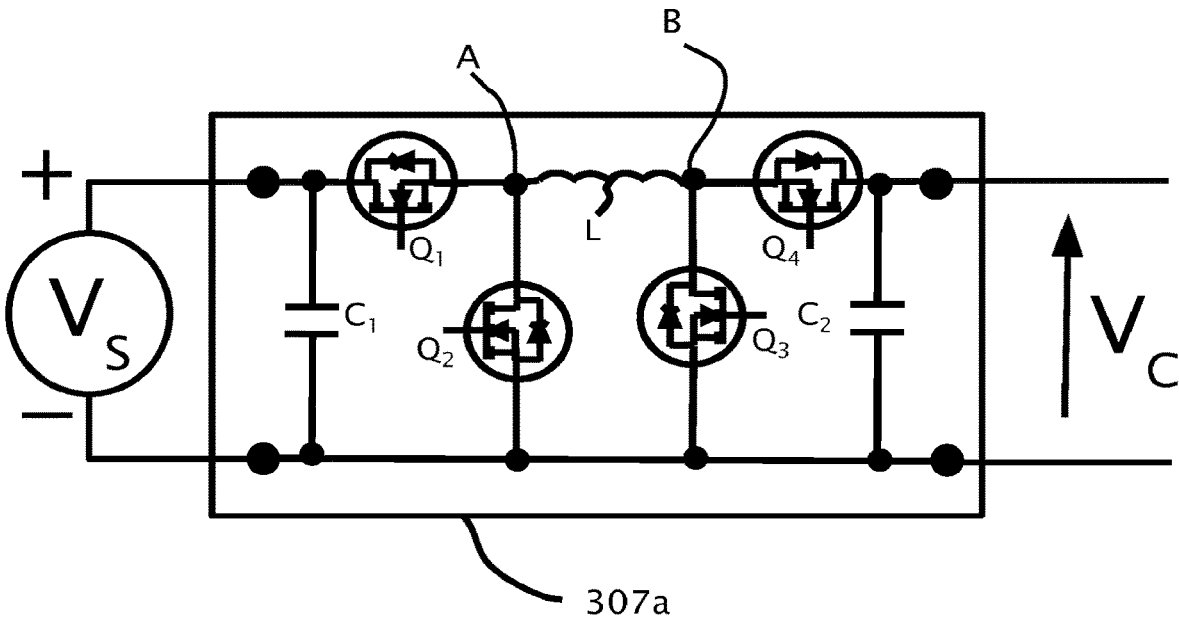
FIG. 3*c* shows more details of a voltage-compensation circuit shown in FIGS. 3*a* and 3*b*, according to a feature of the present invention.

Reference is now made to FIG. 3c which shows more details of voltage-compensation circuit 307 shown in FIGS. 3a and 3b, according to a feature of the present invention. Voltage-compensation circuit 307 may be implemented using a direct current (DC) to DC converter 307a. DC-to-DC converter 307a may be a buck circuit, a boost circuit, a buck+boost circuit or switched-mode power supply (SMPS). The output of DC-to-DC converter 307 is connected in series within string 315 to add compensation voltage ($V_C$) to string 315. The DC source voltage input ($V_S$) to DC-to DC converter 307 may be provided from the combined DC output of strings 315, or strings 109. Alternatively, DC source voltage input ($V_S$) may be provided by a micro-inverter converting AC from the mains grid or another independent source of DC power such as a battery or DC generator. Circuit 307 as shown in FIG. 3c, is a conventional buck-boost DC-to-DC converter circuit which has an input voltage $V_S$ with an input capacitor $C_1$ connected in parallel across $V_S$. Two switches may be implemented as field effect transistors (FET) with integral diodes: a high side buck switch $Q_1$ and a low side buck switch $Q_2$ connected in series by connecting the source of $Q_1$ to the drain of $Q_2$. The drain of $Q_1$ and the source of $Q_2$ may be connected parallel across the input capacitor $C_1$. A node A is formed between switches $Q_1$ and $Q_2$ to which one end of an inductor L is connected. The other end of inductor L is connected to the boost circuit of buck-boost DC-to-DC converter 307 at a node B. Node B connects two switches implemented as field effect transistors (FET): a high side boost switch $Q_4$ and a low side boost switch $Q_3$ together in series where the source of $Q_4$ connects to the drain of $Q_3$ to form node B. The drain of $Q_4$ and the source of $Q_3$ connect across an output capacitor $C_2$ to produce the output voltage $V_C$ of buck-boost DC-to-DC converter 307.

Figure 3D:
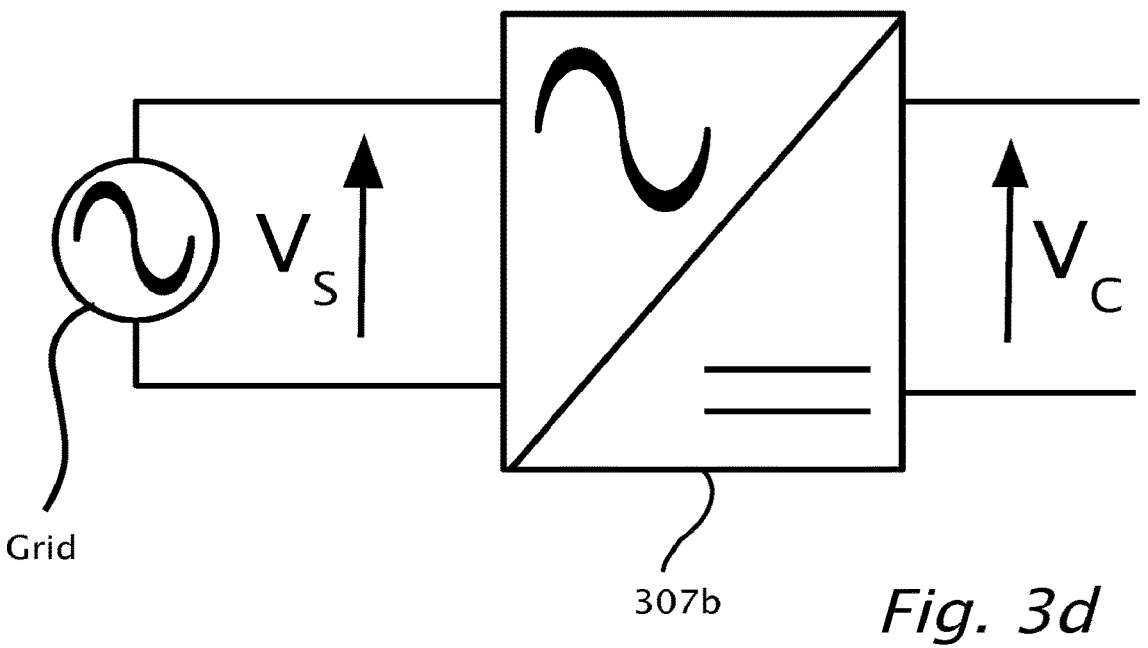
FIG. 3*d* shows an implementation of a voltage-compensation circuit shown in FIGS. 3*a* and 3*b*, according to another feature of the present invention.

Reference is now made to FIG. 3d which shows an implementation of circuit 307 shown in FIGS. 3a and 3b, according to another feature of the present invention. Voltage compensation circuit 307 may be implemented using an alternating current (AC) to DC inverter. The AC to DC inverter 307b may be a type of switched mode power supply (SMPS). When voltage-compensation circuit 307 is an AC to DC converter 307b, the DC output of the AC to DC converter is connected in series within a string 315. The AC input ($V_s$) to the AC to DC converter may be provided from the mains grid, from the AC output of inverter 103 or by another independent source of AC power.

Figure 4:
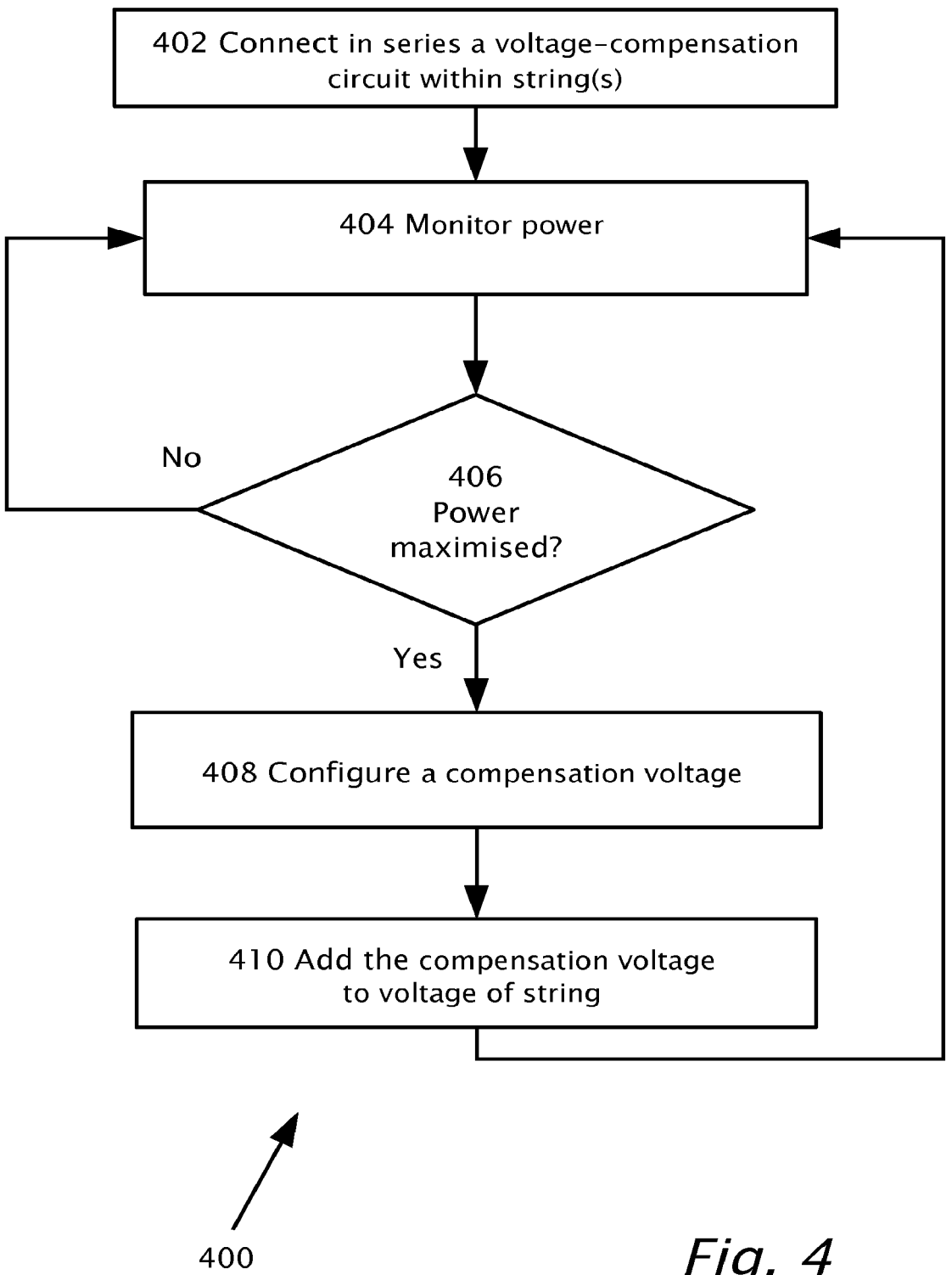
FIG. 4 shows a method applied to the power harvesting systems shown in FIGS. 3*a* and 3*b*, according to a feature of the present invention.

Reference is now made to FIG. 4 which shows a method 400 which may be applied to power harvesting system 30b shown in FIG. 3b, according to a feature of the present invention. In step 402, an output voltage ($V_C$) of circuit 307 is wired in series with a series-connection of panels 101 to form compensated string 315. The input voltage ($V_S$) to circuit 307 may be from direct current (DC) output 211, the alternating current (AC) output of inverter 103 or a separate independent AC or DC electric supply. Several compensated strings 315 outputs may then be connected in parallel and further connected to the input of an inverter 103 as shown in FIG. 3b.

In step 404, a circuit parameter of each parallel connected string 315 is monitored in the case of system 30b. The circuit parameter may be the current flowing in a string 315, the voltage across a string 315, the voltage of a photovoltaic string 109 and/or the voltage ($V_C$) across a circuit 307. The current and voltages in a string 315 may be used to determine the power (P) in a string 315 or a photovoltaic string 109 by virtue of power being equal to voltage (V) multiplied by current (I).

In decision block 406, a control algorithm stored in a circuit 307 adjusts compensation voltage $V_C$ to maximize output power of string 315. In step 408, a compensation voltage $V_c$ for strings 315 is configured based on the result of the control algorithm performed in steps 404 and 406. The compensation voltage $V_c$ for strings 315 in step 408 may be a positive or a negative voltage polarity with respect to the voltage polarity of a string 109. In step 410, the compensation voltage $V_c$ is added to string 315. In the case of the positive voltage for $V_c$, the voltage of a string 315 may be increased in step 408. In the case of the negative voltage for $V_c$, the voltage of string 315 may be decreased in step 408.

Reference is still being made to FIG. 4. Method 400 may also be applied to system 30a (FIG. 3a) which uses central controller 313. In the case of system 30a, in step 404 central controller monitors or calculates a net total power from system 30a. The net total power from system 30a is equal to the power produced by strings 109 subtracted from the power added by compensation circuits 307.

When the voltage ($V_S$) and hence power to the input of circuit 307 is derived from DC bus 211 or the output of inverter 103 to give compensated voltage ($V_C$). The net total power from system 30a may be derived directly by monitoring (step 404) power on DC bus 211.

When the voltage ($V_S$) and hence power to the input of circuit 307 is derived from an independent DC source or AC source such as a mains supply to give compensated voltage ($V_C$). The net total power from system 30a may be derived by subtracting power monitored on DC Bus 211 (step 404) from the power added by compensation circuits 307.

In decision block 406, compensation voltages $V_c$ of all strings 315 may be adjusted to maximize the net total power from system 30a. In step 408, a compensation voltage $V_c$ for a string 315 is configured based on the result of the control algorithm performed in steps 404 and 406. In step 410, the compensation voltage $V_c$ is added to a string 315.

During a sustained use of systems 30a or 30b over a period of time, the number and type of serial connected panels 101 in a string 315 may change, some panels may become faulty and/or operate in a current bypass mode or panels may be replaced with ones that have different electrical characteristics. Under these circumstances, the control algorithm maintains strings 315 at their maximum power point (MPP) by adding compensation voltage to each string 315 to maintain maximum power from each string 315. When all strings 109 are found to be operating at maximum power output level and maximum power point, no voltage compensation $V_c$ may be required and voltage compensation $V_c$ added to string 315 is at or near zero volts.

With respect to both systems 30a and 30b. In each iteration of the control algorithm performed in steps 404 and 406, it may be possible to subtract from all the compensation voltages ($V_c$) in each string 315, the minimum compensation voltage $V_c$. Subtracting the minimum compensation voltage $V_c$, may prevent a drift in the compensation voltages ($V_c$) going too high for no reason. Alternatively, it may be possible to tie the compensation voltages ($V_c$) to a level that will optimize the overall voltage of strings 315 to be optimal for the input of inverter 103, thereby increasing the conversion efficiency of inverter 103.

Figure 2:
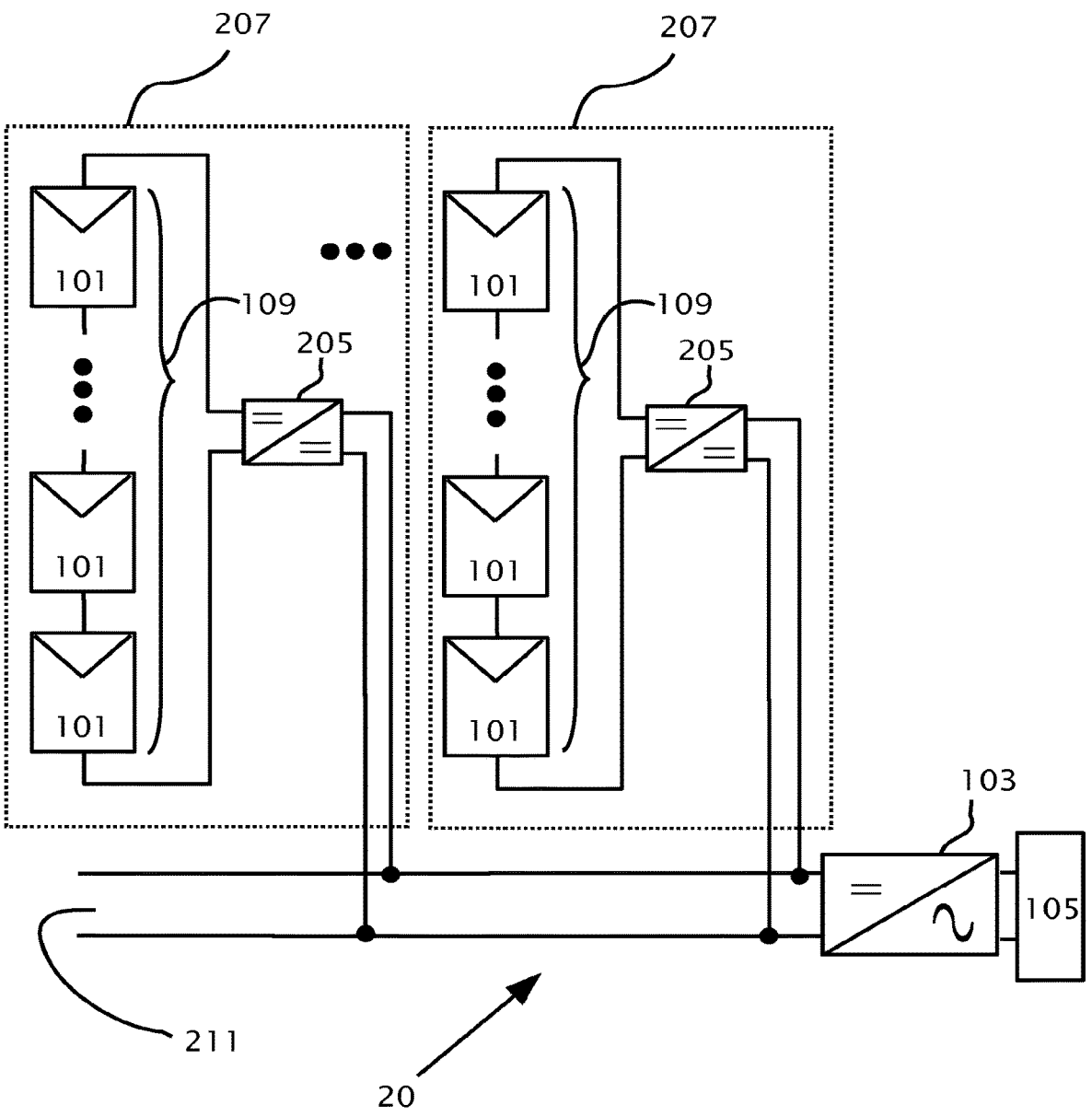
FIG. 2 shows another photovoltaic power harvesting system according to conventional art.

The present features with respect to method 400 and systems 30a or 30b, may be compared to conventional system 20 (FIG. 2) by way of the same numerical example, where three compensated strings 315 are used. It may be assumed just for the purpose of the numerical example that the three compensated strings 315 are compensated by circuit 307 which may be an AC to DC converter powered from the grid. Therefore, circuit 307 receives and converts voltage ($V_S$) and hence power from the electrical grid. If two strings 109 are equally irradiated such that each string operates with a string 109 voltage of 600 volts and string current of 10 amperes, each of the two strings generates (10 amperes·600 volts) 6 kilowatts. If one under-performing string 109 is partially shaded or if a panel 101 is removed or bypassed, there may be a string voltage of 550 Volts and current of 10 amperes, which means (10 amperes·550 volts) 5.5 kilowatts may be generated by the under-performing string 109. The maximum power 5.5 kilowatts may be generated by the under-performing string 109 only if the under-performing string 109 can be operated at maximum power point (MPP).

Voltage-compensation circuit 307 of the under-performing string 109 may be configured (step 408) by controller 313 to add 50 volts ($V_C$) in series with under-performing string 109 while maintaining the current of 10 amperes (step 410). Adding 50 volts by use of voltage-compensation circuit 307, maintains string 315 voltage at 600 volts also for under-performing string 109. Increasing the voltage of the string 315, allows the one under-performing string 109 to operate at MPP and also requires an extra (10 amperes·50 volts) 500 Watts when compared to the 6 kilowatts in each of the other two strings 315. The overall power output of system 30a or 30b is 18 kilowatts, from two strings 109 providing 12 kilowatts (2·6 kilowatts), the under-performing compensated string 109 providing 5.5 kilowatts and the grid providing 500 watts (50 volts·10 amperes) via circuit 307. The power provided from the 3 strings 315 may be therefore, the same as system 20 at 17.5 kilowatts (2·6 kilowatts+5.5 kilowatts).

The benefit of systems 30 compared with system 20 is that 500 W-1 kW switching converters 307 may be required compared with 6-10 kW switching converters used in system 20. The difference in power rating may represent a huge improvement in cost and reliability of systems 30 compared with system 20.

The indefinite articles "a", "an" is used herein, such as "a string", "a voltage-compensation circuit" have the meaning of "one or more" that is "one or more strings" or "one or more voltage-compensation circuits".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

The invention claimed is:

1. A system comprising:
   first converter circuitry configured to convert an input voltage between a pair of input terminals to a converter output voltage across a pair of output terminals;
   an input power source connected to the input terminals;
   a first photovoltaic (PV) power source separate from the input power source and connected to one terminal of the pair of output terminals and configured to output a first PV output voltage;
   a system power device separate from and connected to the first converter circuitry and the first PV power source, wherein the system power is configured to receive a combined output voltage comprising the converter output voltage together with the first PV output voltage;

a second PV power source configured to output a second PV output voltage; and controller circuitry configured to control the converter output voltage based on the second PV output voltage.

2. The system of claim 1, wherein the controller circuitry is configured to control the converter output voltage based on a maximum power of the second PV power source.

3. The system of claim 1, wherein the controller circuitry is configured to control the converter output voltage based on a maximum power of the first PV power source.

4. The system of claim 1, wherein the controller circuitry is configured to control the converter output voltage based on a first maximum power of the first PV power source and a second maximum power of the second PV power source.

5. The system of claim 1, wherein the controller circuitry is configured to control the converter output voltage based on a first power of the first converter circuitry, a second power of the first PV power source, and a third power of the second PV power source.

6. The system of claim 1, wherein the controller circuitry is configured to control the converter output voltage based on a first current of the first converter circuitry and the first PV power source, and a second current of the second PV power source.

7. The system of claim 1, wherein the first converter circuitry includes direct current (DC) to DC converter circuitry.

8. The system of claim 1, wherein the first converter circuitry includes buck converter circuitry and boost converter circuitry.

9. The system of claim 1, wherein the system power device includes second converter circuitry.

10. The system of claim 9, wherein the second converter circuitry includes direct current (DC) to alternating current (AC) converter circuitry.

11. The system of claim 1, wherein the system further includes third converter circuitry with an output terminal connected to the second PV power source and configured to output a second converter output voltage, wherein the second PV output voltage together with the second converter output voltage is a second combined output voltage.

12. The system of claim 11, wherein the system power device is connected to the third converter circuitry and a third power source and configured to receive the second combined output voltage.

13. The system of claim 12, wherein the controller circuitry is configured to control the converter output voltage based on the second combined output voltage.

14. The system of claim 12, wherein the controller circuitry is configured to control the converter output voltage based on the combined output voltage and the second combined output voltage.

15. An apparatus comprising:

a pair of input terminals, a pair of output terminals including a first output terminal and a second output terminal;

converter circuitry configured to convert an input voltage between the pair of input terminals to a converter output voltage across the pair of output terminals;

an input power source connected to the pair of input terminals;

wherein the first output terminal of the pair of output terminals is configured to connect to a first photovoltaic (PV) power source, wherein the first PV power is separate from the input power source;

wherein the second output terminal of the pair of output terminals is configured to connect to a system power device separate from the converter circuitry; and controller circuitry configured to control the converter output voltage based on a PV output voltage generated by a second PV power source.

16. The apparatus of claim 15, wherein the controller circuitry is configured to control the converter output voltage based on a maximum power of the second PV power source.

17. The apparatus of claim 15, wherein the controller circuitry is configured to control the converter output voltage based on a maximum power of the first PV power source.

18. The apparatus of claim 15, wherein the controller circuitry is configured to control the converter output voltage based on a first maximum power of the first PV power source and a second maximum power of the second PV power source.

19. The apparatus of claim 15, wherein the controller circuitry is configured to control the converter output voltage based on a first power of the converter circuitry, a second power of the first PV power source, and a third power of the second PV power source.

20. The apparatus of claim 15, wherein the controller circuitry is configured to control the converter output voltage based on a first current of the converter circuitry and the first PV power source, and a second current of the second PV power source.

* * * * *